(12) United States Patent
Tazume

(10) Patent No.: US 11,905,032 B2
(45) Date of Patent: Feb. 20, 2024

(54) AIRCRAFT, SYSTEM, AND METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

(*) Notice: Subject to any disclaimer, the term of this patent is extended or adjusted under 35 U.S.C. 154(b) by 235 days.

(21) Appl. No.: 17/362,263

(22) Filed: Jun. 29, 2021

(65) Prior Publication Data

US 2022/0055767 A1 Feb. 24, 2022

(30) Foreign Application Priority Data

Aug. 21, 2020 (JP) .................. 2020-140338

(51) Int. Cl.
| | |
|---|---|
| *B64D 45/00* | (2006.01) |
| *B64C 39/02* | (2023.01) |
| *G05D 1/00* | (2006.01) |
| *G08G 5/00* | (2006.01) |
| *G06V 20/10* | (2022.01) |

(52) U.S. Cl.
CPC ............ *B64D 45/00* (2013.01); *B64C 39/024* (2013.01); *G05D 1/0094* (2013.01); *G06V 20/176* (2022.01); *G08G 5/0034* (2013.01)

(58) Field of Classification Search
CPC ....... B64C 39/024; B64C 27/08; B64C 27/20; B64D 45/00; B64D 47/06; B64U 2201/10; B64U 10/13; B64U 2101/60; B64U 10/10; B64U 2201/20; G05D 1/0094; G06V 20/176; G08G 5/0034; G08G 5/0013; G08G 5/0039; G08G 5/0056; G08G 5/0069; G08G 5/025
See application file for complete search history.

(56) References Cited

U.S. PATENT DOCUMENTS

| | | | |
|---|---|---|---|
| 2020/0162667 A1 | 5/2020 | Morita | |
| 2020/0209894 A1 | 7/2020 | Torii et al. | |

FOREIGN PATENT DOCUMENTS

| | | |
|---|---|---|
| JP | 2019-41185 A | 3/2019 |
| JP | 2019-182379 A | 10/2019 |
| WO | 2020/035932 A1 | 2/2020 |

*Primary Examiner* — Calvin Cheung
(74) *Attorney, Agent, or Firm* — Sughrue Mion, PLLC

(57) ABSTRACT

Provided is an aircraft, a system, and a method whereby the visibility of the aircraft from a predetermined point can be improved. The aircraft includes at least one memory and at least one processor. Program code includes control code configured to cause the at least one processor to perform orientation change control for causing a first face to face a predetermined point, the first face being a face of the aircraft and having a predetermined color, or display control for causing an image of the predetermined color to be displayed on a second face, the second face being a display surface of a display device of the aircraft and a partial face or an entire face facing the predetermined point.

20 Claims, 28 Drawing Sheets

FIG. 8

TERMINAL TABLE

| COMMUNICATION ADDRESS OF TERMINAL DEVICE | RANGE OF OBSERVATION AIRSPACE | OBSERVATION POINT |
|---|---|---|
| XXX.YYY.ZZZ.800 | AB1 (···) | PB1 (N1, E1, H1) |
| XXX.YYY.ZZZ.900 | AB2 (···) | PB2 (N2, E2, H2) |

FIG. 9

| MAP TABLE | MAP | |
|---|---|---|
| RANGE OF AREA | POSITION AND SHAPE OF MAN-MADE STRUCTURE | POSITION AND SHAPE OF NATURAL OBJECT |
| R1 (...) | B1 (...) | N1 (...) |
| R2 (...) | B2 (...) | N2 (...) |

FIG. 18

TERMINAL TABLE

| COMMUNICATION ADDRESS OF TERMINAL DEVICE | OBSERVATION POINT | VIEWING FLAG |
|---|---|---|
| XXX.YYY.ZZZ.800 | PB1 (N1, E1, H1) | false |
| XXX.YYY.ZZZ.900 | PB2 (N2, E2, H2) | false |

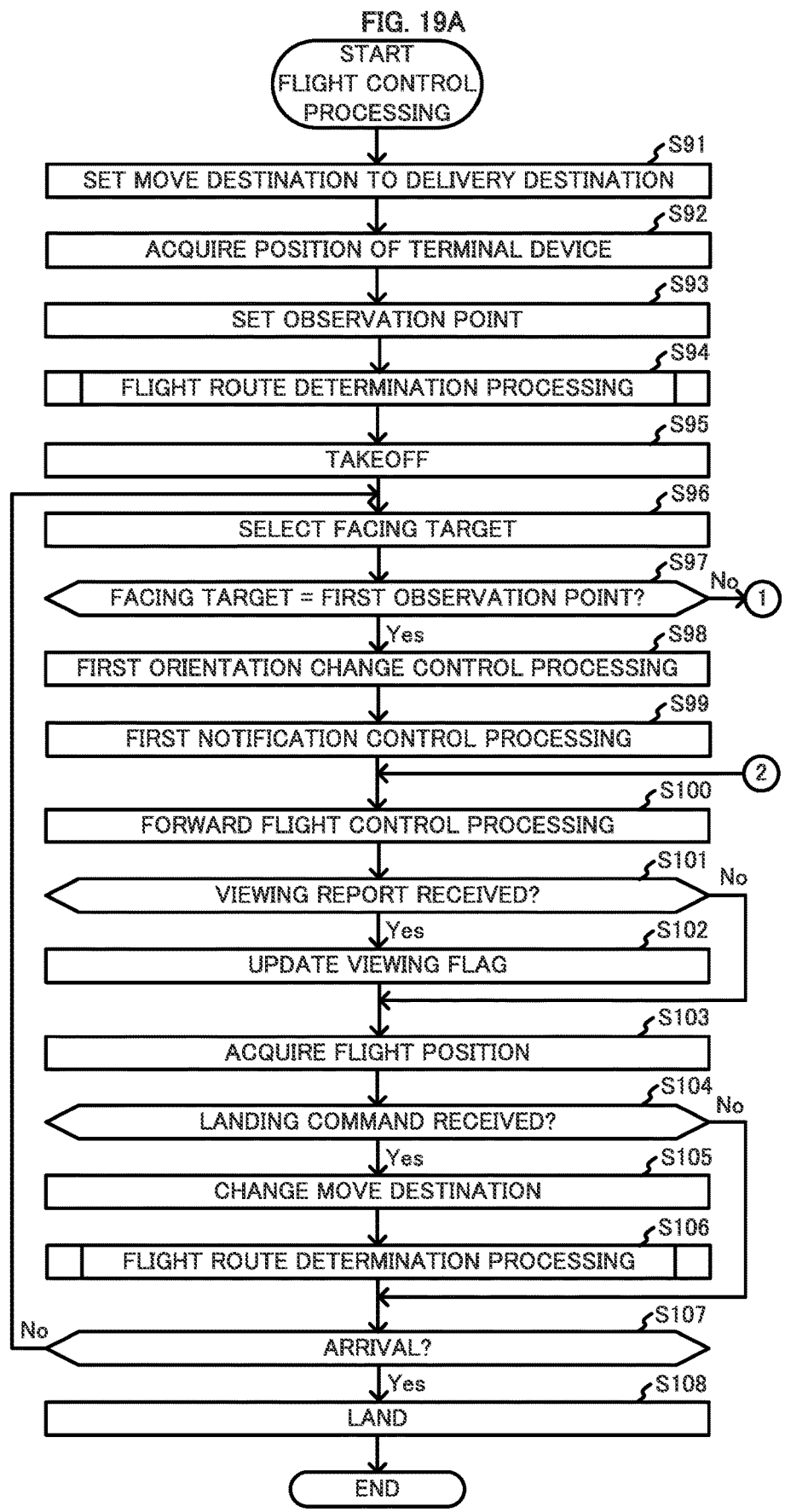

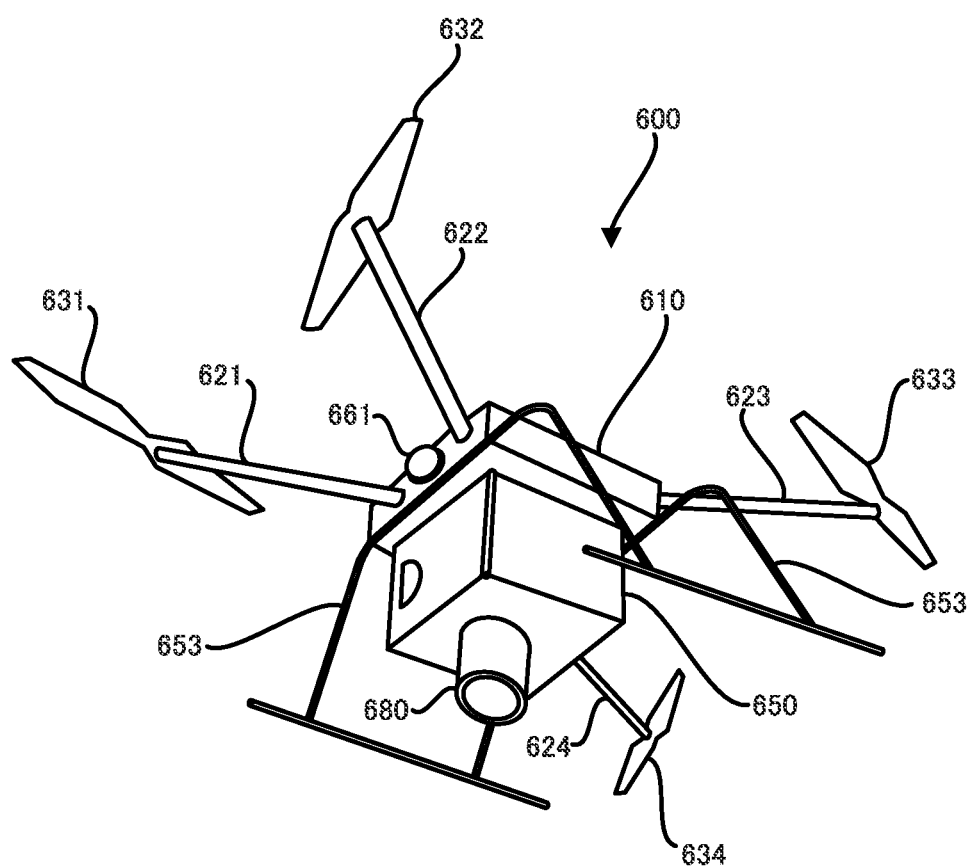

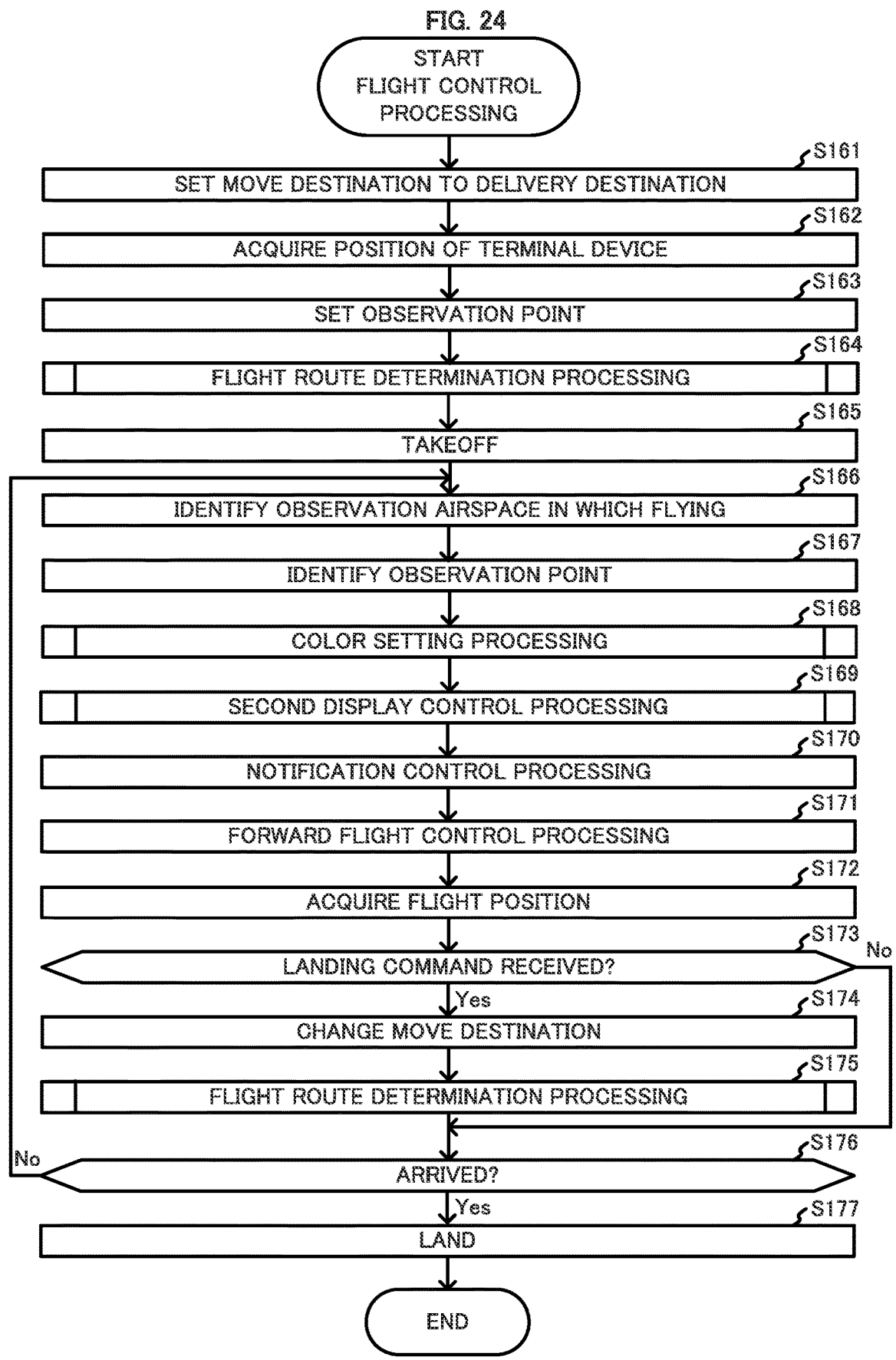

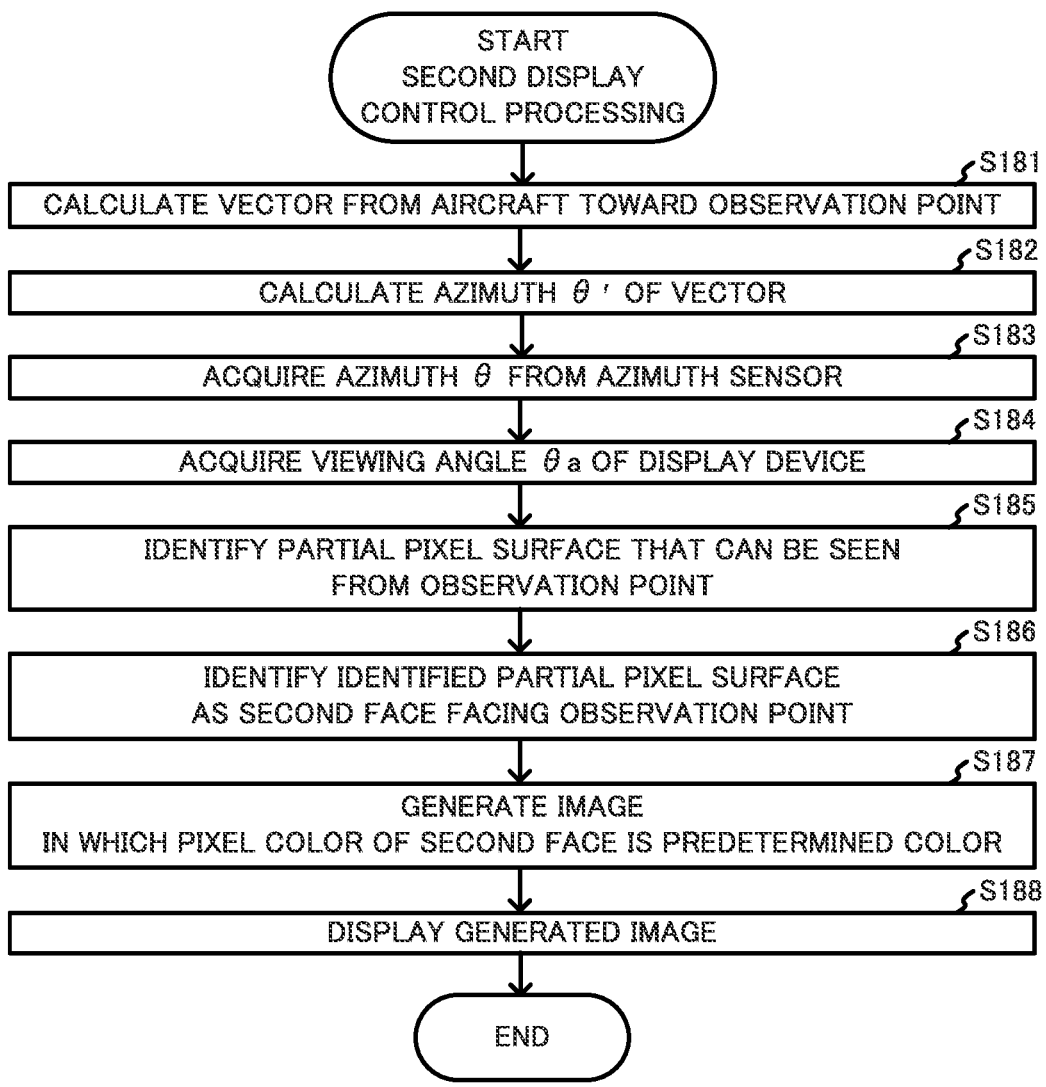

AIRCRAFT, SYSTEM, AND METHOD

CROSS-REFERENCE TO RELATED APPLICATION

This application claims the benefit of Japanese Patent Application No. 2020-140338, filed on Aug. 21, 2020, the entire disclosure of which is incorporated by reference herein.

FIELD

This application relates generally to an aircraft, a system, and a method.

BACKGROUND

In the related art, aircraft that spray smoke to improve visibility are known (for example, Japanese Unexamined Patent Application Publication No 2019-182379).

SUMMARY

However, since the aircraft of Japanese Unexamined Patent Application Publication No. 2019-182379 sprays smoke regardless of the position of a predetermined point that includes the point where viewing is performed, there is a problem in that the visibility of the aircraft from the predetermined point cannot be improved.

In light of such problems, an objective of the present invention is to provide an aircraft, a system, and a method whereby the visibility of the aircraft from a predetermined point can be improved.

An aircraft according to a first aspect of the present disclosure that achieves the objective described above is an aircraft configured to fly in a space, the aircraft including:
- at least one memory storing program code; and
- at least one processor configured to read the program code and operate as instructed by the program code, wherein the program code includes
  - acquisition code configured to cause the at least one processor to acquire information expressing a position of the aircraft, and
  - control code configured to cause the at least one processor to
    - perform, based on the acquired information, orientation change control for causing a first face to face a predetermined point, the first face being a face of the aircraft and having a predetermined color, or
    - perform, based on the acquired information, display control for causing an image of the predetermined color to be displayed on a second face, the second face being a display surface of a display device of the aircraft and a partial face or an entire face facing the predetermined point.

BRIEF DESCRIPTION OF THE DRAWINGS

A more complete understanding of this application can be obtained when the following detailed description is considered in conjunction with the following drawings, in which:

FIG. 8 is a drawing illustrating an example of a terminal table stored in the aircraft according to Embodiment 1;

FIG. 9 is a drawing illustrating an example of a map table stored in the aircraft;

FIG. 18 is a drawing illustrating an example of a terminal table stored in the aircraft according to Embodiment 4;

FIGS. 19A and 19B are a flowchart illustrating an example of flight control processing executed by the aircraft according to Embodiment 4;

FIG. 23 is an appearance configuration drawing illustrating an example of the appearance of an aircraft according to Embodiment 6;

FIG. 24 is a flowchart illustrating an example of flight control processing executed by the aircraft according to Embodiment 6;

FIG. 25 is a flowchart illustrating an example of second display control processing executed by the aircraft.

DETAILED DESCRIPTION

Embodiment 1

Hereinafter, Embodiment 1 of the present disclosure is described while referencing the attached drawings.

Figure 1:
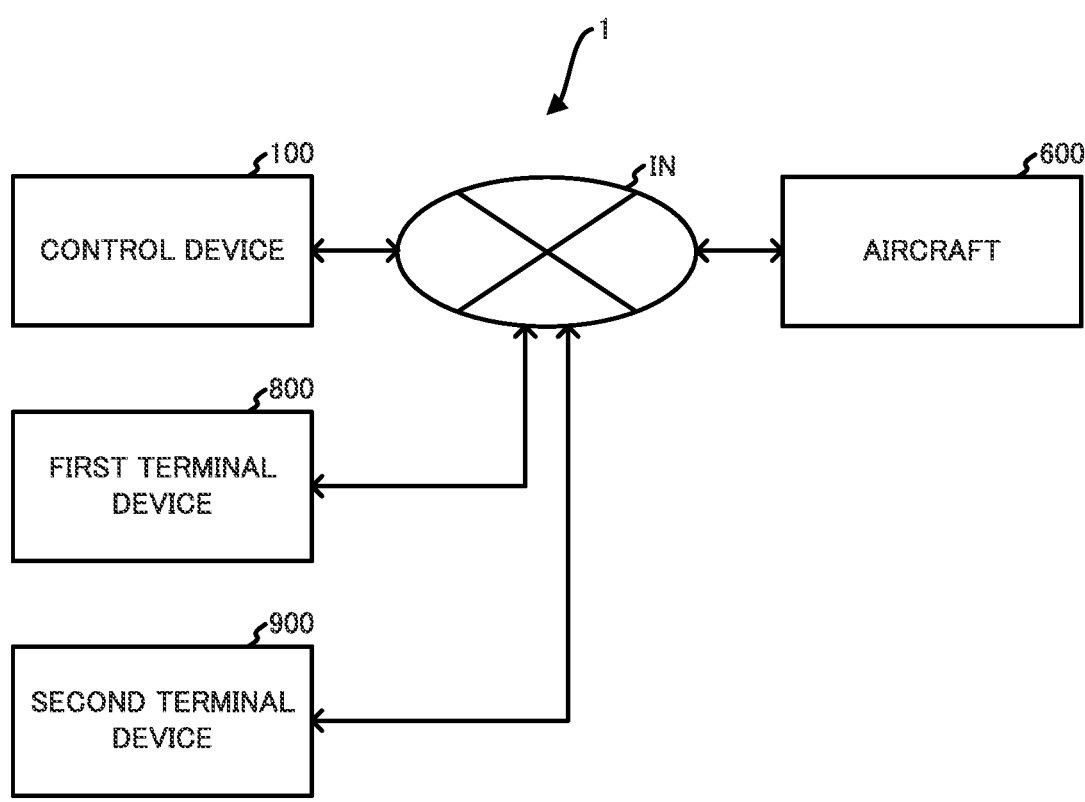
FIG. 1 is a system configuration drawing illustrating a configuration example of a flight system according to Embodiment 1 of the present disclosure.
Figure 2:
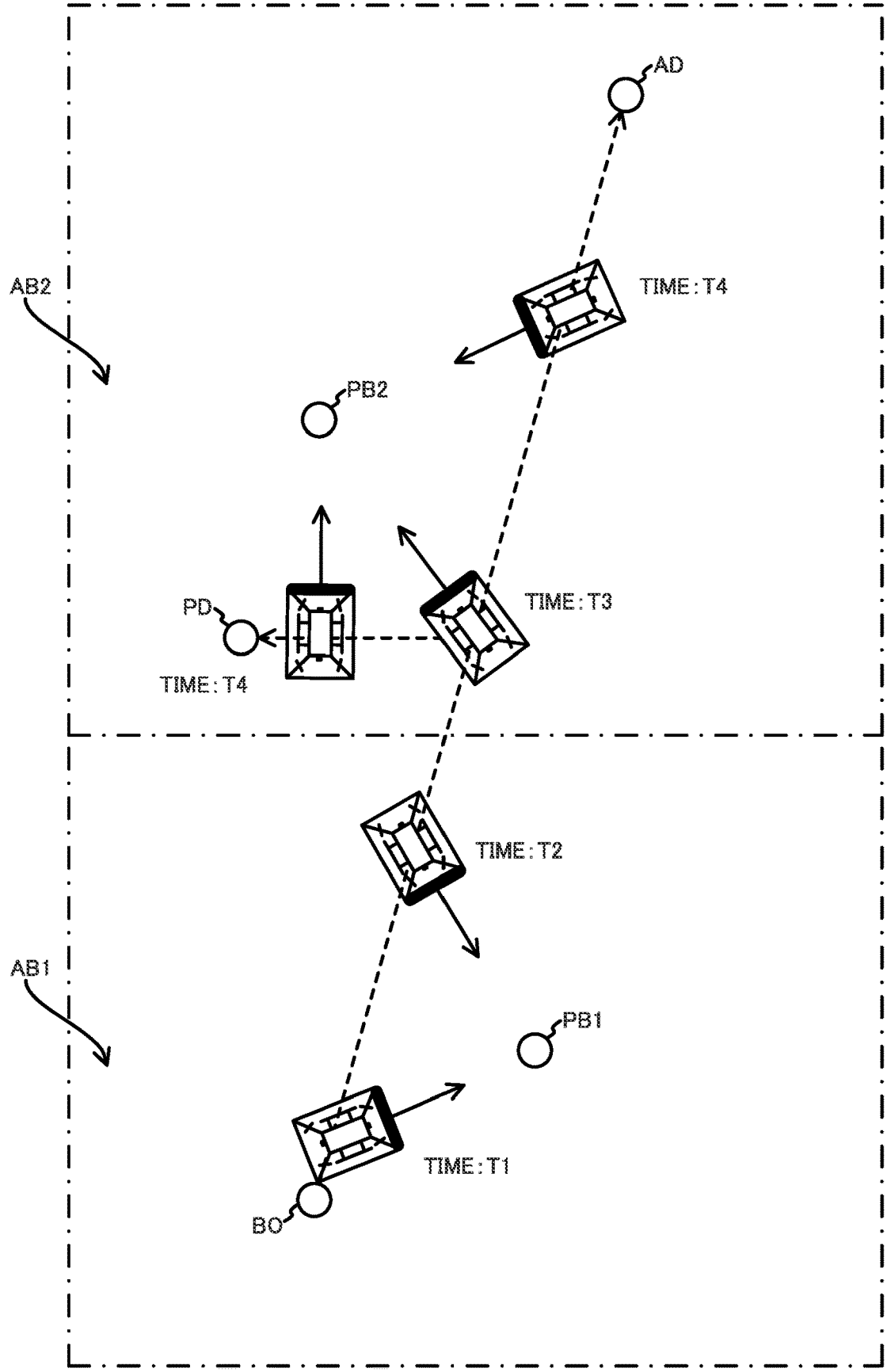
FIG. 2 is a drawing illustrating an example of the orientation of an aircraft according to Embodiment 1.

A flight system 1 according to Embodiment 1 of the present disclosure includes a control device 100 such as illustrated in FIG. 1 that controls the delivery of articles performed in a predetermined delivery area, and an aircraft 600 that, in accordance with the control of the control device 100, flies to a delivery destination AD of an article such as illustrated in FIG. 2 while storing the article. As such, the flight system 1 is also referred to as a "delivery system."

The delivery area consists of a predetermined first area and a predetermined second area different from the first area. An office BO of a delivery company such as illustrated in FIG. 2 that is to perform the delivery of the article is provided in the first area. In the present embodiment, to facilitate comprehension, the first area and the second area are referred to collectively as "predetermined areas."

Airspace above the first area is referred to as a "first observation airspace AB1" and, while the aircraft 600 is flying in the first observation airspace AB1, a worker (hereinafter referred to as "first observer") of the delivery company observes the aircraft 600 to detect an anomaly that has occurred in the aircraft 600. In the present embodiment, the worker of the delivery company observes the aircraft 600, but the present embodiment is not limited thereto, and the worker may monitor the aircraft 600.

Airspace above the second area is referred to as a "second observation airspace AB2" and, while the aircraft 600 is flying in the second observation airspace AB2, a worker (hereinafter referred to as "second observer"), different from the first observer, of the delivery company observes the aircraft 600.

As such, the flight system 1 illustrated in FIG. 1 further includes a first terminal device 800 carried by the first observer and a second terminal device 900 carried by the second observer. The first observer uses a communication function of the first terminal device 800 to report, to an operator of the aircraft 600, an observation result of the aircraft 600, and second observer using a communication function of the second terminal device 900 to report, to the operator, an observation result of the aircraft 600 flying in the second observation airspace AB2. In the present embodiment, in order to facilitate comprehension, the first observer and the second observer are referred to collectively as "observers", and the first terminal device 800 and the second terminal device 900 are referred to collectively as "terminal devices."

The operator operates the control device 100 to cause the control device 100 to send a flight command commanding flight to the delivery destination AD of the article. When the aircraft 600 receives the flight command, the aircraft 600 flies autonomously toward the delivery destination AD without necessarily requiring operation by the operator.

In one example, when an anomaly of the aircraft 600 such as smoke coming from the aircraft 600 is reported by an observer via a terminal device, the operator performs, on the control device 100, an operation for causing the aircraft 600 to land at a location that is nearest to the position of the aircraft 600 and where landing of the aircraft 600 is not forbidden. In accordance with the operation, the control device 100 sends, to the aircraft 600, a landing command commanding landing, and when the landing command is received, the aircraft 600 autonomously lands in accordance with the landing command.

In the present embodiment, examples of the location where landing of the aircraft 600 is not forbidden include roads, river beaches, and parks, but are not limited thereto and may be any location provided that the location is different from a location where landing is forbidden.

Figure 3:
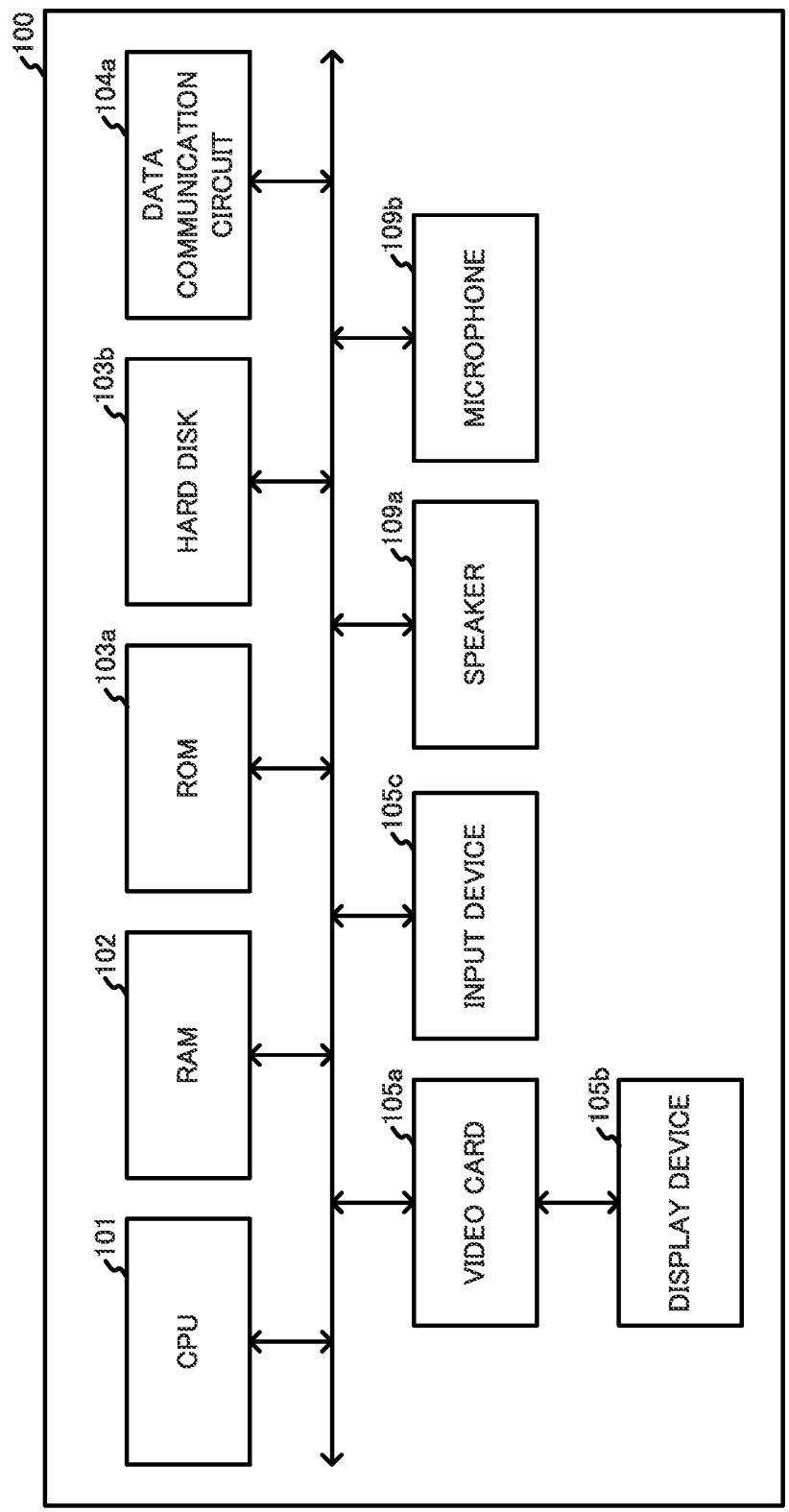
FIG. 3 is a hardware configuration drawing illustrating a configuration example of a control device of the flight system.

The control device 100 is implemented as a server device and is installed at the office BO of the delivery company. As illustrated in FIG. 3, the control device 100 includes a central processing unit (CPU) 101, a random access memory (RAM) 102, a read-only memory (ROM) 103a, a hard disk 103b, a data communication circuit 104a, a video card 105a, a display device 105b, an input device 105c, a speaker 109a, and a microphone 109b.

The CPU 101 of the control device 100 carries out total control of the control device 100 by executing programs stored in the ROM 103a or the hard disk 103b. The RAM 102 temporarily stores data to be processed at the times of execution of the programs by the CPU 101. In the present embodiment, it is described that the control device 100 includes one CPU 101, but the present embodiment is not limited thereto and the control device 100 may include a plurality of CPUs. Additionally, the control device 100 may include a plurality of RAMs or a plurality of hard disks.

Various types of programs are stored in the ROM 103a and the hard disk 103b of the control device 100. The hard disk 103b also stores various types of data and tables in which data is stored that are used in the execution of the programs. The control device 100 may include flash memory instead of the hard disk 103b.

The data communication circuit 104a of the control device 100 is implemented as a network interface card (MC) and, in one example, in accordance with a communication standard such as long term evolution (LTE) or 5th Generation (5G), carries out data communication using radio waves with a non-illustrated base station that is connected to the internet IN. Thus, the data communication circuit 104a of the control device 100 carries out data communication with which the aircraft 600, the first terminal device 800, and the second terminal device 900 that are connected to the internet IN.

The video card 105a of the control device 100 renders images on the basis of digital signals output from the CPU 101, and outputs image signals that represent the rendered images. The display device 105b is implemented as an electroluminescence (EL) display, and displays images in accordance with the image signals output from the video card 105a. The control device 100 may include a plasma display panel (PDP) or a liquid crystal display (LCD) instead of the EL display. The input device 105c is implemented as one or more of a keyboard, a mouse, a touch pad, and a button, and inputs signals in accordance with operations performed by the operator.

The speaker 109a of the control device 100 outputs sound in accordance with signals output by the CPU 101, and the microphone 109b inputs signals expressing ambient sound.

Figure 4:
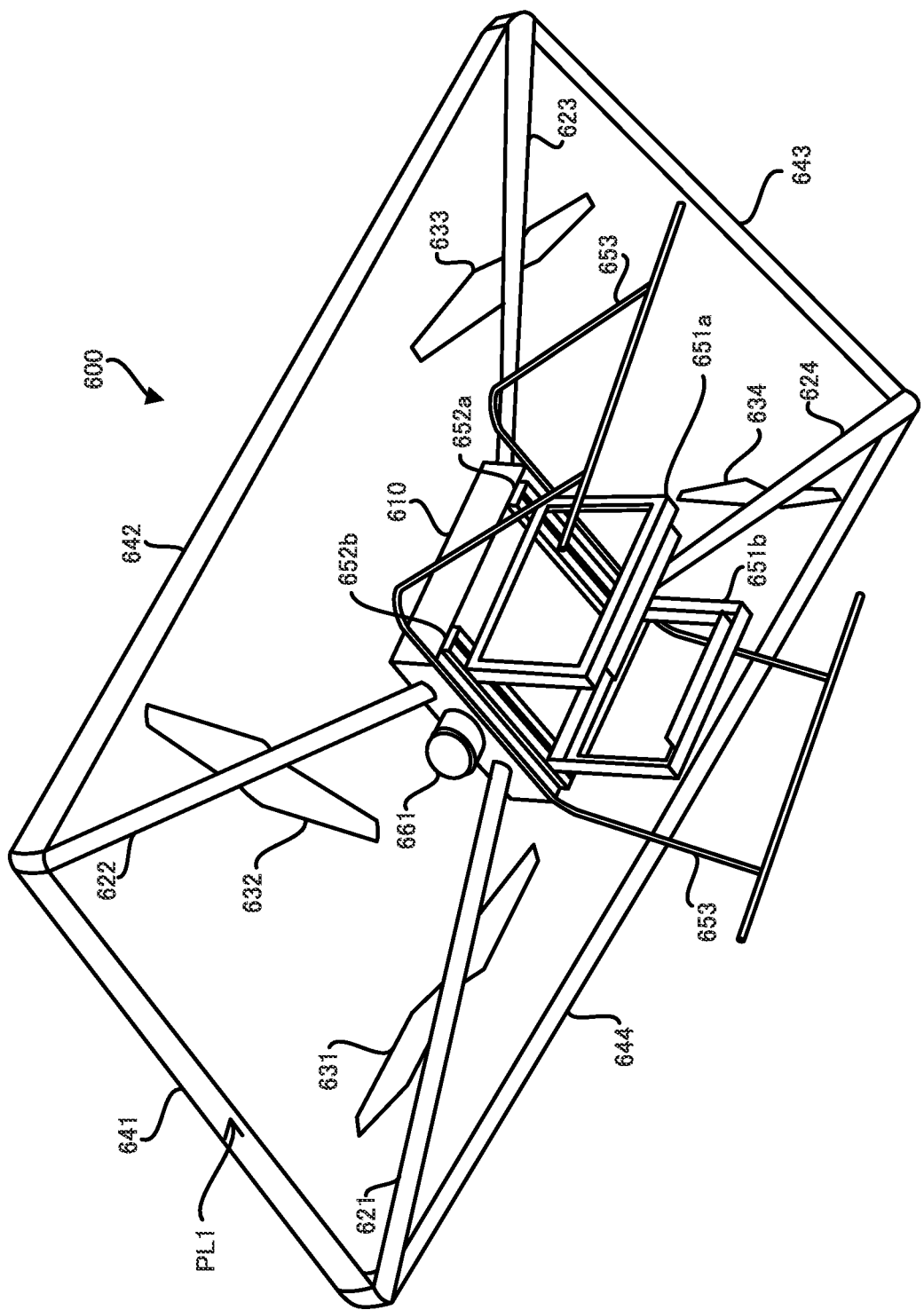
FIG. 4 is an appearance configuration drawing illustrating an example of the appearance of the aircraft according to Embodiment 1.

In one example, the aircraft 600 is implemented as an unmanned aircraft such as a drone or the like, and is landed at the office BO of the delivery company. The aircraft 600 includes a control device 610 that has a rectangular parallelepiped shape such as illustrated in FIG. 4. The control device 610 controls the attitude and the flight of the aircraft 600.

In the present embodiment, the surface, of the plurality of surfaces of the control device 610, serving as the reference is called the "front surface", and a direction that is parallel to the normal direction of the front surface and that is toward the outside of the control device 610 is called the "forward direction" of the aircraft 600. Moreover, one of the surfaces, of the plurality of surfaces of the control device 610, perpendicular to the front surface is called the "top surface", and a direction that is parallel to the normal direction of the top surface and that is toward the outside of the control device 610 is called the "upward direction" of the aircraft 600.

The aircraft 600 includes propeller arms 621, 622 and 623, 624 that respectively protrude in a forward-right direction and in a forward-left direction from the front surface of the control device 610, and in a backward-left direction and in a backward-right direction from the back surface of the control device 610. Furthermore, the aircraft 600 includes propellers 631 to 634 that are respectively installed at positions from connection portions between the propeller arms 621 to 624 and the control device 610 to tips of the propeller arms 621 to 624, and non-illustrated motors that cause the propellers 631 to 634 to rotate in accordance with control by the control device 610.

The aircraft 600 includes a band-shaped propeller guard 641 that is stretched over the tip of the propeller arm 621 and the tip of the propeller arm 622 and that protects the propellers 631 and 632 from collisions with people, animals, or objects other than the aircraft 600. Furthermore, the aircraft 600 includes a propeller guard 642 that is stretched over the tips of the propeller arms 622 and 623 and that protects the propellers 632 and 633, a propeller guard 643 that is stretched over the tips of the propeller arms 623 and 624 and that protects the propellers 633 and 634, and a propeller guard 644 that is stretched over the tips of the propeller arms 621 and 624 and that protects the propellers 631 and 634.

In one example, the propeller guards 641 to 644 are constituted by members that have flexibility and elasticity such as carbon fiber reinforced plastic or the like, and buffer the impact caused by collisions with people, animals, or objects.

One face (hereinafter referred to as "first face") PL1 of two wide faces of the propeller guard 641 is colored by a predetermined color. In contrast, the wide face different from the first face PL1 of the propeller guard 641 and the two wide faces of each of the propeller guards 642 to 644 are colored by a color different from the predetermined color.

In the present embodiment, the color of the first face PL1 is predetermined as a color that has higher visibility than the color of the wide face different from the first face PL1 of the propeller guard 641 and the color of the two wide faces of each of the propeller guards 642 to 644. In the present embodiment, the color that has higher visibility includes a warning color, and the warning color includes a complementary color of the color of the environment in which the aircraft 600 flies. The color of the environment in which the aircraft 600 files includes the color of the background of the aircraft 600 observed when the observers, including the first observer and the second observer, observe the aircraft 600.

In the present embodiment, the aircraft 600 flies over a town lined with brown brick houses and, as such, the observed color of the background of the aircraft 600 is brown. Therefore, in the present embodiment, the first face PL1 of the propeller guard 641 is colored, in advance, by blue-green, which is a complementary color of brown.

In the present embodiment, the wide face different from the first face PL1 of the propeller guard 641 and the two wide faces of each of the propeller guards 642 to 644 are colored, in advance, by red, which is the corporate color of the delivery company.

The propeller guard 641 is installed on the tips of the propeller arms 621 and 622 so that the first face PL1 of the warning color that is the predetermined color faces the forward direction of the aircraft 600. In the present embodiment, the phrase "the first face PL1 faces the forward direction of the aircraft 600" means that the normal direction of the first face PL1 and the forward direction of the aircraft 600 are parallel, and that the first face PL1 is positioned more to the front side than the wide face of the propeller guard 641 different than the first face PL1. Due to this, the first face PL1 that is facing the forward direction of the aircraft 600 can be visually recognized from in front of the aircraft 600.

The propeller guard 642 is installed on the tips of the propeller arms 622 and 623 such that the wide face faces the right direction of the aircraft 600. The propeller guards 643 and 644 are respectively installed on the tips of the propeller arms 621, 623, and 624 such that the wide faces face the backward direction and the left direction of the aircraft 600.

The aircraft 600 includes, beneath the control device 610, a first holding frame 651a that surrounds and holds four sides of one side face (hereinafter referred to as "first surrounded face") of a rectangular parallelepiped shaped cardboard in which the article is packaged, and a second holding frame 651b that surrounds and holds four sides of a side face (hereinafter referred to as "second surrounded face") opposite the face surrounded and held by the first holding frame 651a. Furthermore, the aircraft 600 includes, on a bottom surface of the control device 610, guide rails 652a and 652b that extend in a normal direction of the first surrounded face and the second surrounded face, suspend the first holding frame 651a and the second holding frame 651b, and have the movement direction of the first holding frame 651a and the second holding frame 651b as the extending direction.

Furthermore, the aircraft 600 includes a non-illustrated motor that causes the first holding frame 651a and the second holding frame 651b to surround and hold the article by moving, in accordance with the control of the control device 610, the first holding frame 651a and the second holding frame 651b in directions so as to approach each other. This non-illustrated motor causes the first holding frame 651a and the second holding frame 651b to release the surrounded and held article by moving, in accordance with the control of the control device 610, the first holding frame 651a and the second holding frame 651b in directions so as to separate from each other.

Furthermore, the delivery aircraft 600 includes a support leg 653 that protrudes in the downward direction from the bottom surface of the control device 610 and that supports the control device 610.

Moreover, the aircraft 600 includes a light detection and ranging (LiDAR) sensor 661 provided on the front surface of the control device 610, and a non-illustrated LiDAR sensor provided on the back surface of the control device 610.

The LiDAR sensor 661 on the front surface emits laser light in a plurality of directions such that, when the forward direction of the aircraft 600 is a reference direction, an azimuth formed with that reference direction is in a range of −90 degrees to +90 degrees and an elevation angle formed with the forward direction of the aircraft 600 is in a range of −90 degrees to +90 degrees. The LiDAR sensor 661 on the front surface receives the reflected light of the emitted laser light, and measures the distance to a plurality of reflection points at which the laser light reflects. The distance is measured on the basis of an amount of time from the emission of the laser light to the receiving of the reflected light. Next, for the plurality of reflection points, the LiDAR sensor 661 calculates, on the basis of the emission direction of the laser light and the measured distance, coordinate values in a three-dimensional coordinate system of the aircraft 600 in which the center point of the aircraft 600 is the origin point. Thereafter, the LiDAR sensor 661 on the front surface outputs the calculated coordinate values of the plurality of reflection points to the control device 610.

The LiDAR sensor on the back surface emits infrared laser light in a plurality of directions such that, when the backward direction of the aircraft 600 is the reference direction, an azimuth formed with that reference direction is in a range of −90 degrees to +90 degrees and an elevation angle formed with the backward direction of the aircraft 600 is in a range of −90 degrees to +90 degrees. Additionally, the LiDAR sensor on the back surface calculates the coordinate values in the three-dimensional coordinate system of the aircraft 600 for the plurality of reflection points of the emitted laser light, and outputs the calculated coordinate values of the plurality of reflection points to the control device 610.

The reason that the LiDAR sensor 661 on the front surface and the LiDAR sensor on the back surface output the coordinate values of the plurality of reflection points to the control device 610 is because the control device 610 identifies the coordinate values, the sizes, and the like in three-dimensional space of objects in all directions based on the aircraft 600.

Figure 5:
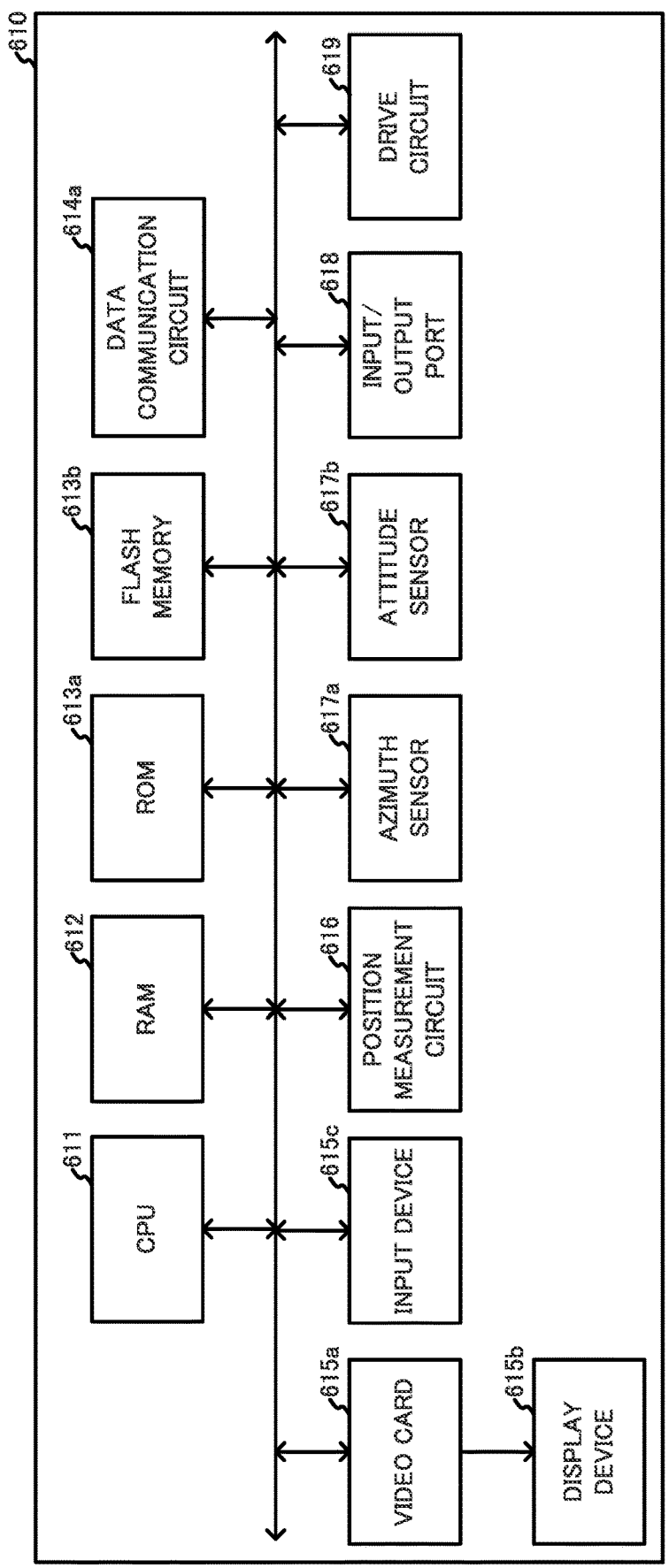
FIG. 5 is a hardware configuration drawing illustrating a configuration example of a control device of the aircraft.

As illustrated in FIG. 5, the control device 610 of the aircraft 600 includes a CPU 611, a RAM 612, a ROM 613a, a flash memory 613b, a data communication circuit 614a, a video card 615a, a display device 615b, an input device 615c, a position measurement circuit 616, an azimuth sensor 617a, an attitude sensor 617b, an input/output port 618, and a drive circuit 619.

The configurations and functions of the CPU 611, the RAM 612, the ROM 613a, the data communication circuit 614a, the video card 615a, the display device 615b, and the input device 615c of the control device 610 of the aircraft 600 are the same as the configurations and functions of the CPU 101, the RAM 102, the ROM 103a, the data communication circuit 104a, the video card 105a, the display device 105b, and the input device 105c of the control device 100 illustrated in FIG. 3. In the present embodiment, it is described that the control device 610 of the aircraft 600 includes one CPU 611, but the present embodiment is not limited thereto and the control device 610 may include a plurality of CPUs. Additionally, the control device 610 may include a plurality of RAMs or a plurality of hard disks.

The flash memory 613b of the aircraft 600 stores various types of data and tables in which data is stored that are used in the execution of the programs. The control device 610 of the aircraft 600 may include a hard disk instead of the flash memory 613b.

The data communication circuit 614a of the aircraft 600 carries out data communication wirelessly with the control device 100, the first terminal device 800, and the second terminal device 900 that are connected across the internet IN.

The position measurement circuit 616 of the aircraft 600 is implemented as a quasi-zenith satellite system (QZSS) circuit. The position measurement circuit 616 receives a signal emitted from a quasi-zenith satellite, measures the latitude, longitude, and altitude expressing the position of the aircraft 600 on the basis of the received signal, and outputs a signal expressing the measured latitude, longitude, and altitude. A configuration is possible in which, instead of a QZSS circuit, the position measurement circuit 616 is implemented as a global positioning system (GPS) circuit that receives a GPS signal emitted from a GPS satellite, and measures the latitude, longitude, and altitude expressing the position of the aircraft 600 on the basis of the received GPS signal.

In one example, the azimuth sensor 617a of the aircraft 600 is implemented as a magnetic sensor, measures an azimuth θ, formed by the forward direction of the aircraft 600 and the reference direction, counter-clockwise from the reference direction, and outputs a signal expressing the measured azimuth θ. In the present embodiment, the reference direction is north, but is not limited thereto, and the reference direction may be any direction including, for example, south, east, west, or southeast.

In one example, the attitude sensor 617b of the aircraft 600 is implemented as a gyroscope. The attitude sensor 617b detects a minimum depression angle φ formed by the forward direction of the aircraft 600 and the horizontal plane, and outputs a signal expressing the detected depression angle φ.

The input/output port 618 of the aircraft 600 is connected to non-illustrated cables connected to each of the LiDAR sensor 661 on the front surface and the LiDAR sensor on the back surface. The input/output port 618 inputs, to the CPU 611, the signals expressing the coordinate values outputted by each of the LiDAR sensor 661 on the front surface and the LiDAR sensor on the back surface.

The drive circuit 619 of the aircraft 600 is connected to non-illustrated cables that are connected to each of the non-illustrated motors that rotate the propellers 631 to 634 illustrated in FIG. 4, and a cable that is connected to the non-illustrated motor that moves the first holding frame 651a and the second holding frame 651b. The drive circuit 619 drives, in accordance with the signals output by the CPU 611, motors that rotate the propellers 631 to 634 or the motor that moves the first holding frame 651a and the second holding frame 651b.

In the present embodiment, a description of a specific example is given below in which an article is brought into the office BO of the delivery company. Here, a geographical location AD such as illustrated in FIG. 2 that is included in the second area is designated as the delivery destination of the article.

When the article is brought into the office BO, the operator working at the office BO reads a slip affixed to cardboard in which the article is packaged, and confirms the address of the delivery destination AD of the article. Then, the operator arranges the article between the first holding frame 651a and the second holding frame 651b of the aircraft 600 and, then, performs, on the input device 615c of the control device 610 of the aircraft 600, an operation for causing the first holding frame 651a and the second holding frame 651b to surround and hold the article.

When the input device 615c of the aircraft 600 inputs a signal corresponding to the operation, the CPU 611 of the aircraft 600 outputs, to the drive circuit 619, a control signal for causing the first holding frame 651a and the second holding frame 651b to move in directions so as to approach each other, thereby causing the article to be stored in the aircraft 600.

Thereafter, the operator performs, on the input device 105c of the control device 100, an operation for inputting the address of the delivery destination AD. When the input device 105c of the control device 100 inputs a signal corresponding to the operation performed by the operator, the CPU 101 of the control device 100 acquires, on the basis of the inputted signal, information expressing the address of the delivery destination AD of the article. Next, the CPU 101 acquires, from the hard disk 103b, information that expresses latitude, longitude and altitude that is stored in advance in association with the acquired information expressing the address.

Next, the CPU 101 of the control device 100 generates a flight command that includes the information expressing the position of the delivery destination AD in terms of latitude, longitude, and altitude, and that commands to fly to the delivery destination AD. Then, the CPU 101 outputs the generated flight command to the data communication circuit 104*a* with the aircraft 600 as the destination, thereby controlling the aircraft 600, so as to cause the aircraft 600 to fly to the delivery destination AD.

Figure 6:
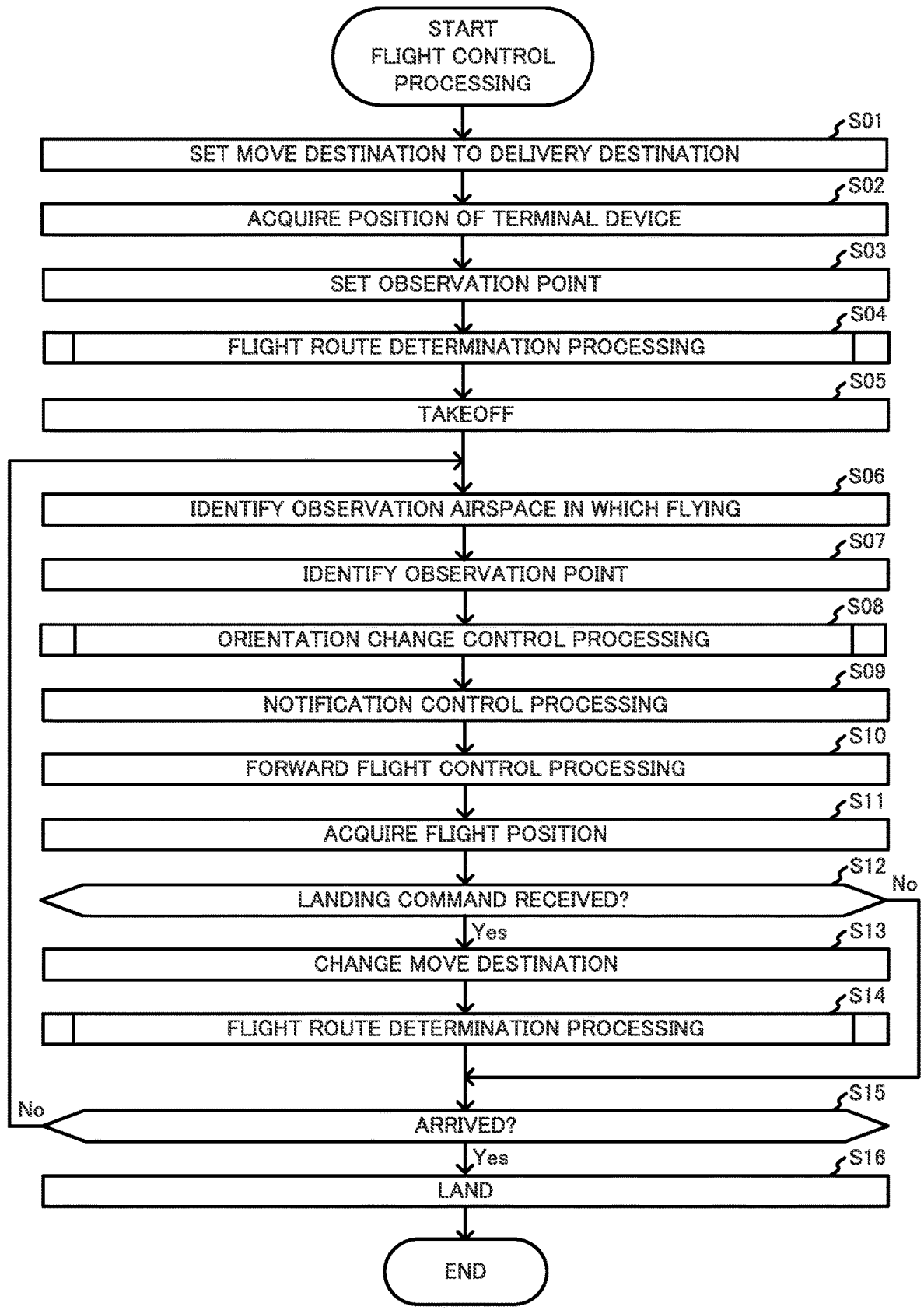
FIG. 6 is a flowchart illustrating an example of flight control processing executed by the aircraft according to Embodiment 1.

When the data communication circuit 614*a* of the aircraft 600 receives the flight command from the control device 100, the CPU 611 of the aircraft 600 executes flight control processing such as illustrated in FIG. 6 in which control is performed for causing the propellers 631 to 634 to rotate in order to fly in accordance with the flight command.

Figure 7:
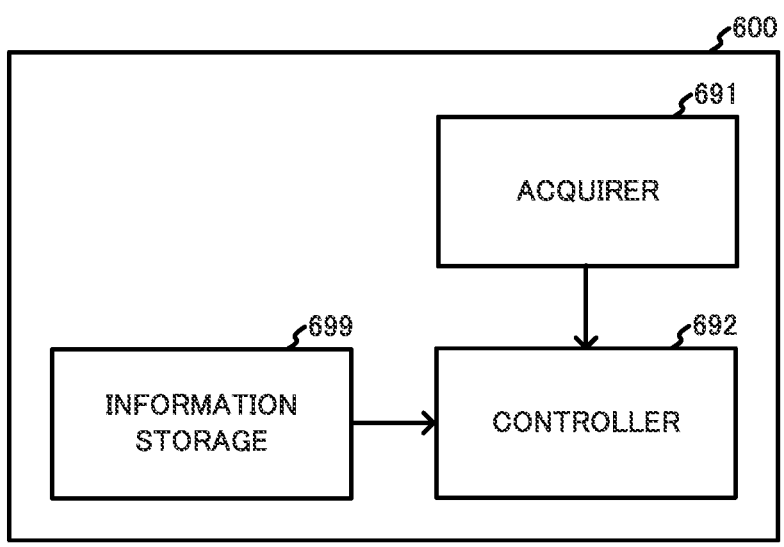
FIG. 7 is a functional block diagram illustrating an example of the functions of the control device of the aircraft.

As a result, the CPU 611 of the aircraft 600 functions as an acquirer 691 such as illustrated in FIG. 7 that acquires, on the basis of a signal output from the position measurement circuit 616, information expressing the position of the aircraft 600. Additionally, the CPU 611 functions as a controller 692 that controls the flight of the aircraft 600 on the basis of the acquired information.

Furthermore, the flash memory 613*b* of the aircraft 600 functions as an information storage 699 in which a terminal table such as illustrated in FIG. 8 is stored in advance. The terminal table stores information related to the first terminal device 800 and the second terminal device 900 that are carried respectively by the first observer and the second observer that perform observation of the aircraft 600.

A plurality of records is stored in advance in the terminal table. Information expressing a communication address assigned to the first terminal device 800 of the first observer, and information expressing the range of the first observation airspace AB1 in which observation is performed by the first observer are associated and stored in advance in the first record. Note that information expressing a position of a point (hereinafter referred to as "first observation point") PB1 where the first observer performs observation of the aircraft 600 is not stored in the first record. This is because executing the flight control processing of FIG. 6 results in the information expressing the position of the first observation point PB1 being stored in the first record. The information expressing the position of the first observation point PB1 is stored as a result of executing the flight control processing because the first observer performs observation at a position within the first area where the first observer feels that it is easy to observe the first observation airspace AB1 and, as such, it is difficult to store the information expressing the position of the first observation point PB1 in advance.

Information expressing a communication address assigned to the second terminal device 900 carried by the second observer, and information expressing the range of the second observation airspace AB2 of the second observer are associated and stored in advance in the second record of the terminal table. Note that information expressing a position of a point (hereinafter referred to as "second observation point") PB2 where the second observer performs observation is not stored in advance in the second record, and the information expressing the position of the second observation point PB2 is stored in the second record as a result of executing the flight control processing. In the present embodiment, to facilitate comprehension, the first observation point PB1 and the second observation point PB2 are referred to collectively as "observation points."

In the present embodiment, the information expressing the range of the first observation airspace AB1 is information expressing the positions of a plurality of apexes of the first observation airspace AB1 in terms of latitude, longitude, and altitude, and the information expressing the range of the second observation airspace AB2 is information expressing the positions of a plurality of apexes of the second observation airspace AB2 in terms of latitude, longitude, and altitude. The information expressing the position of the first observation point PB1 is information expressing the position of the first observation point PB1 in terms of latitude, longitude, and altitude, and the information expressing the position of the second observation point PB2 is information expressing the position of the second observation point PB2 in terms of latitude, longitude, and altitude, but the present embodiment is not limited thereto.

A non-illustrated landing location table is stored in advance in the information storage 699 of the aircraft 600. A plurality of pieces of information expressing, in terms of latitude, longitude, and altitude, positions of locations that are candidates for a landing location at which the aircraft 600 is to be landed in cases in which an anomaly of the aircraft 600 is observed is stored in advance in the landing location table. The locations that are candidates for the landing location are locations different from locations at which landing of the aircraft 600 is forbidden, and may be any location provided that the location has an area greater than or equal to a predetermined area.

A map table such as illustrated in FIG. 9 is stored in advance in the information storage 699 of the aircraft 600. Information related to a map, on which positions and shapes of man-made structures and natural objects located in the delivery area where the aircraft 600 performs deliveries are noted is stored in the map table.

A plurality of records is stored in advance in the map table. Information expressing the range of the first area, and map information expressing a map of the first area are associated and stored in advance in the first record. Information expressing the range of the second area, and map information of the second area are associated and stored in advance in the second record.

In the present embodiment, the information expressing the range of the first area is information expressing, in terms of latitude, longitude, and altitude, the positions of a plurality of apexes of the first area. The map information of the first area includes information expressing the positions and shapes of man-made structures located in the first area, and information expressing the positions and shapes of natural objects located in the first area. The man-made structures include houses, buildings, churches, and bridges, and the information expressing the positions and shapes of the man-made structures is information expressing, in terms of latitude, longitude, and altitude, positions of a plurality of apexes of the man-made structures. The natural objects include trees and rocks, and the information expressing the positions and shapes of the natural objects is information expressing, in terms of latitude, longitude, and altitude, positions of a plurality of apexes of the natural objects. However, the present embodiment is not limited thereto.

Likewise, in the present embodiment, the information expressing the range of the second area is information expressing, in terms of latitude, longitude, and altitude, positions of a plurality of apexes of the second area. However, the present embodiment is not limited thereto. Additionally, in the present embodiment, the map information of the second area includes information expressing the positions and shapes of man-made structures located in the second area, and information expressing the positions and shapes of natural objects located in the second area.

When the execution of the flight control processing starts, the acquirer 691 of the aircraft 600 acquires the flight command from the data communication circuit 614a, and acquires the information expressing, in terms of latitude, longitude, and altitude, the position of the delivery destination AD included in the acquired flight command. Next, the controller 692 of the aircraft 600 sets the move destination of the aircraft 600 to the delivery destination AD expressed by the acquired information (step S01).

Next, the acquirer 691 of the aircraft 600 acquires, from the terminal table of FIG. 8, the communication address of the first terminal device 800, and the controller 692 outputs, to the data communication circuit 614a with the communication address of the first terminal device 800 as the destination, a request requesting the return of the information expressing, in terms of latitude, longitude, and altitude, the position of the first terminal device 800. Likewise, the acquirer 691 acquires the communication address of the second terminal device 900, and the controller 692 outputs a request with the communication address of the second terminal device 900 as the destination.

The data communication circuit 614a of the aircraft 600 sends the requests to the first terminal device 800 and the second terminal device 900 and, then, receives the information expressing the positions from the first terminal device 800 and the second terminal device 900. Next, the acquirer 691 of the aircraft 600 acquires these pieces of information from the data communication circuit 614a (step S02).

Next, the controller 692 of the aircraft 600 sets the point, located at the position of the first terminal device 800 expressed in the information acquired by the acquirer 691, as the first observation point PB1 that is the point at which the first observer carrying the first terminal device 800 performs observation and that is a point at which the first face PL1 of the predetermined color of the aircraft 600 is to be faced. Additionally, the controller 692 associates the information expressing the position of the first observation point PB1 with the communication address of the first terminal device 800, and stores the associated information in the first record of the terminal table of FIG. 8. Likewise, the controller 692 sets the point, located at the position of the second terminal device 900, as the second observation point PB2 that is the point at which the second observer carrying the second terminal device 900 performs observation and that is a point at which the first face PL1 of the aircraft 600 is to be faced, and stores the information expressing the position of the second observation point PB2 in the second record of the terminal table (step S03).

In the present embodiment, to facilitate comprehension, the first observation point PB1 set in step S03 is also referred to as the "first set point PB1", the second observation point PB2 is also referred to as the "second set point PB2", and the first set point PB1 and the second set point PB2 are collectively referred to as "predetermined points."

Figure 10:
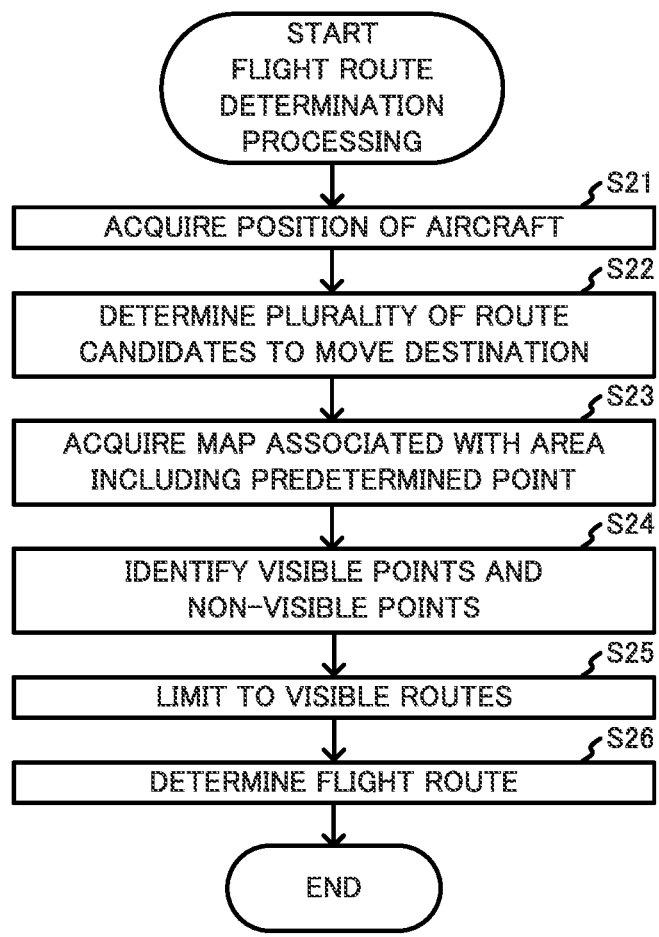
FIG. 10 is a flowchart illustrating an example of flight route determination processing executed by the aircraft.

Thereafter, flight route determination processing such as illustrated in FIG. 10 is executed for determining, as a flight route of the aircraft 600, a route that is from the position of the aircraft 600 to the move destination AD set in step S01 and that passes through both a point that is visually recognizable from the first observation point PB1 that is the first set point, and a point that is visually recognizable from the second observation point PB2 that is the second set point (step S04).

When the execution of the flight route determination processing starts, the acquirer 691 of the aircraft 600 acquires, on the basis of a signal output from the position measurement circuit 616, the information expressing the position of the aircraft 600 (step S21).

Next, the controller 692 of the aircraft 600 reads, from the information storage 699, a non-illustrated partial route table in which information related to partial routes on which the aircraft 600 can fly, such as roads and rivers, for example, is stored. A plurality of records is stored in advance in the partial route table. The latitude, longitude, and altitude of a start node of an edge that is a partial route, the latitude, longitude, and altitude of an end node of the edge, and information expressing a distance of the edge are associated and stored in advance in each of the records.

Next, the controller 692 of the aircraft 600 executes a route search algorithm such as, for example, Dijkstra's algorithm using the latitudes, longitudes, and altitudes of the position of the aircraft 600, the start nodes and end nodes of the plurality of edges, and the delivery destination AD. Thus, the controller 692 determines a plurality of whole routes from the position of the aircraft 600 to the move destination AD by combining partial routes.

Next, from among the determined plurality of whole routes, the controller 692 of the aircraft 600 determines a first to a Nth whole route (where N is a natural number) in order of shortness of total flight distance as route candidates that are candidates of the flight route on which the aircraft 600 is to be caused to fly (step S22). Then, the controller 692 generates information expressing the route candidates. The information expressing the route candidates includes information expressing, in terms of latitude, longitude, and altitude, positions of a plurality of passing points included in the route candidates, and information expressing a passing order of the plurality of passing points.

Next, the controller 692 of the aircraft 600 acquires the map information associated, in the map table illustrated in FIG. 9, with the information expressing the ranges of the predetermined areas that include the predetermined points (step S23).

To realize this, the controller 692 of the aircraft 600 acquires, from the first record of the terminal table illustrated in FIG. 8, the information expressing the position of the first observation point PB1 that is first set point. Additionally, the controller 692 acquires the information expressing the range of the first area and the information expressing the range of the second area that are stored in the map table of FIG. 9. Then, the controller 692 identifies, on the basis of the acquired information, that the area including the first observation point PB1 is the first area. Next, the controller 692 acquires the map information associated, in the map table, with the information expressing the range of the first area.

Likewise, the controller 692 of the aircraft 600 acquires, from the second record of the terminal table, the information expressing the position of the second observation point PB2 that is the second set point, identifies that the area including the second observation point PB2 is the second area, and acquires the map information of the second area.

Next, the acquirer 691 of the aircraft 600 acquires, from the first record of the terminal table illustrated in FIG. 8, the information expressing the range of the first observation airspace AB1 that is associated with the information expressing the position of the first observation point PB1. Then, the controller 692 identifies, from among the plurality of passing points included in the N route candidates, a non-visible point that is included in the first observation airspace AB1 and that is not visible from the first observation point PB1. Additionally, the controller 692 identifies, from among the plurality of passing points included in the N route candidates, a visible point that is included in the first observation airspace AB1 and that is visible from the first observation point PB1.

To realize this, the controller 692 of the aircraft 600 executes processing for setting, as a target route, one of untargeted route candidates of the N route candidates. Next, from among the plurality of passing points included in the target route, the controller 692 identifies, on the basis of the information expressing, in terms of latitude, longitude, and altitude, the positions of the passing points and information expressing, in terms of latitude, longitude, and altitude, the plurality of apexes of the first observation airspace AB1, a plurality of passing points included in the first observation airspace AB1. Then, the controller 692 executes processing for setting, as a target passing point, one of untargeted passing points of the plurality of passing points included in the first observation airspace AB1.

Thereafter, the controller 692 of the aircraft 600 calculates, on the basis of the latitude, longitude, and altitude of the first observation point PB1 and the latitude, longitude, and altitude of the target passing point, an equation of a line segment from the first observation point PB1 to the target passing point. Then, the controller 692 determines, on the basis of the information expressing the latitude, longitude, and altitude of the plurality of apexes of each of the man-made structures and natural objects included in the map information of the first area, and the calculated equation of the line segment, whether or not a man-made structure or natural object exists that intersects the line segment from the first observation point PB1 to the target passing point.

When the controller 692 of the aircraft 600 determines that a man-made structure or natural object exists that intersects the line segment, a man-made structure or natural object exists that obstructs the viewing of the target passing point from the first observation point PB1 and, as such, the target passing point is identified as a non-visible point of the first observation point PB1. In contrast, when the controller 692 determines that no man-made structures or natural objects exist that intersect the line segment, the target passing point is identified as a visible point of the first observation point PB1.

Thereafter, the controller 692 of the aircraft 600 repeats the processing described above from the processing for setting, as a target passing point, one of untargeted passing points until all of the plurality of passing points included in the target route and the first observation airspace AB1 are targeted. Next, when all of the plurality of passing points included in the target route and the first observation airspace AB1 are targeted, the controller 692 repeats the processing described above from the processing for setting, as a target route, one of the untargeted route candidates until all of the N route candidates are targeted.

After identifying the visible points and the non-visible points of the first observation point PB1, the controller 692 of the aircraft 600 identifies, from among the plurality of passing points included in the N route candidates, non-visible points that are included in the second observation airspace AB2 and that are not visible from the second observation point PB2. Additionally, the controller 692 identifies, from among the plurality of passing points included in the N route candidates, visible points that are included in the second observation airspace AB2 and that are visible from the second observation point PB2 (step S24).

Thereafter, the controller 692 of the aircraft 600 excludes, from the N route candidates determined in step S22, routes on which all of the passing points included in the first observation airspace AB1 are non-visible points of the first observation point PB1, and routes on which all of the passing points included in the second observation airspace AB2 are non-visible points of the second observation point PB2. As a result, the controller 692 limits the route candidates to visible routes on which at least one of the passing points included in the first observation airspace AB1 is a visible point of the first observation point PB1 and at least one of the passing points included in the second observation airspace AB2 is a visible point of the second observation point PB2 (step S25).

Next, for each of the plurality of route candidates that are limited to visible routes, the controller 692 of the aircraft 600 calculates the total number of passing points and the total number of visible points, and calculates a ratio of the visible points in the calculated total number of passing points (hereinafter referred to as "visibility ratio").

Thereafter, the controller 692 of the aircraft 600 selects, on the basis of the calculated visibility ratios, one route candidate from the plurality of route candidates, and determines the selected route candidate as the flight route (step S26). In the present embodiment, the controller 692 determines the route candidate having the highest calculated visibility ratio as the flight route, but the present embodiment is not limited thereto. Then, the controller 692 ends the execution of the flight route determination processing.

When the flight route is determined, the controller 692 of the aircraft 600 generates a control signal for causing the propellers 631 to 634 to rotate to takeoff from the office BO, and outputs the generated control signal to the drive circuit (step S05 of FIG. 6). In the present embodiment, a description of a specific example is given below in which the aircraft 600 takes off from the office BO at a time T1.

After taking off from the office BO, the controller 692 of the aircraft 600 identifies, on the basis of the information expressing the position of the aircraft 600 acquired in step S21 of FIG. 10, and the information expressing the range of the first observation airspace AB1 and the information expressing the range of the second observation airspace AB2 that are stored in the terminal table illustrated in FIG. 8, that the aircraft 600 is flying in the first observation airspace AB1 (step S06). The controller 692 identifies that the aircraft 600 is flying the in first observation airspace AB1 immediately after taking off from the office BO because, in the present embodiment, as illustrated in FIG. 2, the airspace including the space above the office BO is predetermined as the first observation airspace AB1.

Next, the acquirer 691 of the aircraft 600 acquires, from the terminal table illustrated in FIG. 8, the information expressing the position of the first observation point PB1 that is associated with the information expressing the range of the first observation airspace AB1. As a result, the acquirer 691 identifies that observation of the aircraft 600 is being performed at the first observation point PB1 that is the first set point (step S07).

Figure 11:
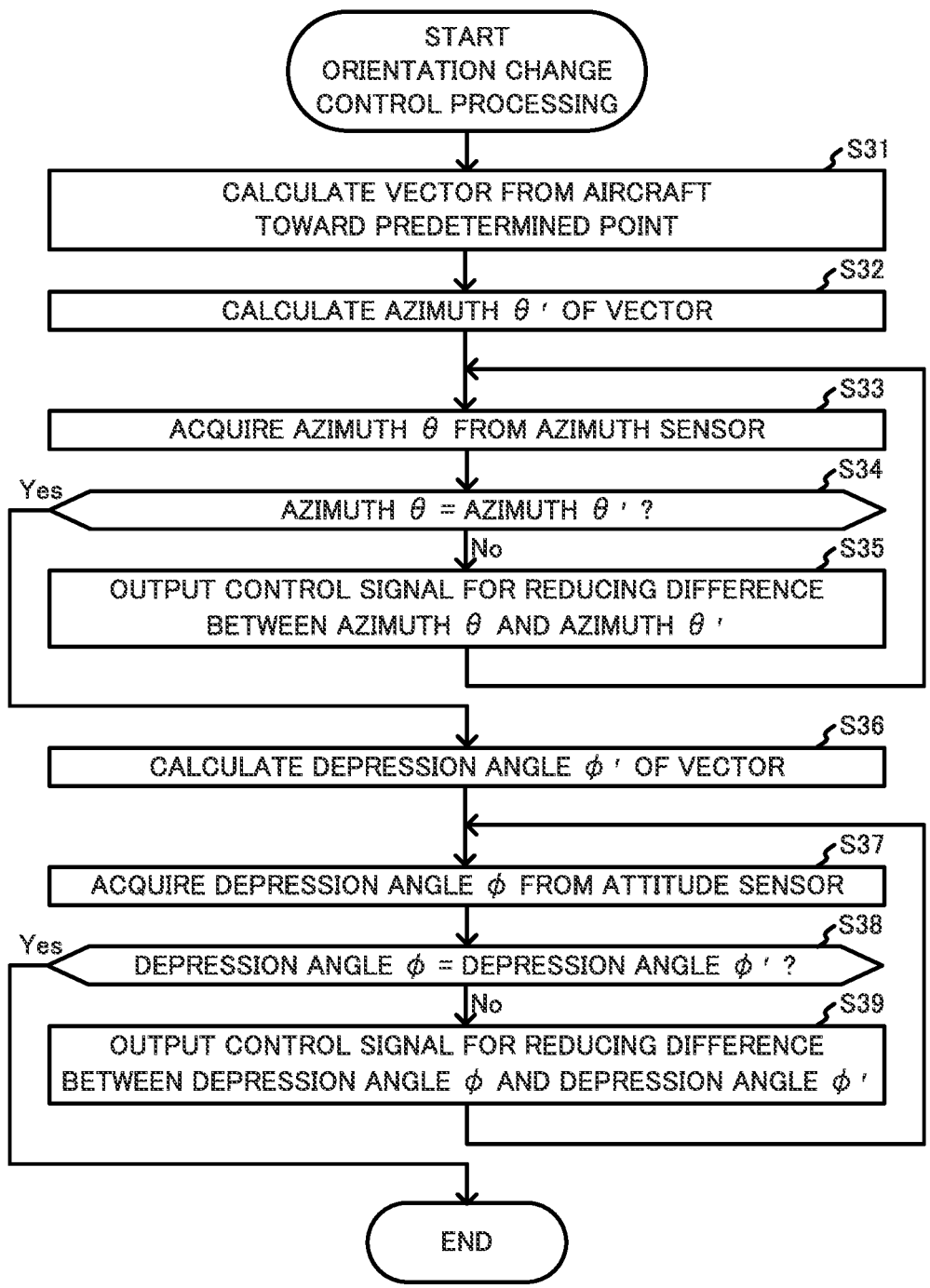
FIG. 11 is a flowchart illustrating an example of orientation change control processing executed by the aircraft according to Embodiment 1.

Next, the controller 692 of the aircraft 600 executes orientation change control processing such as illustrated in FIG. 11 for causing the first face PL1 of the predetermined color to face the first set point PB1, identified in step S07, from among the points predetermined in step S03 (step S08). In the present embodiment, in order to facilitate comprehension, the orientation change control processing executed to cause the first face PL1 to face the first observation point PB1 that is the first set point is referred to as "first orientation change control processing."

When the execution of the first orientation change control processing starts, the controller 692 of the aircraft 600 calculates a vector from the aircraft 600 toward to the first observation point PB1 on the basis of the information expressing, in terms of latitude, longitude, and altitude, the position of the first observation point PB1, and the information expressing, in terms of latitude, longitude, and altitude, the position of the aircraft 600 (step S31). Next, the controller 692 calculates, on the basis of the calculated vector, an azimuth θ' formed by the vector and the reference direction (step S32).

Thereafter, the acquirer 691 of the aircraft 600 acquires, on the basis of a signal output from the azimuth sensor 617a, information expressing an azimuth θ formed by the forward direction of the aircraft 600 and the reference direction (step S33).

Next, the controller 692 of the aircraft 600 determines whether or not the azimuth θ of the forward direction of the aircraft 600 and the azimuth θ' of the vector toward the first observation point PB1 match (step S34). At this time, when the controller 692 determines that the azimuth θ and the azimuth θ' do not match (step S34; No), the controller 692 reads, from the information storage 699, information expressing a predetermined angle Δθ. Next, the controller 692 generates a control signal for reducing the difference between the azimuth θ and the azimuth θ' by the angle Δθ expressed in the read information, while causing the aircraft 600 to fly.

To realize this, the controller 692 of the aircraft 600 determines whether or not the azimuth θ of the forward direction of the aircraft 600 is greater than the azimuth θ' of the vector from the aircraft 600 toward the first observation point PB1. When the controller 692 determines that the azimuth θ of the forward direction is greater than the azimuth θ' of the vector, the controller 692 generates a control signal for causing the aircraft 600 to rotate the angle Δθ clockwise on the horizontal plane while flying. The aircraft 600 is caused to rotate clockwise because, in the present embodiment, the azimuths θ and θ' are measured counterclockwise from the reference direction.

In contrast, when the controller 692 of the aircraft 600 determines that the azimuth θ of the forward direction is less than the azimuth θ' of the vector, the controller 692 generates a control signal for causing the aircraft 600 to rotate the angle Δθ counterclockwise on the horizontal plane while flying.

Thereafter, the controller 692 of the aircraft 600 outputs the generated control signal to the drive circuit 619 (step S35) and, then, repeats the processing described above from step S33.

In step S34, when the controller 692 of the aircraft 600 determines that the azimuth θ and the azimuth θ' match (step S34; Yes), the controller 692 calculates the minimum depression angle φ' formed by the vector from the aircraft 600 toward the first observation point PB1 and the horizontal plane (step S36).

Thereafter, the acquirer 691 of the aircraft 600 acquires, on the basis of a signal output from the attitude sensor 617b, the information expressing the minimum depression angle φ formed by the forward direction of the aircraft 600 and the horizontal plane (step S37).

Next, the controller 692 of the aircraft 600 determines whether or not the depression angle φ of the forward direction of the aircraft 600 and the depression angle φ' of the vector toward the first observation point PB1 match (step S38). At this time, when the controller 692 determines that the depression angle φ of the forward direction and the depression angle φ' of the vector do not match (step S38; No), the controller 692 reads the information expressing the predetermined angle Δφ from the information storage 699.

Next, the controller 692 generates a control signal for reducing the difference between the depression angle φ and the depression angle φ' by the predetermined angle Δφ, while causing the aircraft 600 to fly.

To realize this, the controller 692 of the aircraft 600 determines whether or not the depression angle φ of the forward direction of the aircraft 600 is greater than the depression angle φ' of the vector toward the first observation point PB1. When the controller 692 determines that the depression angle φ of the forward direction is greater than the depression angle φ' of the vector, the controller 692 generates a control signal for reducing the depression angle φ by the angle Δφ, while causing the aircraft 600 to fly. In contrast, when the controller 692 determines that the depression angle φ of the forward direction is less than the depression angle φ' of the vector, the controller 692 generates a command signal for increasing the depression angle φ by the angle Δφ, while causing the aircraft 600 to fly.

Next, the controller 692 of the aircraft 600 outputs the generated control signal to the drive circuit 619 (step S39) and, then, repeats the processing described above from step S37.

In step S38, when the controller 692 of the aircraft 600 determines that the depression angle φ and the depression angle φ' match (step S38; Yes), the controller 692 ends the execution of the orientation change control processing.

When, due to the orientation change control processing being executed in step S08 of FIG. 6, the first face PL1 of the predetermined color is caused to face the first observation point PB1, a first facing notification, informing that the first face PL1 is facing the position of the first terminal device 800 set as the first observation point PB1, is generated. Next, the controller 692 performs first notification control processing for causing the first facing notification to be sent to the first terminal device 800 by outputting the generated first facing notification to the data communication circuit 614a with the first terminal device 800 as the destination (step S09).

Next, the controller 692 of the aircraft 600 generates, on the basis of the information expressing, in terms of latitude, longitude, and altitude, the position of the aircraft 600, and information expressing, in terms of latitude, longitude, and altitude, the position of a most immediate passing point in the passing order among the one or plurality of unpassed passing points included in the flight route, a control signal for flying so as to reduce the distance between the position of the aircraft 600 and the position of the most immediate passing point in the passing order. Then, the controller 692 executes forward flight control processing for causing the aircraft 600 to fly forward on the flight route by outputting the generated control signal to the drive circuit 619 (step S10).

Next, the acquirer 691 of the aircraft 600 acquires the information expressing the position of the aircraft 600 by executing the same processing as in step S21 of FIG. 10 (step S11).

Thereafter, the controller 692 of the aircraft 600 determines whether or not the data communication circuit 614a receives a landing command from the control device 100 (step S12).

In the present embodiment, a description of a specific example is given below in which the first observer does not discover an anomaly of the aircraft 600 and, as such, an anomaly of the aircraft 600 is not reported to the operator, and the operator does not perform an operation on the control device 100 for sending a landing command.

In step S12, when the controller 692 of the aircraft 600 determines that a landing command is not received (step S12; No), the controller 692 calculates the distance from the position of the aircraft 600 to the position of the move destination AD on the basis of the information expressing, in terms of latitude, longitude, and altitude, the position of the aircraft 600 and the information expressing, in terms of latitude, longitude, and altitude, the position of the move destination AD. Next, the controller 692 determines, on the basis of whether or not the calculated distance is less than or equal to a predetermined distance, whether or not the aircraft 600 has arrived at the move destination AD (step S15).

In the present embodiment, a description of a specific example is given below in which, at a time T2 after the time T1, the aircraft 600 executes the processing of step S15 while flying in the first observation airspace AB1 toward the move destination AD.

At the time T2, since the calculated distance is greater than the predetermined distance, the controller 692 of the aircraft 600 determines that the aircraft 600 has not arrived at the move destination AD (step S15; No), and repeats the processing described above from step S06.

Next, the controller 692 of the aircraft 600 identifies that the aircraft 600 is flying in the first observation airspace AB1 and that observation is being performed at the first observation point PB1 (steps S06 and S07).

Thereafter, the controller 692 of the aircraft 600 again executes the first orientation change control processing for causing the first face PL1 of the predetermined color to face the first observation point PB1 (step S08). The first orientation change control processing is executed again because the first face PL1, which has faced the first observation point PB1 as a result of the previous first orientation change control processing executed at the time T1, is facing a direction different than the direction facing the first observation point PB1 due to the flying of the aircraft 600 from time T1 to the time T2.

After the first orientation change control processing is executed again, the processing of steps S09 to S12 is executed and, as a result, the aircraft 600 sends the first facing notification to the first terminal device 800, flies forward on the flight route, and acquires the information expressing the position of the aircraft 600.

In the present embodiment, a description of a specific example is given below in which the first observer does not discover an anomaly of the aircraft 600 in a period from the time T2 to a time T3 and, as such, the landing command is not sent. Additionally, in the present embodiment, a description of a specific example is given below in which the aircraft 600 enters the second observation airspace AB2 at a time after the time T2, and the processing of step S15 is executed again at that time T3 while the aircraft 600 is flying in the second observation airspace AB2 toward the move destination AD.

As such, at the time T3, after the controller 692 of the aircraft 600 determines that the landing command is not received (step S12; No), the controller 692 determines that the aircraft 600 has not arrived at the move destination (step S15; No), and repeats the processing described above from step S06. Next, the controller 692 of the aircraft 600 identifies that the aircraft 600 is flying in the second observation airspace AB2 and that observation is being performed at the second observation point PB2 (steps S06 and S07).

Thereafter, the controller 692 of the aircraft 600 executes the orientation change control processing of FIG. 11 to cause the first face PL1 of the predetermined color to face the second observation point PB2 (step S08). In the present embodiment, in order to facilitate comprehension, the orientation change control processing executed to cause the first face PL1 to face the second observation point PB2 that is the second set point is referred to as "second orientation change control processing."

When the execution of the second orientation change control processing starts, the controller 692 of the aircraft 600 calculates a vector from the aircraft 600 toward the second observation point PB2 on the basis of the information expressing, in terms of latitude, longitude, and altitude, the position of the second observation point PB2, and the information expressing, in terms of latitude, longitude, and altitude, the position of the aircraft 600 (step S31). Thereafter, the controller 692 of the aircraft 600 executes the processing of steps S32 to S39 to cause the first face PL1 of the predetermined color to face the second observation point PB2 on the basis of the calculated vector (steps S32 to S39) and, then, ends the execution of the second orientation change control processing.

Thereafter, the controller 692 of the aircraft 600 generates a second facing notification informing that the first face PL1 of the predetermined color is facing the second observation point PB2 set at the position of the second terminal device 900. Next, the controller 692 outputs the generated second facing notification to the data communication circuit 614a with the second terminal device 900 as the destination. As a result, the controller 692 performs second notification control processing for causing the data communication circuit 614a to send the second facing notification to the second terminal device 900 (step S09).

In the present embodiment, in order to facilitate comprehension, the first facing notification and the second facing notification are referred to collectively as "facing notifications", and the first notification control processing and the second notification control processing are referred to collectively as "notification control processings."

Next, the processing of steps S10 and S11 is executed and, as a result, the aircraft 600 flies forward on the flight route, and acquires the information expressing the position of the aircraft 600 (steps S10 and S11).

Thereafter, the controller 692 of the aircraft 600 determines whether or not the data communication circuit 614a receives a landing command from the control device 100 (step S12).

In the present embodiment, a description of a specific example is given below in which, at the time T3, the second observer discovers an anomaly of the aircraft 600 and reports the anomaly of the aircraft 600 to the operator and, as such, the operator performs an operation on the control device 100 for sending a landing command.

In step S12, the controller 692 of the aircraft 600 determines that a landing command is received (step S12; Yes). Next, the acquirer 691 of the aircraft 600 acquires, from the non-illustrated landing location table stored in the information storage 699, a plurality of pieces of information expressing positions of locations that are candidates for a landing location. Next, from among the plurality of locations whose positions are expressed in the acquired information, the controller 692 of the aircraft 600 determines, as the landing location at which the aircraft 600 is to be landed, a location PD closest to the position of the aircraft 600 expressed in the information acquired in step S11. Thereafter, the controller 692 changes the move destination of the aircraft 600 to the determined landing location PD (step S13). In the present embodiment, a description of a specific example is given below in which the determined landing location PD is included in the second area directly below the second observation airspace AB2 in which the aircraft 600 is flying.

After the move destination is changed in step S13, the flight route determination processing illustrated in FIG. 10 is executed to determine, as the flight route of the aircraft 600, a route that is from the position of the aircraft 600 to the changed move destination and that passes through a point that is visually recognizable from the second observation point PB2 (step S14).

In the present embodiment, a description of a specific example is given below in which, at a time T4 after the time T3, the aircraft 600 executes the processing of step S15 again while flying in the second observation airspace AB2 toward the move destination that has been changed to the landing location PD.

At the time T4, the controller 692 of the aircraft 600 determines that the aircraft 600 has not arrived at the move destination (step S15; No), and repeats the processing described above from step S06. Next, the controller 692 executes the processing of steps S06 to S12 (steps S06 to S12). As a result, the aircraft 600 flies forward on the flight route to the landing location PD with the first face PL1 of the predetermined color facing the second observation point PB2, and sends, to the second terminal device 900 located at the second observation point PB2, the second facing notification informing that the first face PL1 is facing the second observation point PB2.

Next, when the controller 692 of the aircraft 600 determines that the landing command is not received (step S12; No) and, thereafter, determines that the aircraft 600 has arrived at the landing location PD that is the move destination (step S15; Yes), the controller 692 generates a control signal for causing the aircraft 600 to land and outputs the generated control signal to the drive circuit 619 (step S16). Then, the controller 692 ends the execution of the flight control processing.

Figure 12:
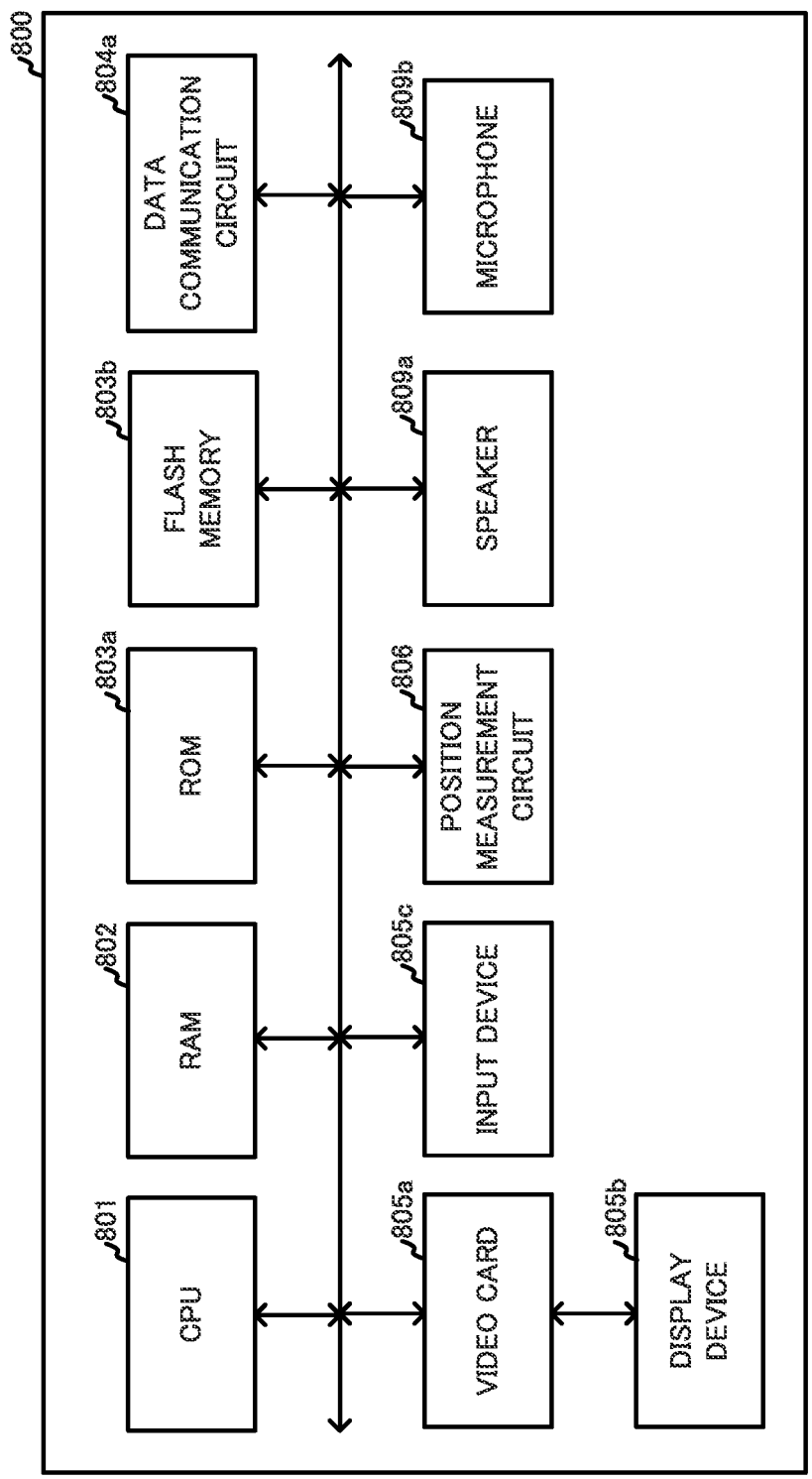
FIG. 12 is a hardware configuration diagram illustrating a configuration example of a terminal device.

In one example, the first terminal device 800 carried by the first observer that observes the aircraft 600 is implemented as a smartphone and, as illustrated in FIG. 12, includes a CPU 801, a RAM 802, a ROM 803a, a flash memory 803b, a data communication circuit 804a, a video card 805a, a display device 805b, an input device 805c, a position measurement circuit 806, a speaker 809a, and a microphone 809b.

The configurations and functions of the CPU 801, the RAM 802, the ROM 803a, the data communication circuit 804a, the video card 805a, the display device 805b, the input device 805c, the speaker 809a, and the microphone 809b of the first terminal device 800 are the same as the configurations and functions of the CPU 101, the RAM 102, the ROM 103a, the data communication circuit 104a, the video card 105a, the display device 105b, the input device 105c, the speaker 109a, and the microphone 109b of the control device 100 illustrated in FIG. 3. In the present embodiment, a description is given in which the first terminal device 800 includes one CPU 801, but the present embodiment is not limited thereto and the first terminal device 800 may include a plurality of CPUs. Additionally, the first terminal device 800 may include a plurality of RAMs or a plurality of hard disks.

The configurations and functions of the flash memory 803b and the position measurement circuit 806 of the first terminal device 800 are the same as the configurations and functions of the flash memory 613b and the position measurement circuit 616 of the aircraft 600 illustrated in FIG. 5.

The first observer performs, on the input device 805c of the first terminal device 800, an operation for executing a communication application that is stored in advance in the flash memory 803b of the first terminal device 800. When the input device 805c outputs a signal corresponding to the operation, the CPU 801 of the first terminal device 800 starts the execution of the communication application.

The operator that receives a report from the first observer carrying the first terminal device 800 performs, on the input device 105c of the control device 100, an operation for executing a communication application that is stored in advance in the hard disk 103b of the control device 100. When the input device 105c outputs a signal corresponding to the operation, the CPU 101 of the control device 100 starts the execution of the communication application.

When the first observer sees that the aircraft 600 has taken off from the office BO and entered the first observation airspace AB1, the first observer starts the observation of the aircraft 600, and dictates observation results at predetermined timings or random timings. The microphone 809b of the first terminal device 800 converts the speech of the first observer to electronic signals, and inputs the electronic signals into the CPU 801. The CPU 801 generates, on the basis of the inputted signals, speech information expressing the speech of the first observer and outputs the generated speech information to the data communication circuit 804a with the control device 100 as the destination.

When the data communication circuit 104a of the control device 100 receives the speech information, a signal expressing the speech of the first observer is generated on the basis of the speech information, and the generated signal is output to the speaker 109a. The speaker 109a of the control device 100 outputs speech in accordance with the outputted signal, and the operator operating the control device 100 confirms the outputted speech.

When the operator confirms, by the speech outputted from the speaker 109a, that there is an anomaly in the aircraft 600, the operator performs, on the input device 105c of the control device 100, an operation for causing the aircraft 600 to land. When the input device 105c of the control device 100 inputs a signal corresponding to the operation, the CPU 101 of the control device 100 outputs a landing command to the data communication circuit 104a with the aircraft 600 as the destination. In contrast, when the operator confirms that there are no anomalies in the aircraft 600, the operator does not perform the operation for causing the aircraft 600 to land.

When the data communication circuit 804a of the first terminal device 800 receives the first facing notification sent from the aircraft 600 that is flying in the first observation airspace AB1, the CPU 801 of the first terminal device 800 reads information expressing a notification sound that is stored in advance in the flash memory 803b. Next, the CPU 801 outputs a signal to the speaker 809a on the basis of the read information, and the speaker 809a outputs the notification sound on the basis of the outputted signal.

The configuration and functions of the second terminal device 900 are the same as the configuration and functions of the first terminal device 800.

According to these configurations, the aircraft 600 that flies in space includes the acquirer 691 that acquires information expressing the position of the aircraft 600, and the controller 692 that performs the orientation change control processing for causing, based on the acquired information, the first face PL1 to face the first observation point PB1. Here, the first face PL1 is a face of the aircraft 600 and having the predetermined color, and the first observation point PB1 is a predetermined point. As such, the aircraft 600 can improve the visibility of the aircraft 600 from the first observation point PB1 that is a predetermined point. Additionally, the controller 692 performs the orientation change control processing for causing the first face PL1 to face the second observation point PB2 and, as such, the visibility of the aircraft 600 from the second observation point PB2 can also be improved.

According to these configurations, the predetermined point is the first observation point PB1 that is located at the position at which the first observer performs observation of the aircraft 600. As such, if the first observer performs observation of the aircraft 600 at the first observation point PB1, the first observer can easily visually recognize the aircraft 600 on the basis of the predetermined color. The predetermined point is also the second observation point PB2 and, as such, the second observer can easily visually recognize the aircraft 600.

Since the predetermined color is a warning color, the first observer and the second observer can discover the aircraft 600 on the basis of the warning color. Furthermore, since the predetermined color is a complementary color of the color of the environment of the aircraft 600, and is enhanced by the color of the environment of the aircraft 600, the visibility of the first face PL1 that is colored by the predetermined color is improved.

The information expressing the predetermined range of the first area, and the map information in which the positions and shapes of man-made structures and natural objects located in the first area are noted, are associated and stored in the information storage 699 of the aircraft 600. The acquirer 691 of the aircraft 600 acquires, from the information storage 699, the map information that is associated with the information expressing the range of the first area that includes the first observation point PB1 that is the predetermined point. Furthermore, on the basis of the acquired map information, the controller 692 of the aircraft 600 determines, as the flight route of the aircraft 600, a route that passes through a passing point that is different than a passing point from which up to the first observation point PB1 that is the predetermined point the man-made structures or the natural objects exist, and performs forward flight control processing for causing the aircraft 600 to fly on the determined flight route. As such, the aircraft 600 can improve the visibility of the aircraft 600 from the first observation point PB1.

The information expressing the range of the second area and the map information of the second area are associated and stored in the information storage 699 of the aircraft 600, and the acquirer 691 acquires the map information that is associated with the information expressing the range of the second area that includes the second observation point PB2. Additionally, the controller 692 determines, on the basis of the acquired map information and as the flight route passes through a passing point that is different than a passing point from which up to the second observation point PB2 the man-made structures or the natural objects exist. As such, the aircraft 600 can improve the visibility of the aircraft 600 from the second observation point PB2.

According to these configurations, the aircraft 600 further includes the data communication circuit 614a that receives information expressing the positions of the terminal devices, including the first terminal device 800 and the second terminal device 900. Additionally, the controller 692 of the aircraft 600 sets, as the predetermined points, the points of the positions of the terminal devices expressed in the received information by setting the points of the positions as points at which the first face PL1 is to be faced. Furthermore, when the controller 692 of the aircraft 600 performs the orientation change control processing for causing the first face PL1 having the predetermined color to face the predetermined points, the controller 692 performs the notification control processing for causing the data communication circuit 614a to send, to the terminal device, a facing notification that informs that the first face PL1 is facing the position of the terminal device. As such, the aircraft 600 can improve the visibility of the aircraft 600 from the positions of the terminal devices and, also, can notify that the state of the aircraft 600 is in a highly visible state in which the first face PL1 having the predetermined color is facing the terminal devices. That is, when the first observer is carrying the first terminal device 800, the aircraft 600 can improve the visibility of the aircraft 600 from the first observation point PB1 where the first observer is located and, also, can notify that the first face PL1 having the predetermined color is facing the first observer. The first observer can, at the timing of the notification, more easily discover the aircraft 600 than the prior art by searching for the first face PL1 having the predetermined color. Likewise, when the second observer is carrying the second terminal device 900, the aircraft 600 can improve the visibility of the aircraft 600 from the second observation point PB2 and, also, can notify that the first face PL1 is facing the second observer.

Modified Example 1 of Embodiment 1

In Embodiment 1, a description of a specific example is given in which an anomaly of the aircraft 600 is observed at the time T3. However, in the present modified example, a description of a specific example is given in which an anomaly of the aircraft 600 is not observed.

In the present modified example, when the execution of the flight control processing illustrated in FIG. 6 starts, the processing of steps S01 to S05 is executed (steps S01 to S05). As a result, the aircraft 600 determines a flight route such as illustrated in FIG. 2 from the office BO to the delivery destination AD of the article and, then, takes off from the office BO at the time T1.

Next, the processing of steps S06 to S14 is executed (steps S06 to S14). As a result, the aircraft 600 flies on the flight route with the first face PL1 of the predetermined color facing the first observation point PB1 that is the predetermined point.

In the present modified example, since an anomaly of the aircraft 600 is not observed and a landing command is not sent to the aircraft 600, the aircraft 600 determines that a landing command is not received and maintains the delivery destination AD as the move destination.

Thereafter, at the time T2, a determination is made that the aircraft 600 has not arrived at the move destination (step S15; No), the processing of steps S06 to S15 is executed again (steps S06 to S15). As a result, the aircraft 600 flies continuously on the flight route with the first face PL1 facing the first observation point PB1.

When the processing of steps S06 to S15 is executed at the times T3 and T4 (steps S06 to S15), the aircraft 600 flies continuously with the first face PL1 facing the second observation point PB2.

Next, the processing of steps S06 to S14 is repeated (steps S06 to S14) and, then, a determination is made that the aircraft 600 has arrived at the delivery destination AD that is the move destination (step S15; Yes). Then, the controller 692 of the aircraft 600 generates a control signal for landing at the delivery destination AD, and outputs the generated control signal to the drive circuit 619. As a result, the aircraft 600 lands at the delivery destination AD (step S16) and, then, ends the flight control processing.

Next, the controller 692 of the aircraft 600 outputs, to the drive circuit 619, a control signal for causing the first holding frame 651a and the second holding frame 651b to move in directions apart from each other. As a result, the controller 692 causes the first holding frame 651a and the second holding frame 651b to release the article.

Thereafter, the CPU 611 of the aircraft 600 executes the flight control processing illustrated in FIG. 6 with the office BO as the move destination. As a result, the aircraft 600 returns to the office BO.

Modified Example 2 of Embodiment 1

In Embodiment 1, a description is given in which, when the aircraft 600 is flying the in first observation airspace AB1, the first orientation change control processing for causing the first face PL1 of the predetermined color to face the first observation point PB1 is executed.

However, Embodiment 1 is not limited thereto, and the aircraft 600 according to the present modified example executes the first orientation change control processing for causing the first face PL1 to face the first observation point PB1 when the aircraft 600 is flying in the first observation airspace AB1 and the distance to the first observation point PB1 is less than or equal to a predetermined distance L.

To realize this, in step S07 of FIG. 6, the controller 692 of the aircraft 600 according to the present modified example identifies that the observation is being performed at the first observation point PB1 and, then, reads information expressing the distance L that is stored in advance in the information storage 699. Next, the controller 692 calculates the distance from the aircraft 600 to the first observation point PB1 on the basis of the information expressing the position of the first observation point PB1 acquired in step S07 and the information expressing the position of the aircraft 600 acquired in step S11 or in step S21 of FIG. 10.

Thereafter, when the controller 692 of the aircraft 600 determines that the calculated distance is less than or equal to the distance L expressed in the read information, the controller 692 continues the execution of the flight control processing from step S08 of executing the first orientation change control processing for causing the first face PL1 of the predetermined color to face the first observation point PB1. In contrast, when the controller 692 determines that the calculated distance is greater than the distance L, the controller 692 continues the execution of the flight control processing from step S10, and does not execute the first orientation change control processing and the first notification control processing.

Likewise, when the aircraft 600 according to the present modified example is flying in the second observation airspace AB2 and a determination is made that the distance to the second observation point PB2 is less than or equal to the predetermined distance L, the second orientation change control processing for causing the first face PL1 to face the second observation point PB2 and the second notification control processing are executed. In contrast, when the aircraft 600 is flying in the second observation airspace AB2 and a determination is made that the distance to the second observation point PB2 is greater than the predetermined distance L, the second orientation change control processing and the second notification control processing are not executed.

In the present modified example, a description is given in which, when the aircraft 600 is flying in the first observation airspace AB1 and the distance between the aircraft 600 and the first observation point PB1 is less than or equal to the distance L, the first orientation change control processing and the first notification control processing are executed and, also, when the aircraft 600 is flying in the second observation airspace AB2 and the distance between the aircraft 600 and the second observation point PB2 is less than or equal to the distance L, the second orientation change control processing and the second notification control processing are executed.

However, the present modified example is not limited thereto, and a configuration is possible in which, when the aircraft 600 is flying in the first observation airspace AB1 and the distance between the aircraft 600 and the first observation point PB1 is less than or equal to the distance L, the first orientation change control processing and the first notification control processing are executed and, also, when the aircraft 600 is flying in the second observation airspace AB2, the second orientation change control processing and the second notification control processing are executed regardless of the distance between the aircraft 600 and the second observation point PB2.

However, the present modified example is not limited thereto, and a configuration is possible in which, when the aircraft 600 is flying in the first observation airspace AB1, the first orientation change control processing and the first notification control processing are executed regardless of the distance between the aircraft 600 and the first observation point PB1 and, also, when the aircraft 600 is flying in the second observation airspace AB2 and the distance between the aircraft 600 and the second observation point PB2 is less than or equal to the distance L, the second orientation change control processing and the second notification control processing are executed.

However, the present modified example is not limited thereto, and a configuration is possible in which, regardless of whether the aircraft 600 is flying in the first observation airspace AB1 or the second observation airspace AB2, when the distance between the aircraft 600 and the first observation point PB1 is less than or equal to the distance L and the aircraft 600 is closer to the first observation point PB1 than to the second observation point PB2, the first orientation change control processing and the first notification control processing are executed and, also, when the distance between the aircraft 600 and the second observation point PB2 is less than or equal to the distance L and the aircraft 600 is closer to the second observation point PB2 than to the first observation point PB1, the second orientation change control processing and the second notification control processing are executed.

Modified Example 3 of Embodiment 1

In Embodiment 1, a description is given in which, since the aircraft 600 flies over a town lined with brown brick houses, the color of the background of the aircraft 600 is brown. However, Embodiment 1 is not limited thereto. A configuration is possible in which the color of the background of the aircraft 600 is, for example, the most frequently observed color among colors of the background of the aircraft 600 observed in the past by the first observer, the second observer, or any one or more observers other than the first observer and the second observer, or is a color selected, in accordance with a predetermined rule or randomly, from one or a plurality of colors observed at a frequency greater than or equal to a predetermined frequency.

Additionally, in Embodiment 1, a description is given in which the first face PL1 of the propeller guard 641 of the aircraft 600 is colored by the complementary color of the color of the background of the aircraft 600. However, Embodiment 1 is not limited thereto. A configuration is possible in which, when the color of the background of the aircraft 600 is achromatic, the first face PL1 is colored by a predetermined chromatic color or achromatic color. For example, when the color of the background of the aircraft 600 is white, the first face PL1 may be colored by red that is a predetermined chromatic color, or black that is a predetermined achromatic color. Additionally, for example, the first face PL1 may be colored in advance by an achromatic color having a brightness different, by a predetermined value or greater, from the brightness of the achromatic color of the background.

Modified Example 4 of Embodiment 1

In Embodiment 1, a description is given in which among the plurality of wide faces of the propeller guards 641 to 644 of the aircraft 600, only the first face PL1 of the propeller guard 641 is colored by the predetermined color. However, Embodiment 1 is not limited thereto.

For example, a configuration is possible in which the face colored by the predetermined color is a face that is one of the plurality of faces of the propeller guard 641 and that is different from the wide faces.

For example, a configuration is possible in which, of the two wide faces of one of the propeller guards 642 to 644, the wide face on the outer side of the aircraft 600 is colored by the predetermined color.

Furthermore, for example, a configuration is possible in which, of the two wide faces of each of two or more of the propeller guards 641 to 644, the wide face on the outer side of the aircraft 600 is colored by the predetermined color. Additionally, a configuration is possible in which the controller 692 of the aircraft 600 executes orientation change control processing for causing one of the two or more wide faces colored by the predetermined color to face the first observation point PB1 or the second observation point PB2.

For example, a configuration is possible in which one or more surfaces of the fuselage of the aircraft 600 is colored by the predetermined color. The surface colored by the predetermined color may be a front surface, a back surface, a top surface, or a bottom surface of the fuselage, for example. Additionally, the surfaces of the fuselage of the aircraft 600 may include the surfaces of the control device 610 of the aircraft 600.

Modified Example 5 of Embodiment 1

In Embodiment 1, a description is given in which the phrase, "the first face PL1 of the predetermined color faces the forward direction of the aircraft 600" means that the normal direction of the first face PL1 and the forward direction of the aircraft 600 are parallel, and that the first face PL1 is positioned more to the front side than the wide face of the propeller guard 641 different from the first face PL1. Additionally, a description is given in which the controller 692 of the aircraft 600 makes the azimuth θ and the azimuth θ' match and also makes the depression angle φ and the depression angle φ' match to cause the first face PL1 of the predetermined color that is facing the forward direction of the aircraft 600 to face the first observation point PB1 or the second observation point PB2. The azimuth θ is an azimuth formed by the forward direction of the aircraft 600 and the reference direction, and the azimuth θ' is an azimuth formed by the vector from the aircraft 600 toward the first observation point PB1 or the second observation point PB2 and the reference direction. The depression angle φ is the minimum depression angle formed by the forward direction of the aircraft 600 and the horizontal plane, and the depression angle φ' is the minimum depression angle formed by the vector and the horizontal plane.

However, Embodiment 1 is not limited thereto, and a configuration is possible in which the controller 692 of the aircraft 600 causes the azimuth θ of the forward direction of the aircraft 600 and the azimuth θ' of the vector to match and also causes a minimum elevation angle formed by the forward direction of the aircraft 600 and the horizontal plane and a minimum elevation angle formed by the vector and the horizontal plane to match, thereby causing the first face PL1 to face the first observation point PB1 or the second observation point PB2.

Additionally, Embodiment 1 is not limited thereto, and a configuration is possible in which the phrase, "the first face PL1 faces the forward direction of the aircraft 600" means that an azimuth formed by the normal direction of the first face PL1 and the reference direction and the azimuth θ formed by the forward direction of the aircraft 600 and the reference direction match and also that the first face PL1 is positioned more to the front than the wide face of the propeller guard 641 different from the first face PL1. Specifically, a configuration is possible in which the minimum elevation angle or the minimum depression angle formed by the forward direction of the aircraft 600 and the horizontal plane and the minimum elevation angle or the minimum depression angle formed by the normal direction of the first face PL1 and the horizontal plane do not match. Additionally, a configuration is possible in which, regardless of whether or not the elevation angle or depression angle φ of the forward direction of the aircraft 600 and the elevation direction or depression angle φ' of the vector from the aircraft 600 toward the first observation point PB1 or the second observation point PB2 match, the controller 692 of the aircraft 600 causes the azimuth θ formed by the forward direction of the aircraft 600 and the reference direction and the azimuth θ' formed by the vector and the reference direction to match, thereby causing the first face PL1 to face the first observation point PB1 or the second observation point PB2.

Modified Example 6 of Embodiment 1

In FIG. 2 used in the description of Embodiment 1, the first observation point PB1 and the second observation point PB2 are illustrated as points that are different from the office BO and the delivery destination AD. However, Embodiment 1 is not limited thereto. A configuration is possible in which the first observation point PB1 or the second observation point PB2 is the same point as the office BO or the delivery destination AD.

Modified Example 7 of Embodiment 1

In Embodiment 1, a description is given in which the flight system 1 includes two terminal devices, namely the first terminal device 800 and the second terminal device 900, and the observation of the aircraft 600 is performed at two points, namely the first observation point PB1 and the second observation point PB2 by two observers respectively carrying the first terminal device 800 and the second terminal device 900.

However, Embodiment 1 is not limited thereto, and a configuration is possible in which the flight system 1 includes one first terminal device 800, and the observation of the aircraft 600 is performed at one location, namely the first observation point PB1, by one observer carrying the first terminal device 800. Additionally, a configuration is possible in which the flight system 1 includes N terminal devices (where N is an integer of 3 or greater), and the observation of the aircraft 600 is performed at N locations by N observers each carrying a terminal device.

Modified Example 8 of Embodiment 1

In Embodiment 1, smoke from the aircraft 600 is described as a specific example of the anomaly of the aircraft 600, but the anomaly of the aircraft 600 is not limited thereto. Examples of the anomaly of the aircraft 600 include one or more of the propellers 631 to 634 illustrated in FIG. 4 not rotating for an amount of time longer than a predetermined amount of time. Additionally, examples of the anomaly of the aircraft 600 include one or more of the propellers 631 to 634 performing fewer rotations than a predetermined number of rotations per unit time for an amount of time longer than a predetermined amount of time. Furthermore, examples of the anomaly of the aircraft 600 include flames from the aircraft 600.

Modified Example 9 of Embodiment 1

In Embodiment 1, a description is given in which examples of the location at which landing of the aircraft 600 is not forbidden include locations such as roads, river beaches, and parks. However, Embodiment 1 is not limited thereto. The location at which landing of the aircraft 600 is not forbidden includes the first observation point PB1 and the second observation point PB2, for example. Additionally, the location at which landing of the aircraft 600 is not forbidden may be a mountain, a hill, a schoolyard, or a port at which landing of the aircraft 600 is allowed, for example.

The port may be the entrance of an apartment complex, an office building, a hotel, or a public facility, or the doorstep of a house. Additionally, the port may be the lobby of an apartment complex, an office building, a hotel, or a public facility. Furthermore, the port may be the yard, roof, veranda, or parking lot of a house, an apartment complex, an office building, a hotel, or a public facility.

Modified Example 10 of Embodiment 1

In Embodiment 1, a description is given in which the examples of the man-made structures located in the delivery area include houses, buildings, churches, and bridges, and examples of the natural objects located in the delivery area include trees and rocks. However, Embodiment 1 is not limited thereto. Examples of the man-made structures located in the delivery area further include at least one of temples, castles, stadiums, statues, stone statues, pedestrian bridges, signs, traffic lights, utility poles, electric wires, street lights, billboards, fences, towers, or Ferris wheels. The natural objects further include at least one of icebergs or icicles.

Modified Example 11 of Embodiment 1

In Embodiment 1, a description is given in which, in the map table illustrated in FIG. 9, the map information stored in association with the information expressing the range of the first area includes the information expressing the positions and shapes of the man-made structures located in the first area, and the information expressing the positions and shapes of the natural objects located in the first area.

However, Embodiment 1 is not limited thereto, and the map information of the first area according to the present modified example includes only the information expressing the positions and shapes of the man-made structures located in the first area. Likewise, the map information of the second area according to the present modified example includes only the information expressing the positions and shapes of the man-made structures located in the second area.

Additionally, the controller 692 of the aircraft 600 according to the present modified example identifies, on the basis of the map information of the first area and from among the passing points of the route candidates that are candidates for the flight route, non-visible points of the first observation point PB1 from which up to the first observation point PB1 man-made structures exist and visible points of the first observation point PB1 from which up to the first observation point PB1 man-made structures do not exist. Likewise, the controller 692 identifies non-visible points of the second observation point PB2 from which up to the second observation point PB2 man-made structures exist and visible points of the second observation point PB2 from which up to the second observation point PB2 man-made structures do not exist.

Next, the controller 692 of the aircraft 600 according to the present modified example limits the plurality of route candidates to visible routes on which at least one of the passing points included in the first observation airspace AB1 is a visible point of the first observation point PB1 and at least one of the passing points included in the second observation airspace AB2 is a visible point of the second observation point PB2. Then, the controller 692 determines the flight route from the plurality of route candidates limited to visible routes.

However, Embodiment 1 is not limited thereto, and a configuration is possible in which the map information of the first area includes only the information expressing the positions and shapes of the natural objects located in the first area, and the map information of the second area includes only the information expressing the positions and shapes of the natural objects located in the second area.

Modified Example 12 of Embodiment 1

In Embodiment 1, a description is given in which the controller 692 of the aircraft 600 limits the plurality of route candidates to visible routes on which at least one of the passing points included in the first observation airspace AB1 is a visible point of the first observation point PB1 and at least one of the passing points included in the second observation airspace AB2 is a visible point of the second observation point PB2.

However, Embodiment 1 is not limited thereto, and a configuration is possible in which the controller 692 of the aircraft 600 limits the plurality of route candidates to routes on which all of the passing points included in the first observation airspace AB1 are visible points of the first observation point PB1 and all of the passing points included in the second observation airspace AB2 are visible points of the second observation point PB2.

However, Embodiment 1 is not limited thereto, and a configuration is possible in which the controller 692 of the aircraft 600 limits the plurality of route candidates to routes on which at least one of the passing points included in the first observation airspace AB1 and the passing points included in the second observation airspace AB2 is a visible point of the first observation point PB1 or a visible point of the second observation point PB2.

Modified Example 13 of Embodiment 1

In Embodiment 1, a description is given in which the first terminal device 800 and the second terminal device 900 are implemented as smartphones, but Embodiment 1 is not limited thereto, and a configuration is possible in which the first terminal device 800 and the second terminal device 900 are implemented as tablet-type personal computers or notebook-type personal computers.

In Embodiment 1, a description is given in which the when first terminal device 800 receives the first facing notification from the aircraft 600, the first terminal device 800 outputs the notification sound from the speaker 809a. However, Embodiment 1 is not limited thereto, and a configuration is possible in which the first terminal device 800 displays a notification image.

To realize this, when the data communication circuit 804a of the first terminal device 800 receives the first facing notification, the CPU 801 of the first terminal device 800 reads information expressing a notification image that is stored in advance in the flash memory 803b. Next, the CPU 801 outputs, to the video card 805a, a signal on the basis of the read information, and the display device 805b displays the notification image in accordance with a signal outputted from the video card 805a.

Additionally, Embodiment 1 is not limited thereto, and a configuration is possible in which the first terminal device 800 includes a non-illustrated vibration generation device such as a vibrator, for example and, when the first facing notification is received from the aircraft 600, generates vibrations using the vibration generation device.

To realize this, when the data communication circuit 804a of the first terminal device 800 receives the first facing notification, the CPU 801 of the first terminal device 800 outputs a signal for causing the vibration generation device to operate. The vibration generation device operates in accordance with the signal and generates vibration for a predetermined amount of time.

Modified Example 14 of Embodiment 1

In Embodiment 1, a description is given in which the aircraft 600 includes the information storage 699. However, the present disclosure is not limited thereto. The aircraft 600 according to the present modified example does not include the information storage 699. In one example, the aircraft 600 according to the present modified example is connected, via the internet IN, to a non-illustrated information storage device that is a network attached storage (NAS) and that has the same functions as the functions of the information storage device 699. The flight system 1 according to the present modified example may include an information storage device or may not include an information storage device.

The acquirer 691 of the aircraft 600 according to the present modified example acquires, from the map table illustrated in FIG. 9 stored in the information storage device, the map information associated with the information expressing the range of the first area, and the map information associated with the information expressing the range of the second area.

Modified Example 15 of Embodiment 1

In Embodiment 1, a description is given in which the aircraft 600 is an unmanned aircraft, but Embodiment 1 is not limited thereto and a configuration is possible in which the aircraft 600 is an unmanned flying object. Additionally, in Embodiment 1, a description is given in which the aircraft 600 is implemented as a drone that obtains lift and thrust from the propellers 631 to 634 illustrated in FIG. 4, but Embodiment 1 is not limited thereto. A configuration is possible in which the aircraft 600 includes wings and obtains lift by the wings, or includes an air sac filled with a gas having a lower specific gravity than air and obtains lift by the air sac. Additionally, a configuration is possible in which the aircraft 600 includes a jet engine or a rocket engine, and obtains thrust by the jet engine or the rocket engine.

Furthermore, the aircraft 600 need not be unmanned and, provided that, with the exception of the control by the control device 100, the aircraft 600 is an autonomous traveling object, a person may ride the aircraft 600.

Modified Example 16 of Embodiment 1

In Embodiment 1, a description is given in which the CPU 611 of the aircraft 600 functions as the acquirer 691 and the controller 692 illustrated in FIG. 7 by executing the flight control processing of FIG. 6, the flight route determination processing of FIG. 10, and the orientation change control processing of FIG. 11. Additionally, a description is given in which the flash memory 613b of the aircraft 600 functions as the information storage 699 in which the terminal table of FIG. 8, the map table of FIG. 9, the non-illustrated landing location table, and the non-illustrated partial route table are stored.

However, Embodiment 1 is not limited thereto, and a configuration is possible in which the flight control processing of FIG. 6, the flight route determination processing of FIG. 10, and the orientation change control processing of FIG. 11 are executed in a distributed manner by the CPU 611 of the aircraft 600 and the CPU 101 of the control device 100 illustrated in FIG. 3. As such, a configuration is possible in which the CPU 611 of the aircraft 600 does not function as one or more functional units of the acquirer 691 and the controller 692, and the CPU 101 of the control device 100 functions as the one or more functional units. Additionally, a configuration is possible in which the information storage 699 of the aircraft 600 does not store one or more tables of the terminal table, the map table, the landing location table, and the partial route table, and the hard disk 103b of the control device 100 functions as a non-illustrated information storage that stores the one or more tables.

Embodiment 2

In Embodiment 1, it is described the first face PL1 is one wide face of the two wide faces of the propeller guard 641, but Embodiment 1 is not limited thereto. In the present embodiment, the first face PL1 is a display surface of the display device 615b of the aircraft 600 illustrated in FIG. 5. In the following, the configurations that are the same as those in Embodiment 1 are denoted with the same reference numerals used in Embodiment 1, and the description focuses on the differences between the present embodiment and Embodiment 1.

The display device 615b according to the present embodiment includes a planar display device that is installed on the front surface of the control device 610 so that the first face PL1 that is the display surface faces the forward direction of the aircraft 600.

Figure 13:
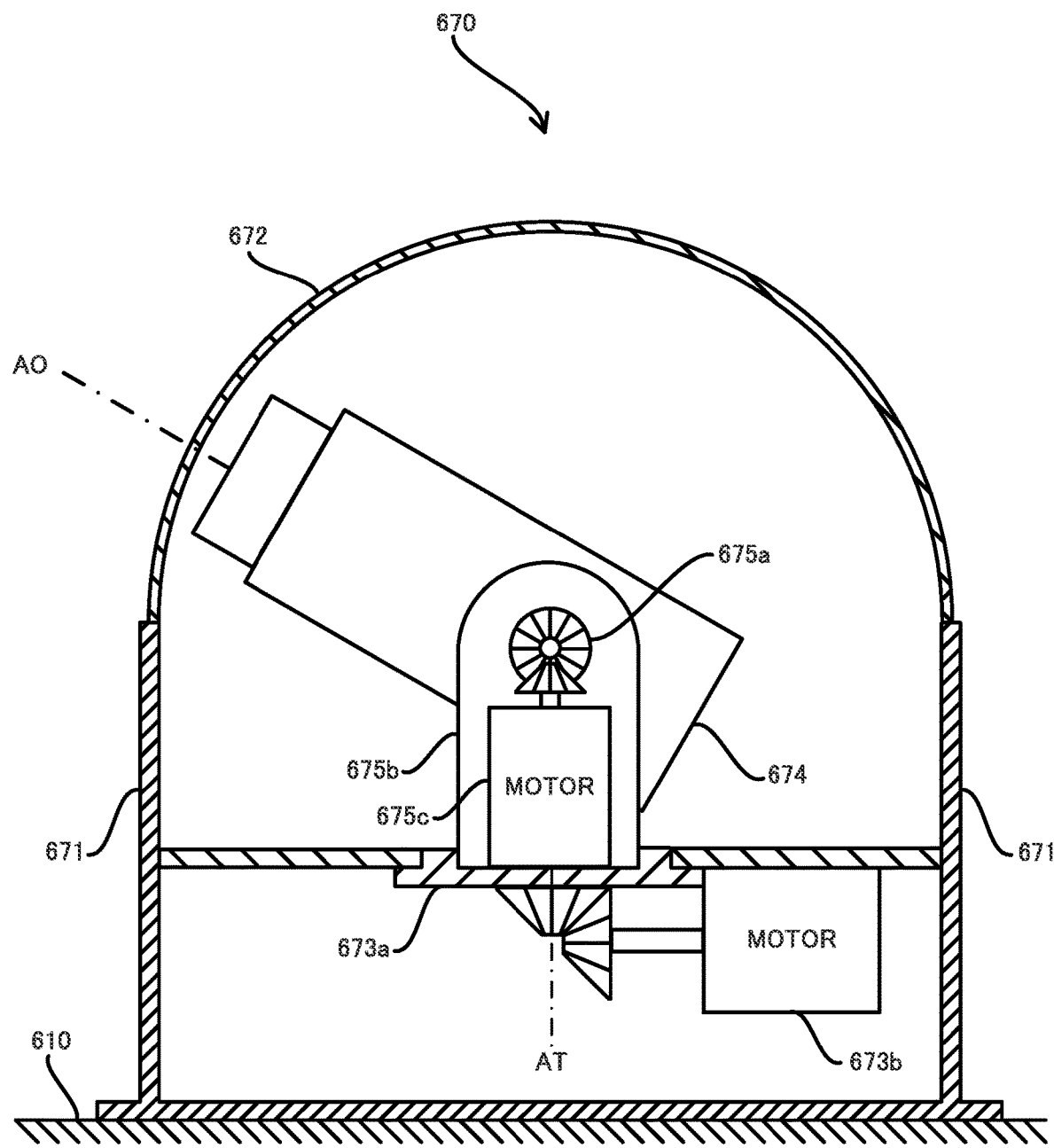
FIG. 13 is a drawing illustrating an example of the hardware configuration of an imaging device of the aircraft.

A dome-type imaging device 670 such as illustrated in FIG. 13 is installed on the top surface of the control device 610 according to the present embodiment. The imaging device 670 includes a circular cylindrical housing 671 that has an axis that is parallel to the upward direction of the aircraft 600. One bottom surface of the housing 671 is fixed to the top surface of the control device 610, and the other bottom surface of the housing 671 includes an opening. The imaging device 670 includes a hemispherical transparent cover 672 that covers the opening of the housing 671.

A rotating table 673a that has a rotational axis AT that passes through the center of the bottom surface and that is parallel to the axis of the housing 671, and a motor 673b that causes the rotating table 673a to rotate are housed in the housing 671. A support member 675b that supports an imaging unit 674 that is a digital camera is fixed to a top surface of the rotating table 673a. The support member 675b axially supports protrusions 675a that protrude, in the horizontal direction from both side surfaces of the imaging unit 674, to the outside of the imaging unit 674. A motor 675c is further fixed to the top surface of the rotating table 673a. The motor 675c causes the imaging unit 674 to pivot by rotating gears formed on the protrusions 675a of the imaging unit 674.

When the motor 675c causes the imaging unit 674 to pivot, a minimum elevation angle formed by an optical axis AO of the lens of the imaging unit 674 and the top surface of the control device 610 changes to an angle from 0 degrees at which the optical axis AO faces the forward direction of the aircraft 600 to 90 degrees at which the optical axis AO faces the upward direction of the aircraft 600. Furthermore, when the motor 673b causes the rotating table 673a to rotate, in a case in which the forward direction of the aircraft 600 is the reference direction, the azimuth formed with that reference direction changes counterclockwise in a range of 0 degrees to 360 degrees.

The drive circuit 619 of the aircraft 600 according to the present embodiment is connected to non-illustrated cables that are connected to each of the motor 673b and the motor 675c of the imaging device 670. The drive circuit 619 changes the elevation angle and the azimuth of the optical axis AO of the imaging device 670 by driving the motor 673b and the motor 675c of the imaging device 670 in accordance with signals output by the CPU 611.

Figure 14:
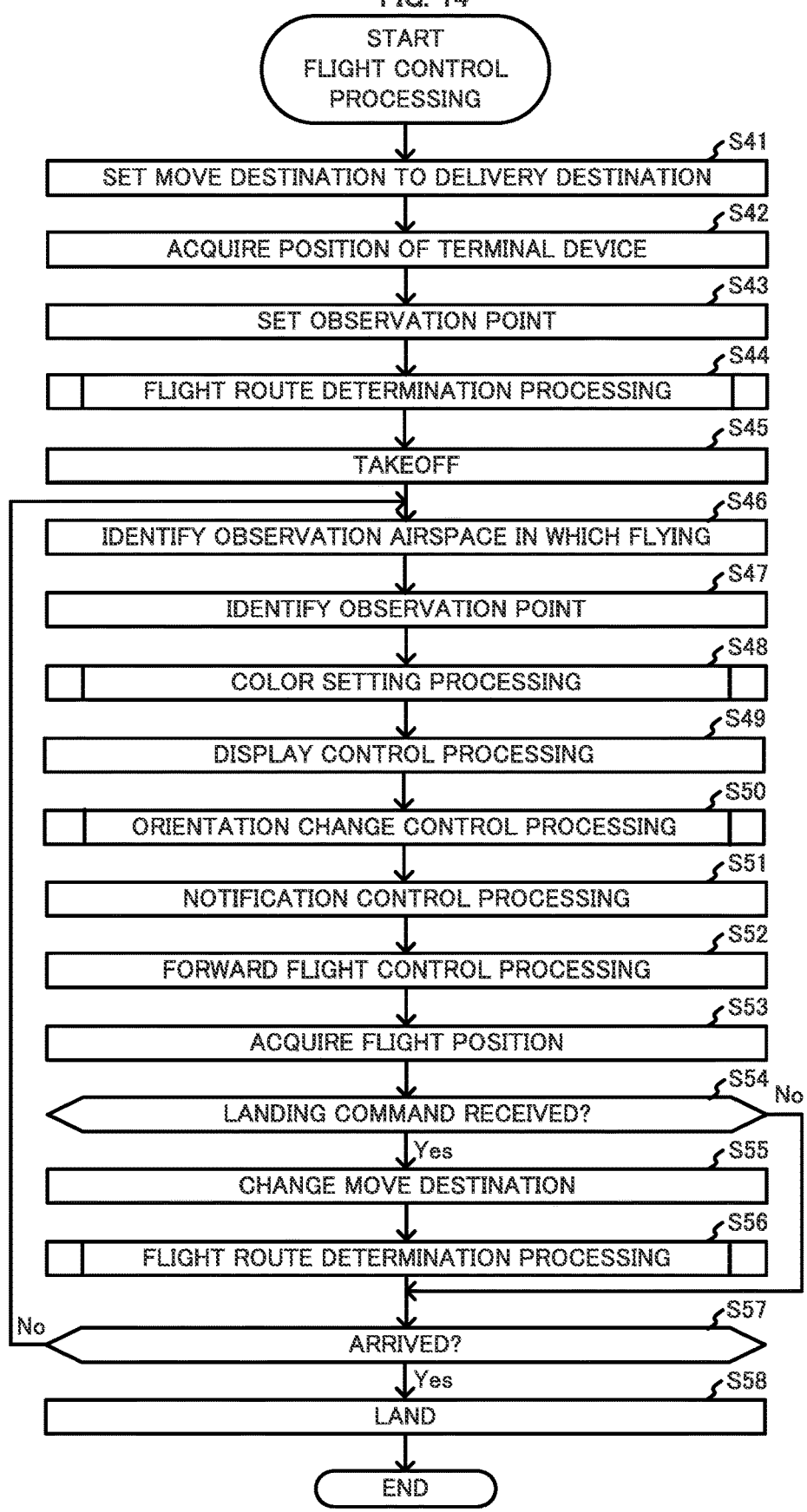
FIG. 14 is a flowchart illustrating an example of flight control processing executed by the aircraft according to Embodiment 2.

The CPU 611 of the aircraft 600 according to the present embodiment executes flight control processing such as illustrated in FIG. 14. When the execution of the flight control processing starts, the CPU 611 executes the same processing as steps S01 to S07 of FIG. 6 (steps S41 to S47). As a result, the first observation point PB1 and the second observation point PB2 at which the observation of the aircraft 600 is being performed are identified.

Figure 15:
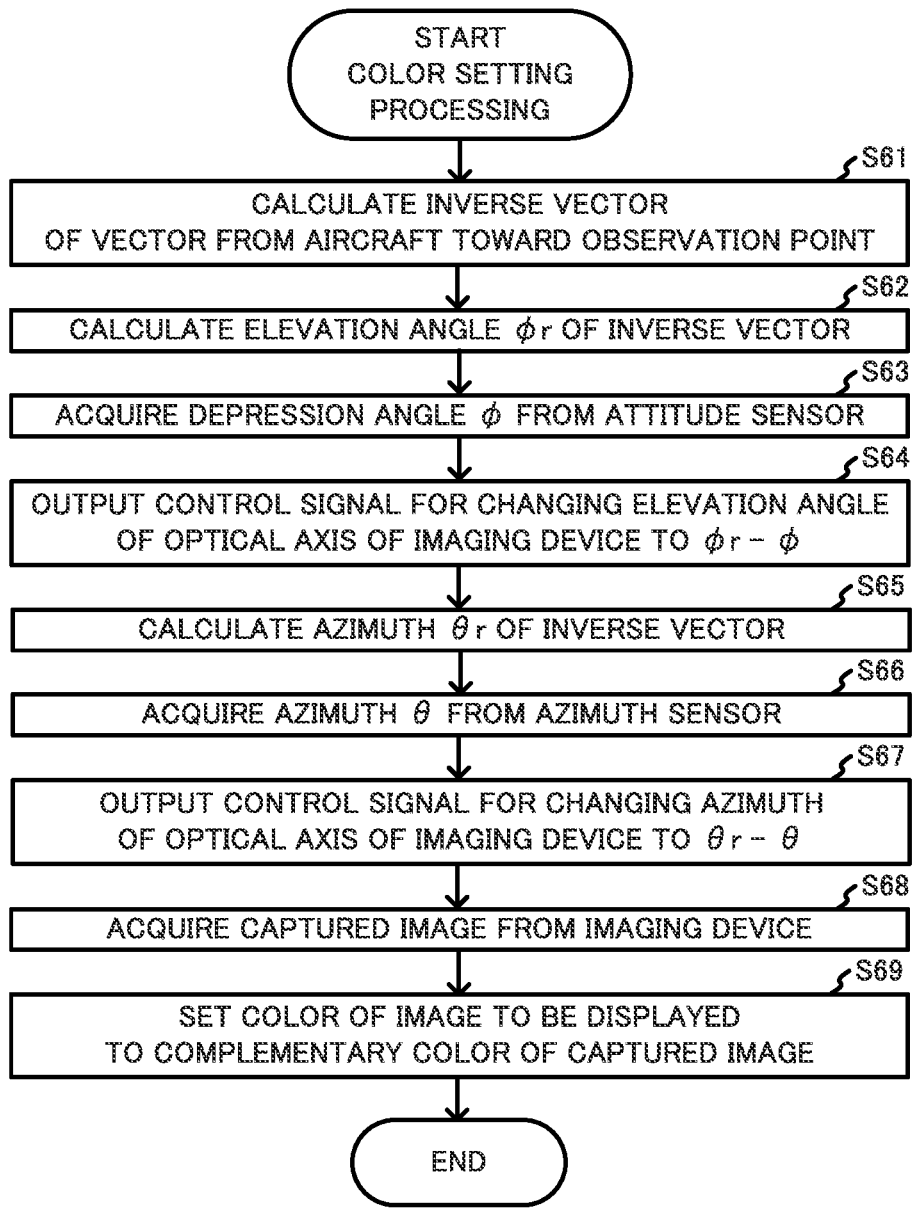
FIG. 15 is a flowchart illustrating an example of color setting processing executed by the aircraft.

Next, color setting processing such as illustrated in FIG. 15 is executed for setting, on the basis of the color of the background of the aircraft 600 observed from the position of the identified first observation point PB1 or the second observation point PB2, the color of an image to be displayed on the first face PL1 that is the display surface (step S48).

Figure 16:
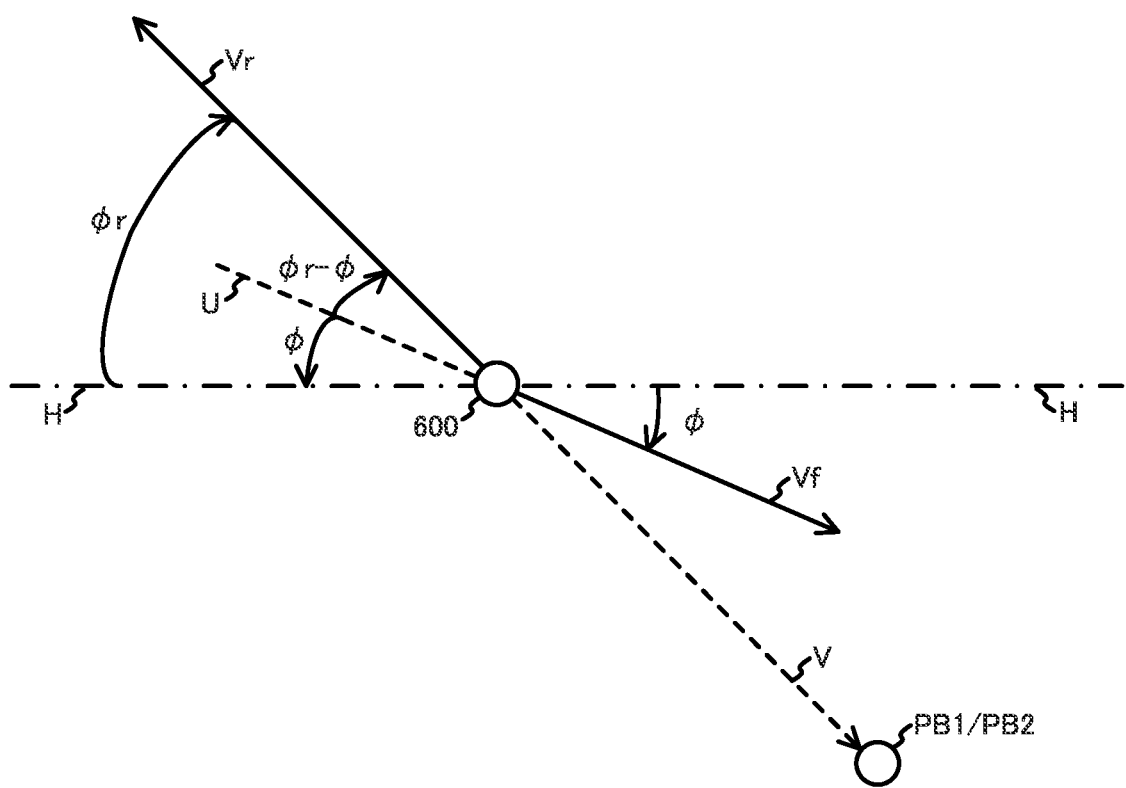
FIG. 16 is a drawing illustrating an example of a minimum depression angle formed by a horizontal plane and a forward direction of the aircraft 600.

When the execution of the color setting processing starts, the controller 692 of the aircraft 600 executes the same processing as step S31 of FIG. 11 and, as a result, calculates a vector V such as illustrated in FIG. 16 from the aircraft 600 toward the first observation point PB1 or the second observation point PB2 identified in step S47. Next, the controller 692 calculates an inverse vector of the calculated vector V, and changes a starting point of the calculated inverse vector to the position of the aircraft 600. As a result, the controller 692 calculates a vector Vr from the aircraft 600 toward a direction opposite the direction from the aircraft 600 toward the first observation point PB1 or the second observation point PB2 (step S61).

In the present embodiment, to facilitate comprehension, a description is given in which the first observation point PB1 or the second observation point PB2 is a point on the ground surface of the first area or the second area and, as such, is a position that is lower than the position of the aircraft 600 flying in the first observation airspace AB1 or the second observation airspace AB2. As such, the controller 692 of the aircraft 600 calculates a vector Vr such as illustrated in FIG. 16 from the aircraft 600 toward above the aircraft 600.

Next, the controller 692 of the aircraft 600 calculates a minimum elevation angle φr, such as illustrated in FIG. 16, formed by the horizontal plane H and the vector Vr (step S62). Additionally, the acquirer 691 executes the same processing as step S37 of FIG. 11 to acquire the information expressing the minimum depression angle φ formed by the horizontal plane H and a vector Vf expressing the forward direction of the aircraft 600 (step S63).

In this case, the minimum depression angle φ formed by the vector Vf expressing the forward direction of the aircraft 600 and the horizontal plane H is equal to the minimum depression angle formed by the top surface U of the control device 610 of the aircraft 600 and the horizontal plane H. As such, the minimum elevation angle formed by the top surface U of the control device 610 and the vector Vr is an angle that is obtained by subtracting the depression angle φ from the elevation angle φr.

Thereafter, the controller 692 of the aircraft 600 generates a control signal for changing the minimum elevation angle formed by the optical axis AO of the imaging device 670 and the top surface U of the control device 610 to the angle obtained by subtracting the depression angle φ from the elevation angle φr, and outputs the generated control signal to the drive circuit 619 (step S64). The drive circuit 619 drives the motor 675c of the imaging device 670 in accordance with the outputted control signal, thereby changing the minimum elevation angle formed by the optical axis AO of the imaging device 670 and the horizontal plane H to an angle that is the same as the minimum elevation angle φr formed by the vector Vr and the horizontal plane H.

Next, the controller 692 of the aircraft 600 calculates an azimuth θr formed by the reference direction and the vector Vr (step S65). Additionally, the acquirer 691 executes the same processing as step S33 of FIG. 11 to acquire the information expressing the azimuth θ formed by the reference direction and the forward direction of the aircraft 600 (step S66).

Thereafter, the controller 692 of the aircraft 600 outputs, to the drive circuit 619, a control signal for changing the azimuth formed by the forward direction of the aircraft 600 and the optical axis AO of the imaging device 670 to an angle obtained by subtracting the azimuth θ from the azimuth θr (step S67). The drive circuit 619 drives the motor 673b of the imaging device 670 in accordance with the outputted control signal to change the azimuth formed by the optical axis AO of the imaging device 670 and the reference direction to an angle that is the same as the azimuth θr formed by the vector Vr and the reference direction.

Thereafter, the controller 692 of the aircraft 600 outputs, via the input/output port 618 to the imaging device 670 that is enabled to image a scene in the direction expressed by the vector Vr, a signal commanding imaging to be performed. The direction expressed by the vector Vr is a direction from the first observation point PB1 or the second observation point PB2 toward the aircraft 600 and, as such, the imaging device 670 images the environment that becomes the background of the aircraft 600 when the aircraft 600 is observed from the first observation point PB1 or the second observation point PB2. Then, the acquirer 691 acquires, via the input/output port 618, a signal expressing a captured image generated by the imaging device 670, and acquires information expressing the captured image on the basis of the acquired signal (step S68).

Next, the controller 692 of the aircraft 600 identifies, on the basis of the acquired information and on the basis of pixel values of a plurality of pixels that form the captured image, the color of the background of the aircraft 600. In the present embodiment, the controller 692 calculates an average of the pixel values of the plurality of pixels, and specifies a color expressed by the calculated average as the color of the background.

Thereafter, the controller 692 of the aircraft 600 determines the complementary color of the identified color of the background using the following equations (1) to (4), for example.

$$S = \max(R, G, B) + \min(R, G, B) \quad (1)$$

$$HR = S - R \quad (2)$$

$$HG = S - G \quad (3)$$

$$HB = S - B \quad (4)$$

In the equations, R, G, and B respectively represent an R value, a G value, and a B value of the color of the background. Additionally, max(R, G, B) represents a function that has R, G, and B as arguments, and that returns the maximum value of the R, G, and B. Additionally, min(R, G, B) represents a function that has R, G, and B as arguments, and that returns the minimum value of the R, G, and B. HR, HG, and HB respectively represent the R value, the G value, and the B value of the complementary color of the color of the background.

After determining the complementary color of the color of the background, the controller 692 of the aircraft 600 sets, to the determined complementary color, the color of the image to be displayed on the first face PL1 that is the display surface (step S69), and ends the execution of the color setting processing.

After the execution of the color setting processing in step S48 of FIG. 14, the controller 692 of the aircraft 600 performs display control processing on the display device 615b for displaying, on the first face PL1, the image of the complementary color set in step S69 (step S49).

Thereafter, the same processing as steps S08 to S16 of FIG. 6 is executed (steps S50 to S58), and the execution of the flight control processing is ended. As a result, the aircraft 600 flies on the flight route to the move destination with the first face PL1 on which the image of the complementary color is displayed facing the first observation point PB1 or the second observation point PB2 and, then, lands at the move destination.

According to these configurations, the first face PL1 is the display surface of the display device 615b. Additionally, the aircraft 600 further includes the imaging device 670 that obtains a captured image by imaging, from the aircraft 600, a scene in the direction opposite the direction from the aircraft 600 toward the first observation point PB1 or the second observation point PB2 that are the predetermined points. Moreover, the controller 692 of the aircraft 600 sets the complementary color of the color of the captured image obtained by the imaging device 670 as the predetermined color by setting the color of the image to be displayed on the first face PL1 to the complementary color. Furthermore, the controller 692 performs the display control processing for displaying the image of the predetermined color on the first face PL1. As such, the aircraft 600 can display an image of the complementary color of the background color on the first face PL1 of the aircraft 600, even when the observed background of the aircraft 600 changes due to the flying of the aircraft 600 when observing the aircraft 600 from the first observation point PB1 or the second observation point PB2. Therefore, the aircraft 600 can continually improve the visibility of the aircraft 600 from the first observation point PB1 or the second observation point PB2.

Modified Example 1 of Embodiment 2

In Embodiment 2, a description is given in which the first observation point PB1 or the second observation point PB2 is a point on the ground surface of the first area or the second area. However, Embodiment 2 is not limited thereto. The first observation point PB1 or the second observation point PB2 according to the present modified example is a point having an altitude higher than the ground surface of the first area or the second area, such as, for example, the roof of a building located in the first area or the second area.

The aircraft 600 according to the present modified example includes the imaging device 670 described in Embodiment 2 on the top surface of the control device 610 of the aircraft 600, and includes a non-illustrated imaging device having the same configuration and functions as the imaging device 670 on the bottom surface of the control device 610.

When, in the color setting processing of FIG. 15, the controller 692 of the aircraft 600 according to the present modified example determines that the altitude of the first observation point PB1 or the second observation point PB2 is less than or equal to the altitude of the aircraft 600, the controller 692 outputs a signal for causing the imaging device 670 on the top surface to image a scene in the direction opposite the direction from the aircraft 600 toward the first observation point PB1 or the second observation point PB2. In contrast, when the controller 692 determines that the altitude of the first observation point PB1 or the second observation point PB2 is higher than the altitude of the aircraft 600, the controller 692 outputs a signal for causing the imaging device on the bottom surface to image a scene in the direction opposite the direction from the aircraft 600 toward the first observation point PB1 or the second observation point PB2. Then, the controller 692 sets, to the complementary color of the captured image generated by the imaging device 670 on the top surface or the imaging device on the bottom surface, the color of the image to be displayed on the first face PL1.

Modified Example 2 of Embodiment 2

In Embodiment 2, a description is given in which the controller 692 of the aircraft 600 calculates the average of the pixel values of the plurality of pixels forming the captured image, and specifies the color expressed by the calculated average as the color of the background. However, Embodiment 2 is not limited thereto. A configuration is possible in which, for example, the controller 692 specifies, as the color of the background, the color of the pixel value used most in the captured image among the pixel values of the plurality of pixels forming the captured image.

Additionally, in Embodiment 2, a description is given in which the controller 692 of the aircraft 600 determines the complementary color of the color of the background using Equations (1) to (4). However, Embodiment 2 is not limited thereto. A configuration is possible in which, for example, information expressing a pixel value of a chromatic color and information expressing a pixel value of a complementary color of the chromatic color are associated in advance, and a plurality of pieces of the associated information is stored in a complementary color table in the information storage 699 of the aircraft 600. In such a case, the controller 692 may acquire information associated, in the complementary color table, with the information expressing the pixel value of the color of the background calculated on the basis of the captured image, and determine the color of the pixel value expressed by the acquired information as the complementary color of the color of the background.

Modified Example 3 of Embodiment 2

In Embodiment 2, a description is given in which, in step S49, the controller 692 of the aircraft 600 causes the display device 615b to display on the display surface, the image of the color set as a result of executing step S48 of FIG. 14 and, then, causes the display surface to face the first observation point PB1 or the second observation point PB2 in step S50.

However, Embodiment 2 is not limited thereto, and the controller 692 of the aircraft 600 according to the present modified example causes the display surface to face the first observation point PB1 or the second observation point PB2 and, then, sets the color of the image to be displayed on the display surface, and displays the image of the set color on the display surface.

To realize this, the display device 615b according to the present embodiment is installed on the front surface of the control device 610 of the aircraft 600 such that the display surface faces the forward direction of the aircraft 600. Additionally, the imaging device 670 according to the present modified example does not have a mechanism for changing the elevation angle and the azimuth, the optical axis AO and the angle of view are set and the imaging device 670 is provided on the back surface of the control device 610 so as to enable imaging a scene in the backward direction of the aircraft 600.

The controller 692 of the aircraft 600 according to the present modified example executes the orientation change control processing to cause the display surface to face the direction from the aircraft 600 toward the first observation point PB1 or the second observation point PB2, thereby causing the imaging device 670 to face the direction opposite the direction from the aircraft 600 toward the first observation point PB1 or the second observation point PB2. Next, the controller 692 outputs, to the imaging device 670, a signal commanding imaging to be performed, and sets the color of the image to be displayed on the display surface to the complementary color of the color of the captured image generated by the imaging device 670. Then, the controller 692 displays the image of the set color on the display surface.

Embodiment 3

In Embodiment 1, a description is given in which the first face PL1 of the propeller guard 641 of the aircraft 600 is colored by the predetermined color. However, the present disclosure is not limited thereto. In the present embodiment, the first face PL1 of the propeller guard 641 is a light-emitting face that emits light of the predetermined color. In the following, the configurations that are the same as those in Embodiment 1 are denoted with the same reference numerals used in Embodiment 1, and the description focuses on the differences between the present embodiment and Embodiment 1.

A light-emitting element that is a light emitting diode (LED), for example, is installed on the first face PL1 of the propeller guard 641 according to the present embodiment. The light-emitting element of the first face PL1 is connected to the drive circuit 619 of the aircraft 600 via a non-illustrated cable.

Figure 17:
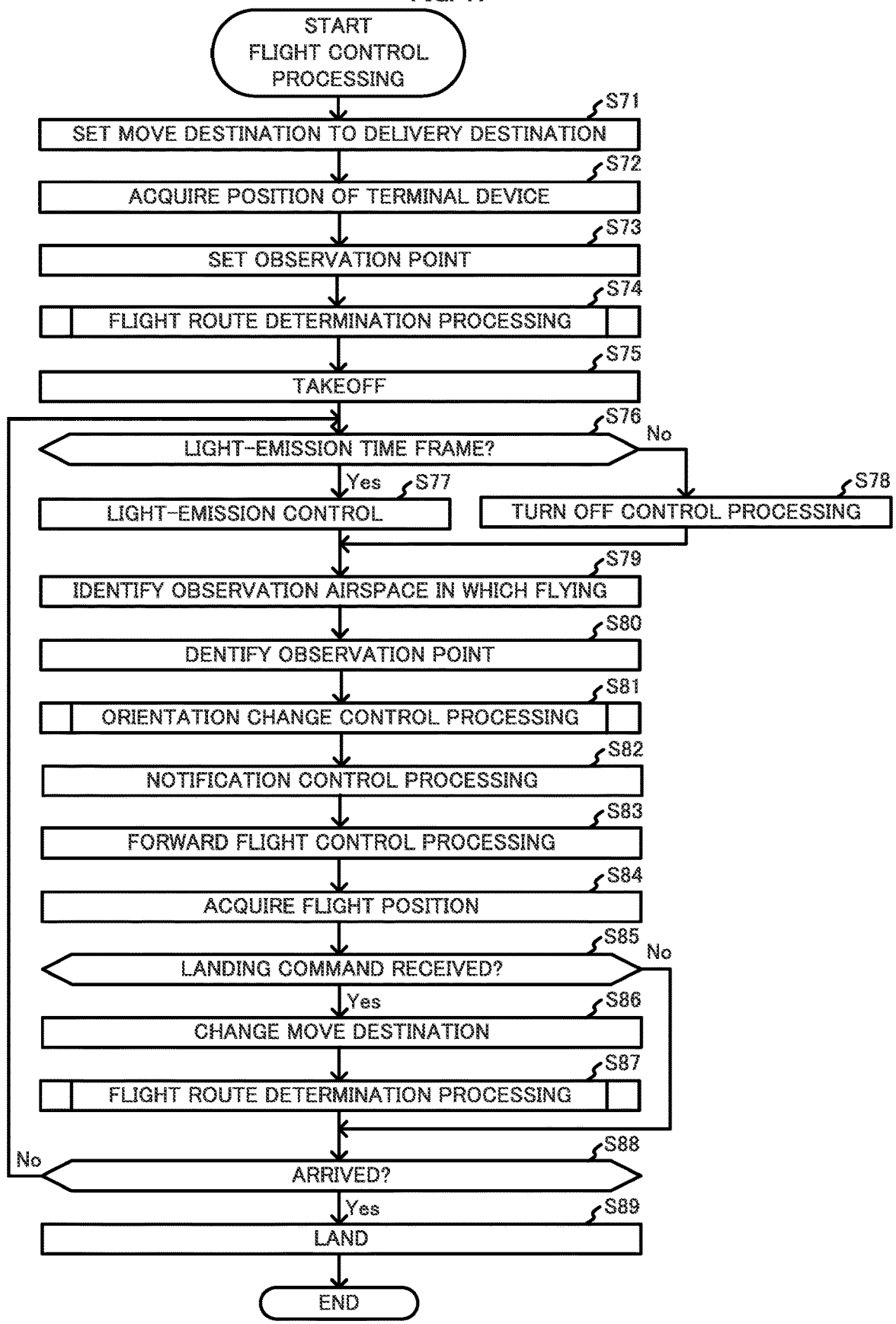
FIG. 17 is a flowchart illustrating an example of flight control processing executed by the aircraft according to Embodiment 3.

The CPU 611 of the aircraft 600 according to the present embodiment executes flight control processing such as illustrated in FIG. 17. When the execution of the flight control processing starts, the CPU 611 executes the same processing as steps S01 to S05 of FIG. 6 (steps S71 to S75). As a result, the flight route is determined and, then, the aircraft 600 takes off from the office BO.

Next, the acquirer 691 of the aircraft 600 acquires, from the information storage 699, information expressing a predetermined light-emission time frame in which the first face PL1 is to be caused to emit light. In the present embodiment, the light-emission time frame is set in advance to a time frame from a time included in a predetermined time frame that includes a sunset time to a time included in a predetermined time frame that includes a sunrise time. However, the present embodiment is not limited thereto.

Thereafter, the acquirer 691 of the aircraft 600 acquires a system date and time managed by an operating system (OS), for example. Next, the controller 692 of the aircraft 600 determines whether or not the acquired system date and time is included in the light-emission time frame (step S76). At this time, when the controller 692 determines that the system date and time is included in the light-emission time frame (step S76; Yes), the controller 692 executes light-emission control processing for outputting, to the drive circuit 619, a control signal for causing the first face PL1 to emit light (step S77). The drive circuit 619 causes the light-emitting element of the first face PL1 to emit light in accordance with the control signal.

In step S76, when the controller 692 of the aircraft 600 determines that the system date and time is not included in the light-emission time frame (step S76; No), the controller 692 executes turn off control processing for outputting, to the drive circuit 619, a control signal for stopping the light emitting of the first face PL1 (step S78). The drive circuit 619 causes the light-emitting element of the first face PL1 to turn off in accordance with the control signal.

After the execution of step S77 or S78, the same processing as steps S06 to S16 of FIG. 6 is executed (steps S79 to S89). As a result, the aircraft 600 causes the first face PL1 to face the first observation point PB1 or the second observation point PB2, sends the first facing notification or the second facing notification to the first terminal device 800 or the second terminal device 900 and, then, flies to the move destination.

According to these configurations, the first face PL1 of the aircraft 600 emits light of the predetermined color, and the controller 692 of the aircraft 600 performs the light-emission control processing for causing the first face PL1 to emit light in the light-emission time frame from the time included in the predetermined time frame including the sunset time and to the time included in the predetermined time frame including the sunrise time. As such, even when, for example, illuminance decreases due to the setting of the sun, the aircraft 600 causes the first face PL1 faced toward the first observation point PB1 or the second observation point PB2 to emit light of the predetermined color and, as such, decreases of the visibility of the aircraft 600 from the first observation point PB1 or the second observation point PB2 can be suppressed.

Modified Example 1 of Embodiment 3

In Embodiment 3, a description is given in which the controller 692 of the aircraft 600 causes the first face PL1 to emit light in the predetermined light-emission time frame. However, Embodiment 3 is not limited thereto.

The aircraft 600 according to the present modified example includes a non-illustrated illuminance sensor, causes the first face PL1 to emit light when the illuminance measured by the illuminance sensor is less than or equal to a predetermined illuminance, and turns off the first face PL1 when the measured illuminance is greater than the predetermined illuminance.

To realize this, the acquirer 691 of the aircraft 600 acquires, on the basis of a signal output from the illuminance sensor, information expressing the illuminance measured by the illuminance sensor. Additionally, the acquirer 691 acquires information expressing the predetermined illuminance stored in the information storage 699. Then, when the controller 692 determines that the measured illuminance expressed in the acquired information is less than or equal to the predetermined illuminance, the controller 692 executes the light-emission control processing for causing the first face PL1 to emit light. In contrast, when a determination is made that the measured illuminance is greater than the predetermined illuminance, the turn off control processing for stopping the light emitting of the first face PL1 is executed.

Modified Example 2 of Embodiment 3

In Embodiment 3, a description is given in which the light-emission time frame is the time frame from a time included in the predetermined time frame that includes the sunset time to a time included in the predetermined time frame that includes the sunrise time. However, the present embodiment is not limited thereto, and configurations are possible in which the light-emission time frame is a time frame from the sunset time to the sunrise time, or the light-emission time frame is a time frame from a time that is a predetermined amount of time after the sunset time to a time that is a predetermined amount of time before the sunrise time. Moreover, a configuration is possible in which the controller 692 of the aircraft 600 causes the first face PL1 to emit light regardless of a time frame.

Modified Example 3 of Embodiment 3

In Embodiment 3, a description is given in which the first face PL1 is the wide face of the propeller guard 641 on which the light-emitting element that is an LED is installed. However, Embodiment 3 is not limited thereto. A configuration is possible in which the first face PL1 is the display surface of the display device 615b of the aircraft 600. In such a case, the display surface may include a non-illustrated back light that emits light. Additionally, instead of the LED, a fluorescent lamp, a mercury lamp, a metal halide lamp, a halogen lamp, or a light bulb may be installed on the first face PL1, for example.

Embodiment 4

In Embodiment 1, a description is given in which the first observer observes the aircraft 600 when the aircraft 600 flies in the first observation airspace AB1, and the second observer observes the aircraft 600 when the aircraft 600 flies in the second observation airspace AB2. As such, a description is given in which, when the aircraft 600 is flying in the first observation airspace AB1, the first face PL1 of the predetermined color is caused to face the first observation point PB1 where the first observer is located, and when the aircraft 600 is flying in the second observation airspace AB2, the first face PL1 is caused to face the second observation point PB2 where the second observer is located.

However, the present disclosure is not limited thereto, and the first observer and the second observer according to the present embodiment observe the aircraft 600 when the aircraft 600 is flying, regardless of the first observation airspace AB1 and the second observation airspace AB2. As such, when the aircraft 600 according to the present embodiment takes off from the office BO, the first face PL1 of the predetermined color is caused to face the first observation point PB1, which is closer to the position of the aircraft 600, among the first observation point PB1 and the second observation point PB2. Then, when the aircraft 600 receives, from the first terminal device 800, a viewing report informing that the first observer has viewed the aircraft 600, the first face PL1 is caused to face the second observation point PB2. In the following, the configurations that are the same as those in Embodiment 1 are denoted with the same reference numerals used in Embodiment 1, and the description focuses on the differences between the present embodiment and Embodiment 1.

A terminal table such as illustrated in FIG. 18 is stored in advance in the information storage 699 of the aircraft 600 according to the present embodiment. The communication address of the first terminal device 800, and a viewing flag of a value "false", expressing that the aircraft 600 has not been viewed by the first observer carrying the first terminal device 800, are stored in advance in the first record of the terminal table. However, as in Embodiment 1, the information expressing the position of the first observation point PB1 is not stored in the first record. The communication address of the second terminal device 900, and the viewing flag of the value "false" are stored in advance in the second record of the terminal table, but the information expressing the position of the second observation point PB2 is not stored.

Figure 19B:
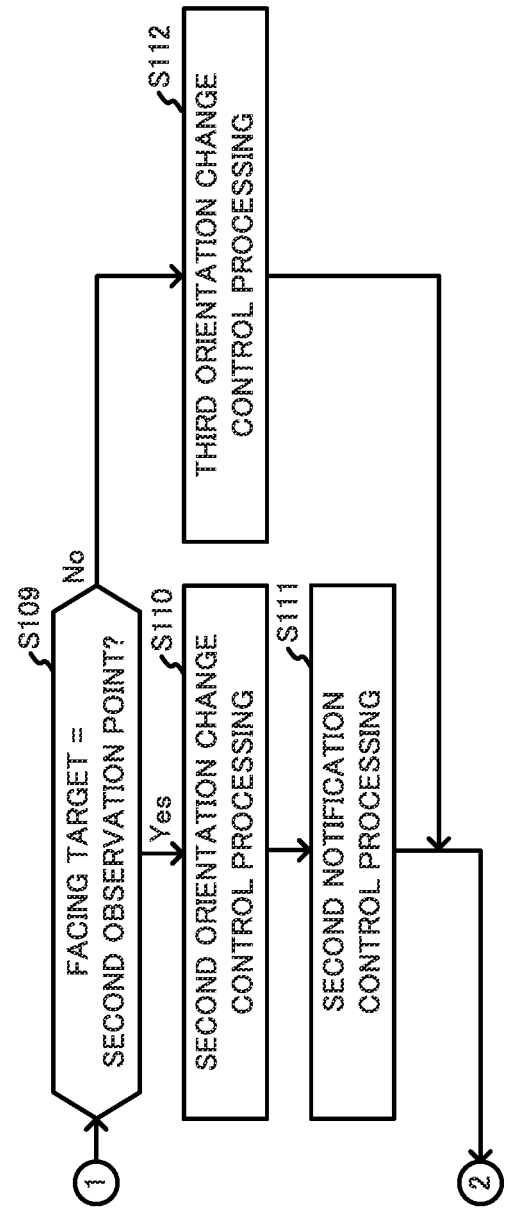

The CPU 611 of the aircraft 600 according to the present embodiment executes flight control processing such as illustrated in FIGS. 19A and 19B. When the execution of the flight control processing starts, the CPU 611 executes the same processing as steps S01 to S04 of FIG. 6 (steps S91 to S94). As a result, the data communication circuit 614a of the aircraft 600 receives the information expressing the position of the first terminal device 800 carried by the first observer and the information expressing the position of the second terminal device 900 carried by the second observer. Additionally, the controller 692 sets, as the predetermined first set point, the point of the position of the first terminal device 800 expressed by the received information by setting the point of the position as the first observation point PB1 that is the point at which the first observer performs the observation and at which the first face PL1 of the predetermined color is caused to face. Additionally, the controller 692 stores the information expressing the position of the first observation point PB1 in the first record of the terminal table of FIG. 18. Likewise, the controller 692 sets, as the predetermined second set point, the point of the position of the second terminal device 900 by setting the point of the position as the second observation point PB2. Additionally, the controller 692 stores the information expressing the position of the second observation point PB2 in the second record of the terminal table.

In the present embodiment, to facilitate comprehension, the first observation point PB1 and the second observation point PB2 are referred to collectively as "observation points", as in Embodiment 1. Additionally, in the present embodiment, the first set point PB1 that is another name of the first observation point PB1, and the second set point PB2 that is another name of the second observation point PB2 are referred to collectively as "predetermined points."

Thereafter, the controller 692 of the aircraft 600 outputs, to the drive circuit, a control signal for taking off from the office BO (step S95). Next, the controller 692 of the aircraft 600 selects one of the first observation point PB1, the second observation point PB2, and the move destination as a facing target at which to cause the first face PL1 of the predetermined color to face (step S96).

In the present embodiment, a description of a specific example is given below in which the aircraft 600 takes off from the office BO at a time T11.

At the time T11, in order to select the facing target, the controller 692 of the aircraft 600 acquires, from the terminal table of FIG. 18, the information expressing the positions of the observation points associated with the viewing flag of the value "false" that expresses that the aircraft 600 has not been viewed. Since both the first observer and the second observer have not viewed the aircraft 600 immediately after the aircraft 600 takes off from the office BO at the time T11, the controller 692 acquires the information expressing the position of the first observation point PB1 and the information expressing the position of the second observation point PB2.

Next, the controller 692 of the aircraft 600 calculates the distance from the aircraft 600 to the first observation point PB1 on the basis of the information expressing the position of the aircraft 600 acquired in step S21 of FIG. 10 and the information expressing the position of the first observation point PB1. Likewise, the controller 692 calculates the distance from the aircraft 600 to the second observation point PB2.

Figure 20:
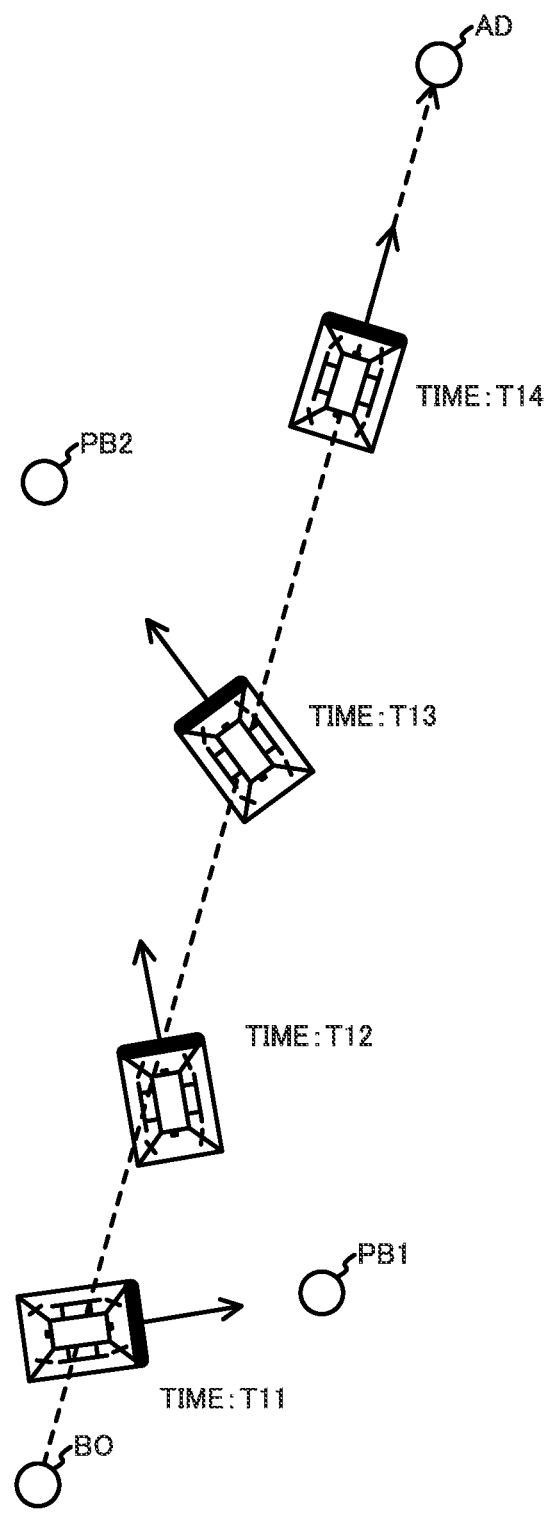
FIG. 20 is a drawing illustrating an example of the orientation of the aircraft according to Embodiment 4.

In the present embodiment, as illustrated in FIG. 20, the first observation point PB1 is closer to the office BO than the second observation point PB2. As such, immediately after the aircraft 600 takes off from the office BO at the time T11, the controller 692 of the aircraft 600 determines that the distance from the aircraft 600 to the first observation point PB1 is shorter than the distance from the aircraft 600 to the second observation point PB2, and selects the first observation point PB1 as the facing target of the first face PL1 of the predetermined color.

Next, the controller 692 of the aircraft 600 determines that the selected facing target is the first observation point PB1 (step S97; Yes). Then, the controller 692 executes the orientation change control processing of FIG. 11 in order to cause the aircraft 600 to fly with the first face PL1 facing the first observation point PB1 (step S98). In the present embodiment, as in Embodiment 1, the orientation change control processing executed for causing the first face PL1 to face the first observation point PB1 is referred to as the "first orientation change control processing."

Thereafter, the controller 692 of the aircraft 600 performs the first notification control processing described in Embodiment 1, thereby causing the data communication circuit 614a to send the first facing notification with the first terminal device 800 as the destination (step S99).

Thereafter, the controller 692 of the aircraft 600 executes the forward flight control processing for causing the aircraft 600 to fly forward on the flight route (step S100). Next, the controller 692 determines whether or not the data communication circuit 614a receives the viewing report from the first terminal device 800 (step S101).

In the present embodiment, a description of a specific example is given below in which the first observer views the aircraft 600 immediately after the time T11, and performs an operation, on the input device 805c of the first terminal device 800, for causing the viewing report to be sent. As such, when the input device 805c of the first terminal device 800 inputs a signal corresponding to the operation, the CPU 801 of the first terminal device 800 outputs the viewing report to the data communication circuit 804a of the first terminal device 800 with the aircraft 600 as the destination. Then, the data communication circuit 614a of the aircraft 600 receives the viewing report sent from the first terminal device 800.

The controller 692 of the aircraft 600 determines that the viewing report is received (step S101; Yes) and, in the terminal table of FIG. 18, updates the viewing flag associated with the communication address of the first terminal device 800 to a value "true" expressing that the aircraft 600 has been viewed by the first observer carrying the first terminal device 800 (step S102). Next, the same processing as steps S11 to S14 of FIG. 6 is executed (steps S103 to S106).

In the present embodiment, a description of a specific example is given below in which, at a time T12 later than the time T11, the aircraft 600 executes the processing of step S107 while flying toward the move destination.

At the time T12, the controller 692 of the aircraft 600 determines that the aircraft 600 has not arrived at the move destination (step S107; No). Then, the controller 692 acquires, from the terminal table of FIG. 18, only the information expressing the position of the second observation point PB2 associated with the viewing flag of the value "false" that expresses that the aircraft 600 has not been viewed. As such, the controller 692 of the aircraft 600 selects the second observation point PB2 as the facing target of the first face PL1 of the predetermined color.

Next, the controller 692 of the aircraft 600 determines that the selected facing target is not the first observation point PB1 and is the second observation point PB2 (step S97; No and step S109; Yes). Then, the controller 692 executes the orientation change control processing of FIG. 11 in order to cause the aircraft 600 to fly with the first face PL1 facing the second observation point PB2 (step S110). In the present embodiment, as in Embodiment 1, the orientation change control processing executed to cause the first face PL1 to face the second observation point PB2 is referred to as the "second orientation change control processing."

Thereafter, the controller 692 of the aircraft 600 performs the second notification control processing described in Embodiment 1, thereby causing the data communication circuit 614a to send the second facing notification to the second terminal device 900 (step S111).

Thereafter, the controller 692 of the aircraft 600 executes the forward flight control processing (step S100) and, then, determines whether or not the data communication circuit 614a receives the viewing report from the second terminal device 900 (step S101).

In the present embodiment, a description of a specific example is given below in which, immediately after the time T12, the second observer cannot view the aircraft 600 and, as such, does not perform an operation on the second terminal device 900 for causing the viewing report to be sent.

The controller 692 of the aircraft 600 determines that the viewing report is not received (step S101; No) and, then, executes the processing of steps S103 to S106.

In the present embodiment, a description of a specific example is given below in which, at a time T13 later than the time T12, the aircraft 600 executes the processing of step S107 again while flying toward the move destination.

At the time T13, the controller 692 of the aircraft 600 determines that the aircraft 600 has not arrived at the move destination (step S107; No), and sequentially executes the processing of steps S96, S97, S109 to S111, and S100. As a result, the aircraft 600 flies with the first face PL1 of the predetermined color facing the second observation point PB2 from which viewing has not been performed and, then, sends the second facing notification to the second terminal device 900 that is located at the second observation point PB2.

In the present embodiment, a description of a specific example is given below in which, since the second observer views the aircraft 600 immediately after the time T13, an operation for causing the viewing report to be sent is performed on the second terminal device 900.

The controller 692 of the aircraft 600 determines that the data communication circuit 614a receives the viewing report from the second terminal device 900 (step S101; Yes) and, in the terminal table of FIG. 18, updates the viewing flag associated with the communication address of the second terminal device 900 to the value "true" (step S102). Next, the processing of steps S103 to S106 is executed.

In the present embodiment, a description of a specific example is given below in which, at a time T14 later than the time T13, the aircraft 600 that is flying toward the move destination executes the processing of step S107 again.

At the time T14, the controller 692 of the aircraft 600 determines that the aircraft 600 has not arrived at the move destination (step S107; No). Then, the controller 692 identifies that information expressing the position of an observation point associated with the viewing flag of the value "false", which expresses that the aircraft 600 has not been viewed, is not stored in the terminal table of FIG. 18. As such, the controller 692 of the aircraft 600 selects the move destination of the aircraft 600 as the facing target of the first face PL1 of the predetermined color (step S96).

Next, the controller 692 of the aircraft 600 determines that the selected facing target is not the first observation point PB1 or the second observation point PB2 (step S97; No and step S109; No) and, then, determines that the facing target is the move destination. Then, the controller 692 executes the orientation change control processing of FIG. 11 to cause the aircraft 600 to fly with the first face PL1 facing the move destination (step S112). In the present embodiment, the orientation change control processing executed to cause the first face PL1 to face the move destination is referred to as "third orientation change control processing."

In the third orientation change control processing, the controller 692 of the aircraft 600 calculates a vector from the aircraft 600 toward the move destination in step S31 and, then, uses the calculated vector to execute the processing of steps S32 to S39.

Thereafter, the processing of steps S100 to S107 is executed and, then, when the controller 692 of the aircraft 600 determines that the aircraft 600 has arrived at the destination (step S107; Yes), the controller 692 outputs a control signal for landing (step S108) and, then, ends the flight control processing.

According to these configurations, the data communication circuit 614a of the aircraft 600 receives, from the first terminal device 800, the information expressing the position of the first terminal device 800 and, receives, from the second terminal device 900, the information expressing the position of the second terminal device 900. Additionally, the controller 692 of the aircraft 600 sets the point of the position of the first terminal device 800 expressed by the received information as the first set point by setting the point of the position as the first observation point PB1 and, sets the point of the position of the second terminal device 900 as the second set point by setting the point of the position as the second observation point PB2. Furthermore, the controller 692 executes the first orientation change control processing for causing the first face PL1 of the predetermined color to face the first observation point PB1 that is the first set point and, thereafter, executes the second orientation change control processing for causing the first face PL1 of the predetermined color to face the second observation point PB2 that is the second set point, when the data communication circuit 614a receives, from the first terminal device 800, the viewing report informing that the aircraft 600 has been viewed. Thus, when the aircraft 600 is viewed at the first observation point PB1, the aircraft 600 can cause the first face PL1 of the predetermined color to face the second observation point PB2 and, as such, the visibility of the aircraft 600 from the second observation point PB2 can be improved while reliably improving the visibility of the aircraft 600 from the first observation point PB1.

According to these configurations, when the controller 692 of the aircraft 600 performs the first orientation change control processing, the controller 692 performs the first notification control processing for causing the first facing notification informing that the first face PL1 of the predetermined color is facing the first terminal device 800 to be sent to the first terminal device 800. Additionally, when the controller 692 performs the second orientation change control processing, the controller 692 performs the second notification control processing for causing the second facing notification informing that the first face PL1 of the predetermined color is facing the second terminal device 900 to be sent to the second terminal device 900. As such, when the first face PL1 of the predetermined color is caused to face the first terminal device 800, the aircraft 600 can notify the first terminal device 800 that the first face PL1 has been caused to face the first terminal device 800. Therefore, the first observer carrying the first terminal device 800 can ascertain the timing at which the first terminal device 800 is caused to face the first face PL1 and, as such, can discover the aircraft 600 more easily than when it is not possible to ascertain whether the first face PL1 is facing the first terminal device 800 or is facing the second terminal device 900. Likewise, the second observer carrying the second terminal device 900 can easily discover the aircraft 600.

Embodiment 5

In Embodiment 4, a description is given in which, when the aircraft 600 takes off from the office BO, the first face PL1 of the predetermined color is caused to face the first observation point PB1, which is closer to the position of the aircraft 600, among the first observation point PB1 and the second observation point PB2. Additionally, a description is given in which, when the aircraft 600 receives, from the first terminal device 800, the viewing report informing that the first observer has viewed the aircraft 600, the first face PL1 is caused to face the second observation point PB2.

However, the present disclosure is not limited thereto, and the aircraft 600 according to the present embodiment repeatedly performs, while rotating, first orientation change control for causing the first face PL1 to face the first observation point PB1 and second orientation change control for causing the first face PL1 to face the second observation point PB2. In the following, the configurations that are the same as those in Embodiment 4 are denoted with the same reference numerals used in Embodiment 4, and the description focuses on the differences between the present embodiment and Embodiment 4.

Figure 21:
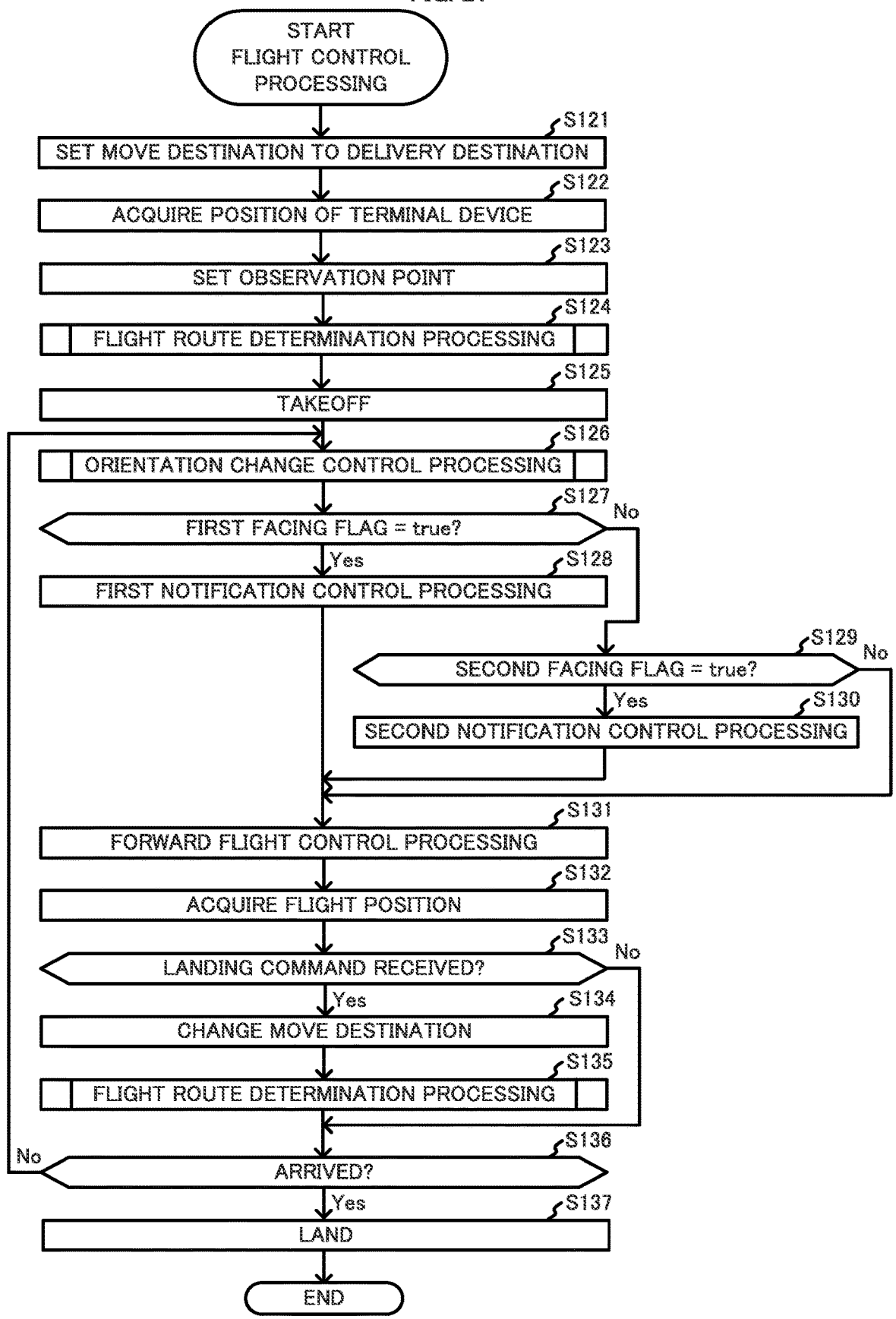
FIG. 21 is a flowchart illustrating an example of flight control processing executed by the aircraft according to Embodiment 5.

The CPU 611 of the aircraft 600 according to the present embodiment executes flight control processing such as illustrated in FIG. 21. When the execution of the flight control processing starts, the CPU 611 executes the same processing as steps S91 to S95 of FIG. 19A (steps S121 to S125). As a result, the aircraft 600 takes off from the office BO.

Figure 22A:
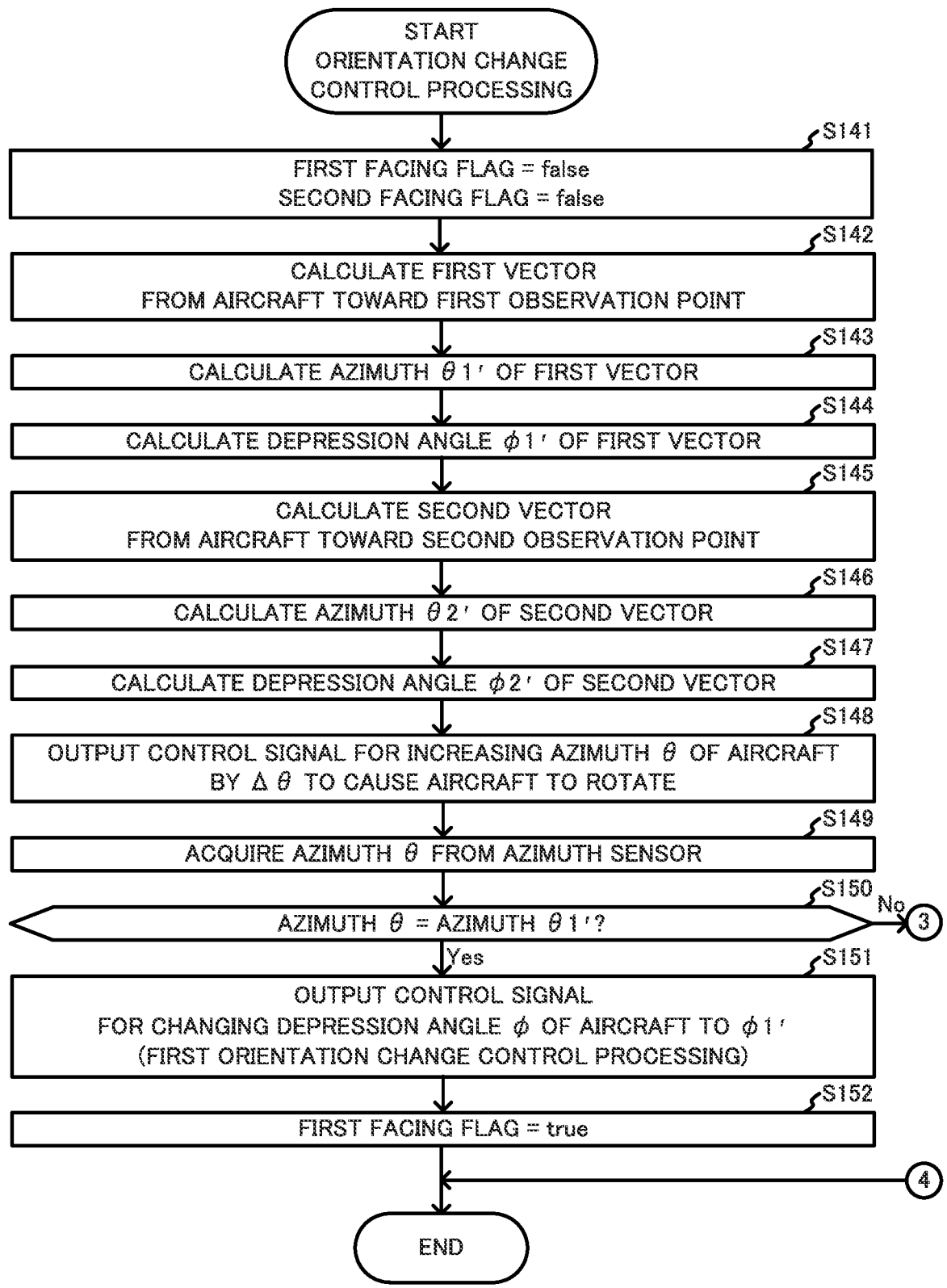
FIGS. 22A and 22B are a flowchart illustrating an example of orientation change control processing executed by the aircraft according to Embodiment 5.
Figure 22B:
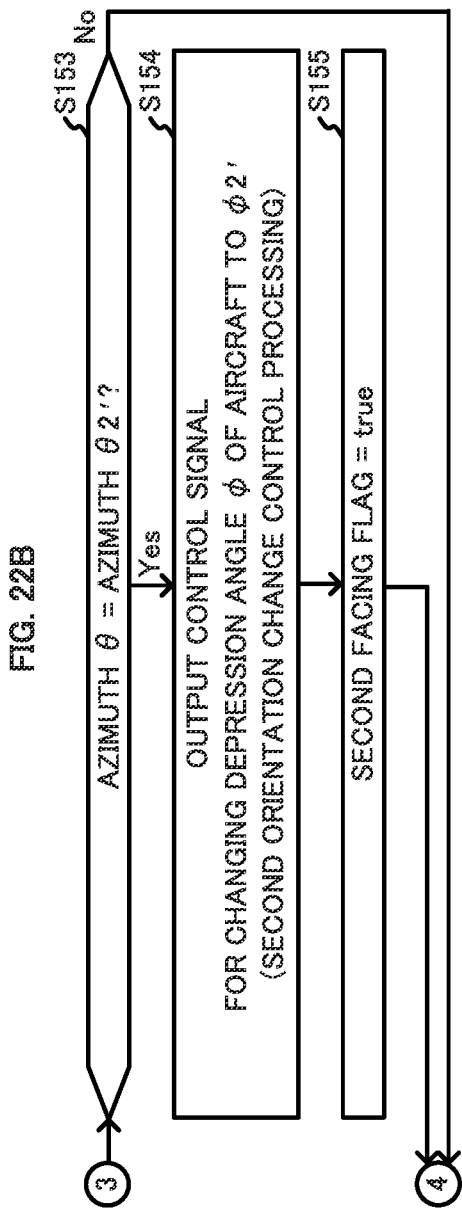

Next, orientation change control processing such as illustrated in FIGS. 22A and 22B is executed (step S126). When the execution of the orientation change control processing starts, the controller 692 of the aircraft 600 initializes a first facing flag, expressing whether or not the first face PL1 of the predetermined color is facing the first observation point PB1, to a value "false" expressing that the first face PL1 is not facing the first observation point PB1. Likewise, the controller 692 initializes a second facing flag, expressing whether or not the first face PL1 of the predetermined color is facing the second observation point PB2, to the value "false" (step S141).

The controller 692 of the aircraft 600 executes the same processing as step S31 of FIG. 11, thereby calculating a first vector from the aircraft 600 toward the first observation point PB1 (step S142). Next, the controller 692 executes the same processing as steps S32 and S36 of FIG. 11, thereby calculating an azimuth θ1' formed by the first vector and the reference direction, and a minimum depression angle φ1' formed by the first vector and the horizontal plane (steps S143 and S144).

Likewise, the controller 692 of the aircraft 600 calculates a second vector from the aircraft 600 toward the second observation point PB2, an azimuth θ' formed by the second vector and the reference direction, and a minimum depression angle φ2' formed by the second vector and the horizontal plane (steps S145 to S147).

Next, the controller 692 of the aircraft 600 reads information expressing the predetermined angle Δθ from the information storage 699. Next, to cause the aircraft 600 to rotate, the controller 692 outputs, to the drive circuit 619, a control signal for increasing the azimuth θ formed by the forward direction of the aircraft 600 and the reference direction by the angle Δθ expressed in the read information (step S148).

Next, the controller 692 of the aircraft 600 executes the same processing as in step S33 of FIG. 11 to acquire the information expressing the azimuth θ formed by the forward direction of the aircraft 600 and the reference direction (step S149).

Thereafter, the controller 692 of the aircraft 600 determines whether or not the azimuth θ formed by the forward direction of the aircraft 600 and the reference direction, and the azimuth θ1' formed by the first vector from the aircraft 600 toward the first observation point PB1 and the reference direction match (step S150). At this time, when the controller 692 determines that the azimuth θ of the forward direction and the azimuth θ1' of the first vector match (step S150; Yes), the controller 692 outputs, to the drive circuit 619, a control signal for changing the minimum depression angle φ formed by the forward direction of the aircraft 600 and the horizontal plane to the minimum depression angle φ1' formed by the first vector and the horizontal plane (step S151). As a result, the controller 692 executes the first orientation change control processing for causing the first face PL1 of the predetermined color, which is facing the forward direction of the aircraft 600, to face the first observation point PB1.

Thereafter, the controller 692 of the aircraft 600 updates the value of the first facing flag to the value "true" expressing that the first face PL1 is has been caused to face the first observation point PB1 (step S152), and ends the execution of the orientation change control processing.

In step S150, when the controller 692 of the aircraft 600 determines that the azimuth θ and the azimuth θ1' do not match (step S150; No), the controller 692 determines whether or not the azimuth θ of the forward direction of the aircraft 600 and the azimuth θ2' of the second vector from the aircraft 600 toward the second observation point PB2 match (step S153). At this time, when the controller 692 determines that the azimuth θ of the forward direction and the azimuth θ2' of the second vector match (step S153; Yes), the controller 692 outputs, to the drive circuit 619, a control signal for changing the depression angle φ of the aircraft 600 to the depression angle φ2' of the second vector (step S154). As a result, the controller 692 executes the second orientation change control processing for causing the first face PL1 to face the second observation point PB2. Then, the controller 692 updates the value of the second facing flag to the value "true" (step S155), and ends the execution of the orientation change control processing.

In step S153, when the controller 692 of the aircraft 600 determines that the azimuth θ and the azimuth θ2' do not match (step S153; No), the controller 692 ends the execution of the orientation change control processing.

After the execution of the orientation change control processing in step S126 of FIG. 21, the controller 692 of the aircraft 600 determines whether or not the value of the first facing flag is the value "true" expressing that the first face PL1 of the predetermined color is facing the first observation point PB1 (step S127). At this time, when the controller 692 determines that the value of the first facing flag is "true" (step S127; Yes), the controller 692 executes the first notification control processing (step S128). As in Embodiment 4, the first notification control processing is processing for causing the data communication circuit 614a to send, to the first terminal device 800, the first facing notification that informs that the first face PL1 is facing the first terminal device 800 located at the first observation point PB1.

In step S127, when the controller 692 of the aircraft 600 determines that the value of the first facing flag is not "true" (step S127; No), the controller 692 determines whether or not the value of the second facing flag is "true" (step S129). At this time, when the controller 692 determines that the value of the second facing flag is "true" (step S129; Yes), the controller 692 executes the second notification control processing for causing the second facing notification to be sent to the second terminal device 900 (step S130).

After the execution of step S128 or S130, or in step S129, when a determination is made that the value of the second facing flag is not "true" (step S129; No), the same processing as steps S100, and S103 to S106 of FIG. 19A is executed (steps S131 to S135). As a result, the aircraft 600 flies forward on the flight route.

Thereafter, when the controller 692 of the aircraft 600 determines that the aircraft 600 has not arrived at the move destination (step S136; No), the processing of steps S126 to S135 is repeated (steps S126 to S135). Then, when the controller 692 determines that the aircraft 600 has arrived at the move destination (step S136; Yes), the same processing as step S16 of FIG. 6 is executed (step S137), the aircraft 600 lands at the move destination and, then, the execution of the flight control processing is ended.

According to these configurations, the controller 692 of the aircraft 600 repeatedly performs the first orientation change control processing and the second orientation change control processing while causing the aircraft 600 to rotate, performs the first notification control processing when the first face PL1 of the predetermined color faces the first observation point PB1 that is the first set point, and performs the second notification control processing when the first face PL1 of the predetermined color faces the second observation point PB2 that is the second set point. As such, the aircraft 600 can cause the first face PL1 of the predetermined color to face the first observation point PB1 and the second observation point PB2 within the time required for the aircraft 600 to rotate one time and, therefore, in the amount of time required to rotate one time, the visibility of the aircraft 600 from both the first observation point PB1 and the second observation point PB2 can be improved. Additionally, the aircraft 600 can notify both the first terminal device 800 and the second terminal device 900 that the first face PL1 has been caused to face the first terminal device 800 and the second terminal device 900 in the amount of time required to rotate one time.

Modified Example of Embodiment 5

In Embodiment 5, a description is given in which the controller 692 of the aircraft 600 repeatedly performs the first orientation change control processing and the second orientation change control processing while causing the aircraft 600 to rotate. However, Embodiment 5 is not limited thereto. A configuration is possible in which the controller 692 of the aircraft 600 repeats, according to a predetermined rule or randomly, the first orientation change control processing and the second orientation change control processing described in Embodiment 1 within a predetermined amount of time. The predetermined rule may be a rule for alternately executing the first orientation change control processing and the second orientation change control processing.

Embodiment 6

In Embodiment 2, a description is given in which the aircraft 600 includes the display device 615b that has the display surface, and that the display surface is flat. Additionally, in Embodiment 2, a description is given in which, in step S49 of FIG. 14, the aircraft 600 executes display control processing for causing the image of the predetermined color to be displayed on the display surface and, then, in step S50, performs orientation change control processing for causing the display surface to face the predetermined point.

However, the present disclosure is not limited thereto, and the aircraft 600 according to the present embodiment includes a display device 680 having a circular cylindrical shape such as illustrated in FIG. 23 instead of the display device 615b, and the display surface of the display device 680 is a curved face that forms the side surface of the circular cylinder. Additionally, the aircraft 600 according to the present embodiment performs display control processing for causing an image of the predetermined color to be displayed on a face that is the display surface of the display device 680 and that is a partial face facing the predetermined point. In the following, the configurations that are the same as those in Embodiment 2 are denoted with the same reference numerals used in Embodiment 2, and the description focuses on the differences between the present embodiment and Embodiment 2.

In the present specification, the face that is the display surface of the display device 615b according to Embodiment 2 and that is caused to face the predetermined point is referred to as a "first face", and the face that is the display surface of the display device 680 according to the present embodiment and that is a partial face facing the predetermined point is referred to as a "second face" in order to differentiate between these two faces. Additionally, in the present specification, the display control processing described in Embodiment 2 is referred to as "first display control processing", and the display control processing described in the present embodiment is referred to as "second display control processing" in order to differentiate between these two display control processings.

As with the aircraft 600 according to Embodiment 2, the aircraft 600 according to the present embodiment includes the dome-type imaging device 670 illustrated in FIG. 13 on the top surface of the control device 610.

The aircraft 600 according to the present embodiment differs from the aircraft 600 according to Embodiment 2 in that instead of the first holding frame 651a and the second holding frame 651b that surround and hold an article, a storage cabinet 650 that stores an article is provided below the control device 610. The storage cabinet 650 includes a box body that forms a space that is enclosed by a non-illustrated back plate, floor plate, ceiling plate, and two side plates. The front of the box body is open. A door and a non-illustrated door frame that receives the door are installed in the opening of the box body.

The display device 680 that has the circular cylindrical shape is installed on the bottom surface of the storage cabinet 650 of the aircraft 600. The display device 680 is installed on the bottom surface of the storage cabinet 650 such that the downward direction of the aircraft 600 and the axis of the circular cylinder are parallel, and the axis of the circular cylinder passes through the position measurement circuit 616. Due to this, the latitude and longitude of the aircraft 600 measured by the position measurement circuit 616 match the latitude and longitude of the axis of the circular cylinder.

The display device 680 of the aircraft 600 includes a display surface that forms the side surface of the circular cylinder. As such, when the aircraft 600 is flying at a position that is higher than the altitude of the first observation point PB1 and the second observation point PB2 and that is different than positions directly above the first observation point PB1 and the second observation point PB2, regardless of where the first observation point PB1 and the second observation point PB2 are located, at least a portion of the display surface of the display device 680 is visible from the first observation point PB1 and the second observation point PB2.

The main scanning direction of the display surface of the display device 680 of the aircraft 600 is a direction perpendicular to the axis of the circular cylinder, and the sub scanning direction is a direction parallel to the axis of the circular cylinder. The display surface of the display device 680 includes a pixel surface in which Nr pixel columns, each including Nc pixels arranged in the sub scanning direction, are arranged in the main scanning direction (where Nc and Nr are integers of 2 or greater). The No. 1 pixel column to the No. Nr pixel column are arranged at equal intervals. When the forward direction of the aircraft 600 is the reference direction, the No. 1 pixel column is arranged at a position at which the azimuth measured counterclockwise from the reference direction is 0 degrees. Due to these configurations, when the forward direction of the aircraft 600 is the reference direction, the No. n pixel column is arranged at a position at which the azimuth measured counterclockwise from the reference direction is an angle θn expressed by the following equation (where n is an integer from 1 to Nr).

$$\theta n = (n-1) \times 360/Nr \qquad (5)$$

In this equation, θn represents the azimuth, Nr represents the total number of pixel columns, and n represents the number of the pixel column.

The CPU 611 of the aircraft 600 according to the present embodiment executes flight control processing such as illustrated in FIG. 24. When the execution of the flight control processing starts, the CPU 611 executes the same processing as steps S41 to S48 of FIG. 14 (steps S161 to S168). As a result, a captured image is obtained due to the imaging device 670 of the aircraft 600 imaging a scene in the direction opposite the direction from the aircraft 600 toward the first observation point PB1 or the second observation point PB2, and the color of the image to be displayed on the display device 680 is set to the complementary color of the color of the captured image.

Next, second display control processing such as illustrated in FIG. 25 is executed for causing an image of the color set in step S168 to be displayed on the second face that is the display surface that has a circular cylindrical shape of the display device 680 and that is the partial face facing the first observation point PB1 or the second observation point PB2 (step S169).

Figure 26:
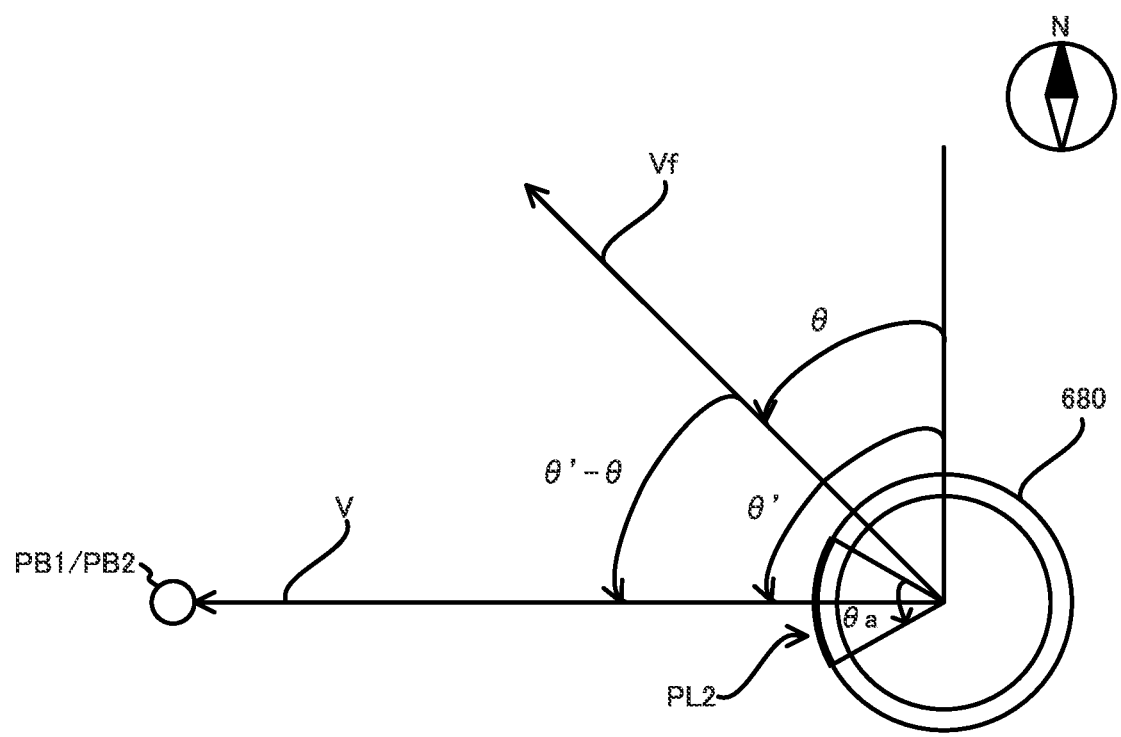
FIG. 26 is a drawing illustrating an example of a second face.

When the execution of the second display control processing starts, the controller 692 of the aircraft 600 executes the same processing as step S31 of FIG. 11, thereby calculating a vector V such as illustrated in FIG. 26 from the aircraft 600 toward the first observation point PB1 or the second observation point PB2 (step S181).

Next, the controller 692 of the aircraft 600 calculates the azimuth θ' of the vector V measured counterclockwise from the reference direction, namely north (step S182). Additionally, the same processing as step S33 of FIG. 11 is executed and, as a result, the acquirer 691 acquires the information expressing the azimuth θ of the vector Vf that expresses the forward direction of the aircraft 600, measured counterclockwise from the reference direction, namely north (step S183).

Thereafter, when the controller 692 of the aircraft 600 subtracts the azimuth θ from the azimuth θ' to calculate, for the direction from the axis of the circular cylinder toward the first observation point PB1 or the second observation point PB2, an azimuth θ-θ' measured counterclockwise from a reference direction when the forward direction of the aircraft 600 is the reference direction.

Next, the controller 692 of the aircraft 600 acquires, from the information storage 699, information expressing a viewing angle θa of the display device 680 (step S184). Next, the controller 692 identifies a plurality of pixel columns arranged at positions where the azimuth, in a case in which the forward direction of the aircraft 600 is the reference direction, is an angle included in the range of [θ'-θ-θa/2] to [θ'-θ+θa/2]. Then, the controller 692 identifies a partial pixel surface constituted by the identified plurality of pixel columns as a visible surface on which the displayed image can be seen from the first observation point PB1 or the second observation point PB2 (step S185). Additionally, the controller 692 identifies the partial pixel surface identified as the visible surface as a second face PL2 that is facing the first observation point PB1 or the second observation point PB2 (step S186).

To identify the second face PL2, the controller 692 of the aircraft 600 determines whether or not the azimuth [θ'-θ-θa/2] is a negative value. At this time, when the controller 692 determines that the azimuth [θ'-θ-θa/2] is a negative value, the controller 692 adds 360 degrees to [θ'-θ-θa/2] to obtain a positive value. Then, the azimuth to which 360 degrees has been added is used in Equation (5) above to calculate the pixel number n1 of the pixel column arranged at the position where the azimuth is [θ'-θ-θa/2]. Likewise, the controller 692 uses the azimuth [θ'-θ+θa/2] in Equation (5) above to calculate the pixel number nu of the pixel column arranged at the position where the azimuth is [θ'-θ+θa/2]. Then, the controller 692 identifies the partial pixel surface constituted by the No. n1 to the No. Nr pixel columns and the No. 1 to the No. nu pixel columns as the second face PL2.

In contrast, when the controller 692 of the aircraft 600 determines that the azimuth [θ'-θ-θa/2] is not a negative value, the controller 692 determines whether or not the azimuth [θ'-θ+θa/2] is a value greater than or equal to 360 degrees. At this time, when the controller 692 determines that the azimuth [θ'-θ+θa/2] is a value greater than or equal to 360 degrees, the controller 692 subtracts 360 degrees from [θ'-θ+θa/2]. Then, the azimuth from which 360 degrees has been subtracted is used in Equation (5) above to calculate the pixel number nu of the pixel column arranged at the position where the azimuth is [θ'-θ+θa/2]. Likewise, the controller 692 calculates the pixel number n1 of the pixel column arranged at the position where the azimuth is [θ'-θ-θa/2]. Then, the controller 692 identifies the partial pixel surface constituted by the No. n1 to the No. Nr pixel columns and the No. 1 to the No. nu pixel columns as the second face PL2.

In contrast, when the controller 692 of the aircraft 600 determines that the azimuth [θ'-θ+θa/2] is a value less than 360 degrees, the controller 692 uses the azimuth [θ'-θ-θa/2] and the azimuth [θ'-θ+θa/2] in Equation (5) above to calculate the pixel numbers nu and n1. Then, the controller 692 identifies the partial pixel surface constituted by the No. n1 to the No. nu pixel columns as the second face PL2.

Thereafter, the controller 692 of the aircraft 600 generates an entire image in which the color of the partial image displayed on the second face PL2 is the color predetermined in step S168 of FIG. 24 (step S187). Next, the controller 692 displays the generated entire image on the display surface of the display device 680, thereby displaying the partial image of the predetermined color on the second face PL2 that is facing the first observation point PB1 or the second observation point PB2 (step S188). Then, the controller 692 ends the execution of the second display control processing.

After the execution of the second display control processing in step S169 of FIG. 24, the same processing as steps S51 to S58 of FIG. 14 is executed without executing the orientation change control processing described in Embodiment 2 (steps S170 to S177) and, then, the execution of the flight control processing is ended. In the present embodiment, the orientation change control processing is not executed because the image of the predetermined color is displayed on the second face PL2 that is facing the first observation point PB1 or the second observation point PB2 and, as such, it is not necessary to change the orientation of the aircraft 600.

According to these configurations, the aircraft 600 that flies in space includes the acquirer 691 that acquires the information expressing the position of the aircraft 600. Additionally, the aircraft 600 includes the controller 692 that performs, based on the acquired information, the second display control processing for causing the image of the predetermined color to be displayed on the second face PL2 that is the display surface of the display device 680 of the aircraft 600 and that is a partial face facing the first observation point PB1 or the second observation point PB2 that are the predetermined points. As such, the aircraft 600 can improve the visibility of the aircraft 600 from the first observation point PB1 or the second observation point PB2 that are the predetermined points.

According to these configurations, the aircraft 600 further includes the imaging device 670 that obtains a captured image by imaging, from the aircraft 600, a scene in the direction opposite the direction from the aircraft 600 toward the first observation point PB1 or the second observation point PB2 that are the predetermined points. Moreover, the controller 692 of the aircraft 600 sets the complementary color of the color of the captured image obtained by the imaging device 670 as the predetermined color by setting, to the complementary color, the color of the image to be displayed on the second face PL2 that is facing the first observation point PB1 or the second observation point PB2. Furthermore, the controller 692 performs the second display control for displaying the image of the predetermined color on the second face PL2. As such, the aircraft 600 can display an image of the complementary color of the color of the background on the second face PL2 that is facing the first observation point PB1 or the second observation point PB2, even when the background of the aircraft 600, observed when observing the aircraft 600 from the first observation point PB1 or the second observation point PB2, changes due to the flying of the aircraft 600. Therefore, the aircraft 600 can continually improve the visibility of the aircraft 600 from the first observation point PB1 or the second observation point PB2.

In the present embodiment, a description is given in which the main scanning direction of the display surface of the display device 680 is the direction perpendicular to the axis of the circular cylinder, and the sub scanning direction is the direction parallel to the axis of the circular cylinder. However, the present embodiment is not limited thereto. A configuration is possible in which the main scanning direction of the display surface is the direction parallel to the axis of the circular cylinder and the sub scanning direction is the direction perpendicular to the axis of the circular cylinder. Additionally, in the present embodiment, a description is given in which the display surface of the display device 680 includes the pixel surface in which Nr pixel columns, each including Nc pixels arranged in the sub scanning direction, are arranged in the main scanning direction. However, the present embodiment is not limited thereto. A configuration is possible in which the display surface includes a pixel surface in which Nr pixel columns, each including Nc pixels arranged in the main scanning direction, are arranged in the sub scanning direction.

A description is given in which the aircraft 600 according to the present embodiment executes the color setting processing in step S168 of FIG. 24 and, then, executes the second display control processing illustrated in FIG. 25 in step S169. It is described that, due to this, the aircraft 600 identifies the second face PL2 that is a portion of the display surface of the display device 680 and that is facing the first observation point PB1 or the second observation point PB2, and displays on the second face PL2 a partial image of the color predetermined by executing the color setting processing.

However, the present embodiment is not limited thereto, and a configuration is possible in which the aircraft 600 executes the color setting processing in step S168 and, then executes a non-illustrated second display control processing instead of the second display control processing of FIG. 25. A configuration is possible in which the non-illustrated second display control processing is processing in which an entire image of the predetermined color is displayed on the entire display surface of the display device 680 in step S168, without identifying the second face PL2. According to these configurations, the aircraft 600 can display the image of the predetermined color in step S168 on the entire display surface of the display device 680, including the second face PL2, without identifying the second face PL2 that is facing the first observation point PB1 or the second observation point PB2. Therefore, compared to a case in which the second face PL2 is identified, the aircraft 600 can improve the visibility of the aircraft 600 from the first observation point PB1 or the second observation point PB2 and, at the same time, reduce the computation load of the display control processing executed to improve the visibility.

Modified Example 1 of Embodiment 6

In Embodiment 6, a description is given in which the imaging device 670 of the aircraft 600 images a scene in the direction opposite the direction from the aircraft 600 toward the first observation point PB1 or the second observation point PB2, and the controller 692 of the aircraft 600 executes second display control processing for displaying the complementary color of the color of the captured image obtained by the imaging device 670 on the second face PL2 that is a portion of the display surface of the display device 680 and that is a partial face facing the first observation point PB1 or the second observation point PB2. However, Embodiment 6 is not limited thereto, and the controller 692 of the aircraft 600 according to the present modified example executes second display control processing for controlling the color of the entire display surface of the display device 680.

When the execution of the second display control processing according to the present modified example starts, the controller 692 of the aircraft 600 initializes a variable n, expressing the number of the pixel column, to a value "1." Next, the controller 692 uses the variable n in Equation (5) above to execute processing for calculating the azimuth θ1 formed by the reference direction and a direction from the axis of the circular cylinder toward the No. 1 pixel column when the forward direction of the aircraft 600 is the reference direction.

Thereafter, the controller 692 of the aircraft 600 adds 180 degrees to the calculated azimuth θ1 to calculate an azimuth θr1 of a direction opposite the direction from the axis of the circular cylinder toward the No. 1 pixel column. Next, the controller 692 outputs, to the drive circuit 619, a control signal for changing the azimuth formed by the forward direction of the aircraft 600 and the optical axis AO of the imaging device 670 to the calculated azimuth θr1. Then, the controller 692 outputs, to the imaging device 670, a signal commanding imaging to be performed and, then, acquires, from the imaging device 670, information expressing a captured image. Next, the controller 692 of the aircraft 600 sets the color of the No. 1 pixel column that forms the entire image to be displayed on the display device 680 to the complementary color of the captured image expressed by the acquired information.

Thereafter, the controller 692 of the aircraft 600 increases the variable n expressing the number of the pixel line by the value "1", and repeats the processing described above from the processing for calculating the azimuth θn until the value of the variable n is greater than the total number Nr of pixel columns, thereby setting the color of the No. 2 to the No. Nr pixel columns that form the entire image.

When the value of the variable n is greater than the total number Nr of pixel columns, the controller 692 of the aircraft 600 performs control for generating an entire image that has the set colors of the No. 1 to the No. Nr pixel columns, and displaying the generated entire image on the display surface of the display device 680. Then, the controller 692 ends the execution of the second display control processing.

According to these configurations, the aircraft 600 includes the display device 680 that has a circular cylindrical shape, and the display device 680 includes the display surface that forms the side surface of the circular cylinder. The display surface is constituted by a pixel surface in which Nr pixel columns, each including a plurality of pixels arranged in a direction parallel to the axis of the circular cylinder, are arranged in the main scanning direction that is perpendicular to the axis of the circular cylinder. For each of the No. n pixel columns that are the No. 1 to the No. Nr pixel columns, the controller 692 of the aircraft 600 sets the color of the No. n pixel column to the complementary color, of the color of the captured image obtained by the imaging device 670 imaging a scene in the direction opposite the direction from the axis of the circular cylinder toward the No. n pixel column. Additionally, the controller 692 generates an image having the set colors of the No. 1 to the No. Nr pixel columns, and displays the generated image on the display device 680 that has the circular cylindrical shape. As such, regardless of the azimuth from which the aircraft 600 is observed, the visibility of the aircraft 600 from the point at which observation is performed can be improved. Additionally, even when the aircraft 600 is simultaneously observed from the first observation point PB1 and the second observation point PB2 that are mutually different geographical locations, the visibility of the aircraft 600 from both the first observation point PB1 and the second observation point PB2 can be improved.

In the present modified example, a description is given in which the controller 692 of the aircraft 600 calculates the azimuth θn of the No. n pixel column, causes imaging to be performed after changing the azimuth of the optical axis AO of the imaging device 670 to the azimuth obtained by adding 180 degrees to the azimuth θn, and sets the color of the No. n pixel column to the complementary color of the captured image obtained by the imaging. However, the present modified example is not limited thereto, and a configuration is possible in which the controller 692 calculates an average of the azimuths of a plurality of pixel columns, namely the No. n to the No. n+k pixel column, causes imaging to be performed after changing the azimuth of the optical axis AO of the imaging device 670 to the azimuth obtained by adding 180 degrees to the average of the azimuths, and sets the color of the No. n to the No. n+k pixel columns to the complementary color of the captured image obtained by the imaging (where n is an integer from 1 to Nr-k, k is an integer from 1 to Nr-n, and Nr is an integer of 2 or greater).

Modified Example 2 of Embodiment 6

In Embodiment 6, a description is given in which the aircraft 600 includes the circular cylindrical display device 680. Additionally, in Embodiment 6, a description is given in which the controller 692 of the aircraft 600 identifies, as the second face PL2 that is facing the first observation point PB1 or the second observation point PB2, a face that is the display surface that forms the side surface of the circular cylinder of the display device 680 and that is a partial face on which the displayed image can be seen from the first observation point PB1 or the second observation point PB2.

However, Embodiment 6 is not limited thereto, and a configuration is possible in which the aircraft 600 includes a non-illustrated rectangular cylindrical display device, and the rectangular cylindrical display device includes a plurality of flat display surfaces that form each of a plurality of side surfaces of a rectangular cylinder. Additionally, a configuration is possible in which, of the plurality of display surfaces of the rectangular cylindrical display device, the controller 692 of the aircraft 600 identifies, as the second face PL2 that is facing the first observation point PB1 or the second observation point PB2, an entire face or a partial face of one or a plurality of display surfaces on which the displayed image can be seen from the first observation point PB1 or the second observation point PB2.

However, Embodiment 6 is not limited thereto, and a configuration is possible in which the aircraft 600 includes a plurality of display devices that includes a flat display surface, and the plurality of display devices is installed on the aircraft 600 so as to form a rectangular cylinder and such that the display surfaces face outward from the rectangular cylinder. Moreover, a configuration is possible in which, of the plurality of display devices that form the rectangular cylinder, the controller 692 of the aircraft 600 identifies, as the second face PL2 that is facing the first observation point PB1 or the second observation point PB2, an entire face or a partial face of the display surface of each of one or a plurality of display devices on which the displayed image can be seen from the first observation point PB1 or the second observation point PB2.

Modified Example 3 of Embodiment 6

In Embodiment 6, a description is given in which the aircraft 600 includes the imaging device 670 on the top side of the control device 610, and includes the display device 680 on the bottom side of the control device 610. However, Embodiment 6 is not limited thereto. A configuration is possible in which the aircraft 600 includes the imaging device 670 and the display device 680 on the top side of the control device 610. Additionally, a configuration is possible in which the aircraft 600 includes the imaging device 670 on the bottom side of the control device 610 and the display device 680 on the top side of the control device 610, or the aircraft 600 includes the imaging device 670 and the display device 680 on the bottom side of the control device 610. Furthermore, a configuration is possible in which the aircraft 600 includes, on each of the bottom side and the top side of the control device 610, an imaging device that has the same configuration and functions as the imaging device 670, and includes, on each of the bottom side and the top side of the control device 610, a display device that has the same configuration and functions as the display device 680.

Modified Example 4 of Embodiment 6

Embodiment 3 and Embodiment 6 can be combined. Specifically, a configuration is possible in which the second face PL2 emits light of the predetermined color. Additionally, a configuration is possible in which the controller 692 of the aircraft 600 performs light-emission control for causing the second face PL2 to emit light in a time frame from a time included in a predetermined time frame that includes the sunset time to a time included in a predetermined time frame that includes the sunrise time.

Modified Example 5 of Embodiment 6

Modified Example 2 of Embodiment 1 and Embodiment 6 can be combined. Specifically, a configuration is possible in which the controller 692 of the aircraft 600 performs the second display control processing and the notification control processing when the distance, from the position of the aircraft 600 expressed in the information acquired by the acquirer 691 to the first observation point PB1 or the second observation point PB2 that are the predetermined points, is less than or equal to the predetermined distance L. Additionally, a configuration is possible in which the controller 692 of the aircraft 600 does not perform the second display control processing and the notification control processing when the distance from the position of the aircraft 600 to the first observation point PB1 or the second observation point PB2 is greater than the predetermined distance L.

Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6 of the present disclosure can each be combined with each other.

It is possible to provide a control device 100 that includes configurations for realizing the functions according to any of Embodiments 1 to 6, Modified Examples 1 to 16 of Embodiment 1, Modified Examples 1 to 3 of Embodiment 2, Modified Examples 1 to 3 of Embodiment 3, the modified examples of Embodiment 5, and Modified Examples 1 to 5 of Embodiment 6, and a control device 610 that includes configurations for realizing the functions according to Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6. In addition, it is possible to provide a system that includes a plurality of devices that includes, as an overall system, configurations for realizing the functions according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6.

A control device 100 that is provided, in advance, with configurations to realize the functions according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6 can be provided. Additionally, by applying a program, an existing control device can be made to function as the control device 100 according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6. That is, by using a computer (CPU or the like) that controls an existing control device to execute a program for realizing the various functional configurations of the control device 100 described in any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6, that existing control device can be caused to function as the control device 100 according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6.

A control device 610 that is provided, in advance, with configurations to realize the functions according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6 of the present disclosure can be provided. Additionally, by applying a program, an existing control device can be made to function as the control device 610 according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6. That is, by using a computer (CPU or the like) that controls an existing control device to execute a program for realizing the various functional configurations of the control device 610 described in any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6, that existing control device can be caused to function as the control device 610 according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6.

Any distribution method of such a program can be used. For example, the program can be the stored and distributed on a recording medium such as a memory card, a compact disc (CD) ROM, or a digital versatile disc (DVD) ROM, or can be distributed via a communication medium such as the internet.

Additionally, the method according to the present disclosure can be implemented using the control device 100 according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6, and the control device 610 according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6. Additionally, a method according to the present disclosure can be implemented using the flight system 1 according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6. Furthermore, a method according to the present disclosure can be implemented using the aircraft 600 according to any of Embodiments 1 to 6, Modified Examples 1 to 16 of Embodiment 1, Modified Examples 1 to 3 of Embodiment 2, Modified Examples 1 to 3 of Embodiment 3, the modified example of Embodiment 5, and Modified Examples 1 to 5 of Embodiment 6.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

APPENDICES

Appendix 1

An aircraft configured to fly in a space, the aircraft including:
   at least one memory storing program code; and
   at least one processor configured to read the program code and operate as instructed by the program code, wherein the program code includes
      acquisition code configured to cause the at least one processor to acquire information expressing a position of the aircraft, and
      control code configured to cause the at least one processor to
         perform, based on the acquired information, orientation change control for causing a first face to face a predetermined point, the first face being a face of the aircraft and having a predetermined color, or
         perform, based on the acquired information, display control for causing an image of the predetermined color to be displayed on a second face, the second face being a display surface of a display device of the aircraft and, a partial face or an entire face facing the predetermined point.

Appendix 2

The aircraft according to appendix 1, wherein
the first face to be faced at the predetermined point is a display surface that differs from the second face facing the predetermined point,
the aircraft further includes an imaging device configured to obtain an image by imaging, from the aircraft, a scene in a direction opposite a direction from the aircraft toward the predetermined point, and
the control code is configured to cause the at least one processor to
   set a complementary color of a color of the image obtained by the imaging device as the predetermined color by setting, to the complementary color, a color of an image to be displayed on the first face or a color of the image to be displayed on the second face and,
   perform first display control that differs from the display control and that is control for displaying the image of the predetermined color on the first face, or second display control that is the display control and that is control for displaying the image of the predetermined color on the second face.

Appendix 3

The aircraft according to appendix 1 or 2, wherein
the first face or the second face is configured to emit light of the predetermined color, and
the control code is configured to cause the at least one processor to perform light-emission control for causing the first face or the second face to emit light in a time frame from a time included in a predetermined time frame including a sunset time to a time included in a predetermined time frame including a sunrise time.

Appendix 4

The aircraft according to any one of appendices 1 to 3, wherein
   the acquisition code is configured to cause the at least one processor to
      acquire, from the at least one memory or a memory different from the at least one memory in each memory of which a predetermined area and a map on which a position and a shape of at least one of a man-made structure or a natural object located in the predetermined area are noted are associated and stored, the map associated with the predetermined area that includes the predetermined point, and
   the control code is configured to cause the at least one processor to
      make a determination of, as a flight route of the aircraft, a route that passes through a passing point different than a passing point from which up to the predetermined point the man-made structure or the natural object exists, the determination being made based on the acquired map, and
      perform flight control for causing the aircraft to fly on the determined flight route.

Appendix 5

The aircraft according to any one of appendices 1 to 4, further including:
   a communication circuit configured to receive information expressing a position of a terminal device, wherein
   the control code is configured to cause the at least one processor to
      set, as the predetermined point, a point of the position expressed by the received information by setting the point of the position as a point at which the first face is to be faced, and
      when the orientation change control for causing the first face having the predetermined color to face the predetermined point is performed, perform a notification control for causing the communication circuit to send, to the terminal device, a facing notification that informs that the first face is facing the position of the terminal device.

Appendix 6

The aircraft according to any one of appendices 1 to 5, wherein the control code is configured to cause the at least one processor to perform the orientation change control or the display control when a distance from the position of the aircraft expressed by the acquired information to the predetermined point is less than or equal to a predetermined distance.

Appendix 7

The aircraft according to appendix 5, wherein
the terminal device includes a first terminal device and a second terminal device,
the communication circuit is configured to receive, from the first terminal device, information expressing a position of the first terminal device and receive, from the second terminal device, information expressing a position of the second terminal device,
the point at which the first face is to be faced includes a first point and a second point,
the predetermined point includes a first set point and a second set point,
the control code is configured to cause the at least one processor to set a point of the position of the first terminal device expressed by the received information as the first set point by setting the point of the position as the first point, and set a point of the position of the second terminal device as the second set point by setting the point of the position as the second point,
the orientation change control includes a first orientation change control for causing the first face to face the first set point, and a second orientation change control for causing the first face to face the second set point, and
the control code is configured to cause the at least one processor to perform the first orientation change control for causing the first face to face the first set point and, thereafter, perform the second orientation change control for causing the first face to face the second set point when the communication circuit receives, from the first terminal device, a viewing report informing that the aircraft has been viewed.

Appendix 8

The aircraft according to appendix 7, wherein
the facing notification includes a first facing notification informing that the first face is facing the position of the first terminal device, and a second facing notification informing that the first face is facing the position of the second terminal device,
the notification control includes a first notification control for causing the first facing notification to be sent to the first terminal device, and a second notification control for causing the second facing notification to be sent to the second terminal device, and
the control code is configured to cause the at least one processor to perform the first notification control when the first orientation change control is performed and perform the second notification control when the second orientation change control is performed.

Appendix 9

The aircraft according to appendix 5, wherein
the terminal device includes a first terminal device and a second terminal device,
the communication circuit is configured to receive, from the first terminal device, information expressing a position of the first terminal device and receive, from the second terminal device, information expressing a position of the second terminal device,
the point at which the first face is to be faced includes a first point and a second point,
the predetermined point includes a first set point and a second set point,
the control code is configured to cause the at least one processor to set a point of the position of the first terminal device expressed by the received information as the first set point by setting the point of the position as the first point, and set a point of the position of the second terminal device as the second set point by setting the point of the position as the second point,
the orientation change control includes a first orientation change control for causing the first face to face the first set point, and a second orientation change control for causing the first face to face the second set point,
the notification control includes a first notification control for causing a first facing notification informing that the first face is facing the position of the first terminal device to be sent to the first terminal device, and a second notification control for causing a second facing notification informing that the first face is facing the position of the second terminal device to be sent to the second terminal device, and
the control code is configured to cause the at least one processor to
repeatedly perform the first orientation change control and the second orientation change control while causing the aircraft to rotate, and
perform the first notification control when the first face having the predetermined color faces the first set point and perform the second notification control when the first face having the predetermined color faces the second set point.

Appendix 10

A system, including:
an aircraft configured to fly in a space, the aircraft including:
at least one memory storing program code; and
at least one processor configured to read the program code and operate as instructed by the program code, wherein
the program code includes
acquisition code configured to cause the at least one processor to acquire information expressing a position of the aircraft, and
control code configured to cause the at least one processor to
perform, based on the acquired information, orientation change control for causing a first face to face a predetermined point, the first face being a face of the aircraft and having a predetermined color, or
perform, based on the acquired information, display control for causing an image of the predetermined color to be displayed on a second face, the second face being a display surface of a display device of the aircraft and a partial face or an entire face facing the predetermined point.

Appendix 11

A method, including:
acquiring, by an aircraft or a system, information expressing a position of the aircraft; and
performing, by the aircraft or system,
based on the acquired information, orientation change control for causing a first face to face a predetermined point, the first face being a face of the aircraft and having a predetermined color, or based on the acquired information, display control for causing an image of the predetermined color to be displayed on a second face, the second face being a display surface of a display device of the aircraft and a partial face or an entire face facing the predetermined point.

What is claimed is:

1. An aircraft configured to fly in a space, the aircraft comprising:

at least one memory storing program code; and at least one processor configured to read the program code and operate as instructed by the program code, wherein the program code includes acquisition code configured to cause the at least one processor to acquire information expressing a position of the aircraft, and control code configured to cause the at least one processor to perform, based on the acquired information, orientation change control for causing a first face to face a predetermined point, the first face being a face of the aircraft and having a predetermined color, or perform, based on the acquired information, display control for causing an image of the predetermined color to be displayed on a second face, the second face being a display surface of a display device of the aircraft and a partial face or an entire face facing the predetermined point.

2. The aircraft according to claim 1, wherein the first face to be faced at the predetermined point is a display surface that differs from the second face facing the predetermined point, the aircraft further comprises an imaging device configured to obtain an image by imaging, from the aircraft, a scene in a direction opposite a direction from the aircraft toward the predetermined point, and the control code is configured to cause the at least one processor to set a complementary color of a color of the image obtained by the imaging device as the predetermined color by setting, to the complementary color, a color of an image to be displayed on the first face or a color of the image to be displayed on the second face and, perform first display control that differs from the display control and that is control for displaying the image of the predetermined color on the first face, or second display control that is the display control and that is control for displaying the image of the predetermined color on the second face.

3. The aircraft according to claim 2, wherein the first face or the second face is configured to emit light of the predetermined color, and the control code is configured to cause the at least one processor to perform light-emission control for causing the first face or the second face to emit light in a time frame from a time included in a predetermined time frame including a sunset time to a time included in a predetermined time frame including a sunrise time.

4. The aircraft according to claim 3, wherein the acquisition code is configured to cause the at least one processor to acquire, from the at least one memory or a memory different from the at least one memory in each memory of which a predetermined area and a map on which a position and a shape of at least one of a man-made structure or a natural object located in the predetermined area are noted are associated and stored, the map associated with the predetermined area that includes the predetermined point, and the control code is configured to cause the at least one processor to make a determination of, as a flight route of the aircraft, a route that passes through a passing point different than a passing point from which up to the predetermined point the man-made structure or the natural object exists, the determination being made based on the acquired map, and perform flight control for causing the aircraft to fly on the determined flight route.

5. The aircraft according to claim 3, further comprising:

a communication circuit configured to receive information expressing a position of a terminal device, wherein the control code is configured to cause the at least one processor to set, as the predetermined point, a point of the position expressed by the received information by setting the point of the position as a point at which the first face is to be faced, and when the orientation change control for causing the first face having the predetermined color to face the predetermined point is performed, perform a notification control for causing the communication circuit to send, to the terminal device, a facing notification that informs that the first face is facing the position of the terminal device.

6. The aircraft according to claim 2, wherein the acquisition code is configured to cause the at least one processor to acquire, from the at least one memory or a memory different from the at least one memory in each memory of which a predetermined area and a map on which a position and a shape of at least one of a man-made structure or a natural object located in the predetermined area are noted are associated and stored, the map associated with the predetermined area that includes the predetermined point, and the control code is configured to cause the at least one processor to make a determination of, as a flight route of the aircraft, a route that passes through a passing point different than a passing point from which up to the predetermined point the man-made structure or the natural object exists, the determination being made based on the acquired map, and perform flight control for causing the aircraft to fly on the determined flight route.

7. The aircraft according to claim 6, further comprising:

a communication circuit configured to receive information expressing a position of a terminal device, wherein the control code is configured to cause the at least one processor to set, as the predetermined point, a point of the position expressed by the received information by setting the point of the position as a point at which the first face is to be faced, and when the orientation change control for causing the first face having the predetermined color to face the predetermined point is performed, perform a notification control for causing the communication circuit to send, to the terminal device, a facing notification that informs that the first face is facing the position of the terminal device.

8. The aircraft according to claim 2, further comprising:
a communication circuit configured to receive information expressing a position of a terminal device, wherein
the control code is configured to cause the at least one processor to
set, as the predetermined point, a point of the position expressed by the received information by setting the point of the position as a point at which the first face is to be faced, and
when the orientation change control for causing the first face having the predetermined color to face the predetermined point is performed, perform a notification control for causing the communication circuit to send, to the terminal device, a facing notification that informs that the first face is facing the position of the terminal device.

9. The aircraft according to claim 1, wherein
the first face or the second face is configured to emit light of the predetermined color, and
the control code is configured to cause the at least one processor to perform light-emission control for causing the first face or the second face to emit light in a time frame from a time included in a predetermined time frame including a sunset time to a time included in a predetermined time frame including a sunrise time.

10. The aircraft according to claim 9, wherein
the acquisition code is configured to cause the at least one processor to
acquire, from the at least one memory or a memory different from the at least one memory in each memory of which a predetermined area and a map on which a position and a shape of at least one of a man-made structure or a natural object located in the predetermined area are noted are associated and stored, the map associated with the predetermined area that includes the predetermined point, and
the control code is configured to cause the at least one processor to
make a determination of, as a flight route of the aircraft, a route that passes through a passing point different than a passing point from which up to the predetermined point the man-made structure or the natural object exists, the determination being made based on the acquired map, and
perform flight control for causing the aircraft to fly on the determined flight route.

11. The aircraft according to claim 9, further comprising:
a communication circuit configured to receive information expressing a position of a terminal device, wherein
the control code is configured to cause the at least one processor to
set, as the predetermined point, a point of the position expressed by the received information by setting the point of the position as a point at which the first face is to be faced, and
when the orientation change control for causing the first face having the predetermined color to face the predetermined point is performed, perform a notification control for causing the communication circuit to send, to the terminal device, a facing notification that informs that the first face is facing the position of the terminal device.

12. The aircraft according to claim 1, wherein
the acquisition code is configured to cause the at least one processor to
acquire, from the at least one memory or a memory different from the at least one memory in each memory of which a predetermined area and a map on which a position and a shape of at least one of a man-made structure or a natural object located in the predetermined area are noted are associated and stored, the map associated with the predetermined area that includes the predetermined point, and
the control code is configured to cause the at least one processor to
make a determination of, as a flight route of the aircraft, a route that passes through a passing point different than a passing point from which up to the predetermined point the man-made structure or the natural object exists, the determination being made based on the acquired map, and
perform flight control for causing the aircraft to fly on the determined flight route.

13. The aircraft according to claim 12, further comprising:
a communication circuit configured to receive information expressing a position of a terminal device, wherein
the control code is configured to cause the at least one processor to
set, as the predetermined point, a point of the position expressed by the received information by setting the point of the position as a point at which the first face is to be faced, and
when the orientation change control for causing the first face having the predetermined color to face the predetermined point is performed, perform a notification control for causing the communication circuit to send, to the terminal device, a facing notification that informs that the first face is facing the position of the terminal device.

14. The aircraft according to claim 1, further comprising:
a communication circuit configured to receive information expressing a position of a terminal device, wherein
the control code is configured to cause the at least one processor to
set, as the predetermined point, a point of the position expressed by the received information by setting the point of the position as a point at which the first face is to be faced, and
when the orientation change control for causing the first face having the predetermined color to face the predetermined point is performed, perform a notification control for causing the communication circuit to send, to the terminal device, a facing notification that informs that the first face is facing the position of the terminal device.

15. The aircraft according to claim 14, wherein
the terminal device includes a first terminal device and a second terminal device,
the communication circuit is configured to receive, from the first terminal device, information expressing a position of the first terminal device and receive, from the second terminal device, information expressing a position of the second terminal device,
the point at which the first face is to be faced includes a first point and a second point,
the predetermined point includes a first set point and a second set point,
the control code is configured to cause the at least one processor to set a point of the position of the first terminal device expressed by the received information as the first set point by setting the point of the position as the first point, and set a point of the position of the second terminal device as the second set point by setting the point of the position as the second point, the orientation change control includes a first orientation change control for causing the first face to face the first set point, and a second orientation change control for causing the first face to face the second set point, and the control code is configured to cause the at least one processor to perform the first orientation change control for causing the first face to face the first set point and, thereafter, perform the second orientation change control for causing the first face to face the second set point when the communication circuit receives, from the first terminal device, a viewing report informing that the aircraft has been viewed.

16. The aircraft according to claim 15, wherein the facing notification includes a first facing notification informing that the first face is facing the position of the first terminal device, and a second facing notification informing that the first face is facing the position of the second terminal device, the notification control includes a first notification control for causing the first facing notification to be sent to the first terminal device, and a second notification control for causing the second facing notification to be sent to the second terminal device, and the control code is configured to cause the at least one processor to perform the first notification control when the first orientation change control is performed and perform the second notification control when the second orientation change control is performed.

17. The aircraft according to claim 14, wherein the terminal device includes a first terminal device and a second terminal device, the communication circuit is configured to receive, from the first terminal device, information expressing a position of the first terminal device and receive, from the second terminal device, information expressing a position of the second terminal device, the point at which the first face is to be faced includes a first point and a second point, the predetermined point includes a first set point and a second set point, the control code is configured to cause the at least one processor to set a point of the position of the first terminal device expressed by the received information as the first set point by setting the point of the position as the first point, and set a point of the position of the second terminal device as the second set point by setting the point of the position as the second point, the orientation change control includes a first orientation change control for causing the first face to face the first set point, and a second orientation change control for causing the first face to face the second set point, the notification control includes a first notification control for causing a first facing notification informing that the first face is facing the position of the first terminal device to be sent to the first terminal device, and a second notification control for causing a second facing notification informing that the first face is facing the position of the second terminal device to be sent to the second terminal device, and the control code is configured to cause the at least one processor to repeatedly perform the first orientation change control and the second orientation change control while causing the aircraft to rotate, and perform the first notification control when the first face having the predetermined color faces the first set point and perform the second notification control when the first face having the predetermined color faces the second set point.

18. The aircraft according to claim 1, wherein the control code is configured to cause the at least one processor to perform the orientation change control or the display control when a distance from the position of the aircraft expressed by the acquired information to the predetermined point is less than or equal to a predetermined distance.

19. A system, comprising:

an aircraft configured to fly in a space, the aircraft including:

at least one memory storing program code; and at least one processor configured to read the program code and operate as instructed by the program code, wherein the program code includes acquisition code configured to cause the at least one processor to acquire information expressing a position of the aircraft, and control code configured to cause the at least one processor to perform, based on the acquired information, orientation change control for causing a first face to face a predetermined point, the first face being a face of the aircraft and having a predetermined color, or perform, based on the acquired information, display control for causing an image of the predetermined color to be displayed on a second face, the second face being a display surface of a display device of the aircraft and a partial face or an entire face facing the predetermined point.

20. A method, comprising:

acquiring, by an aircraft or a system, information expressing a position of the aircraft; and performing, by the aircraft or system, based on the acquired information, orientation change control for causing a first face to face a predetermined point, the first face being a face of the aircraft and having a predetermined color, or based on the acquired information, display control for causing an image of the predetermined color to be displayed on a second face, the second face being a display surface of a display device of the aircraft and a partial face or an entire face facing the predetermined point.

* * * * *